(12) United States Patent
Ding et al.

(10) Patent No.: US 10,695,632 B2
(45) Date of Patent: Jun. 30, 2020

(54) APPARATUS AND METHODS TO TRACK MOVEMENT OF SPORTS IMPLEMENTS

(71) Applicant: Intel Corporation, Santa Clara, CA (US)

(72) Inventors: Ke Ding, San Jose, CA (US); Lakshman Krishnamurthy, Portland, OR (US); Narayan Sundararajan, Palo Alto, CA (US); Xue Yang, Arcadia, CA (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 15/812,746

(22) Filed: Nov. 14, 2017

(65) Prior Publication Data

US 2019/0038947 A1 Feb. 7, 2019

(51) Int. Cl.
*A63B 60/46* (2015.01)
*A63B 59/55* (2015.01)
*A63B 69/00* (2006.01)
*A63B 24/00* (2006.01)
*G09B 19/00* (2006.01)
*G06K 9/00* (2006.01)
*A63B 53/00* (2015.01)
(Continued)

(52) U.S. Cl.
CPC .......... *A63B 60/46* (2015.10); *A63B 24/0006* (2013.01); *A63B 24/0062* (2013.01); *A63B 59/55* (2015.10); *A63B 69/0015* (2013.01); *G06K 9/00355* (2013.01); *G09B 19/0038* (2013.01); *A63B 53/00* (2013.01); *A63B 59/50* (2015.10); *A63B 59/56* (2015.10); *A63B 59/70* (2015.10); *A63B 2024/0071* (2013.01); *A63B 2102/20* (2015.10); *A63B 2220/34* (2013.01); *A63B 2220/40* (2013.01); *A63B 2220/62* (2013.01); *A63B 2220/803* (2013.01); *A63B 2220/833* (2013.01); *A63B 2225/20* (2013.01)

(58) Field of Classification Search
CPC ..... A63B 60/46; A63B 59/55; A63B 24/0006; A63B 24/0062; A63B 2102/20
See application file for complete search history.

(56) References Cited

U.S. PATENT DOCUMENTS 9,636,578 B1 5/2017 Ricky
2009/0298605 A1 12/2009 Wiegers
(Continued)

OTHER PUBLICATIONS

United States Patent and Trademark Office, "Non-Final Office Action", issued in connection with U.S. Appl. No. 15/704,838 dated Mar. 11, 2019, 30 pages.
(Continued)

*Primary Examiner* — Jay Trent Liddle
*Assistant Examiner* — Alex F. R. P. Rada, III
(74) *Attorney, Agent, or Firm* — Hanley, Flight & Zimmerman, LLC

(57) ABSTRACT

Methods, apparatus, systems, and articles of manufacture to track movement of sports implements are disclosed herein. An example sensing unit disclosed herein is to be coupled to a sports implement. The sensing unit includes an inertial measurement unit to obtain movement data of said sports implement during a swing of said sports implement and a swing analyzer to determine whether the swing is a horizontal shot or a vertical shot based on the movement data.

13 Claims, 20 Drawing Sheets

(51) Int. Cl.
*A63B 102/20* (2015.01)
*A63B 59/56* (2015.01)
*A63B 59/50* (2015.01)
*A63B 59/70* (2015.01)

(56) References Cited

U.S. PATENT DOCUMENTS

| | | |
|---|---|---|
| 2011/0065488 A1 | 3/2011 | Okamura et al. |
| 2013/0102419 A1 | 4/2013 | Jeffery et al. |
| 2013/0267335 A1* | 10/2013 | Boyd .............. A63B 69/36 473/222 |
| 2015/0018111 A1* | 1/2015 | Nadkarni .......... A63B 69/3632 473/223 |
| 2015/0251071 A1 | 9/2015 | Steusloff et al. |
| 2017/0348560 A1 | 12/2017 | Ishikawa |
| 2019/0076710 A1 | 3/2019 | Ding et al. |

OTHER PUBLICATIONS

Intel News Byte, "Intel Technologies Unleash New Insights and Fan Experiences for Cricket at the ICC Champions Trophy 2017," [https://newsroom.intel.com/news/intel-technologies-unleash-new-insights-fan-experiences-cricket-icc-champions-trophy-2017/], dated May 30, 2017, retrieved on Jul. 3, 2017, 6 pages.

United States Patent and Trademark Office, "Final Office Action", issued in connection with U.S. Appl. No. 15/704,838 dated Nov. 22, 2019, 23 pages.

* cited by examiner

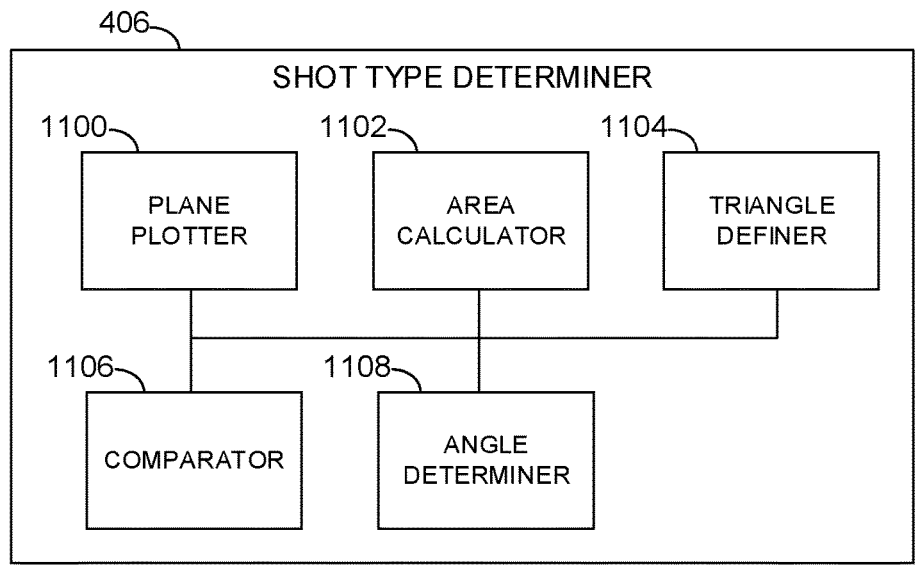
FIG. 11
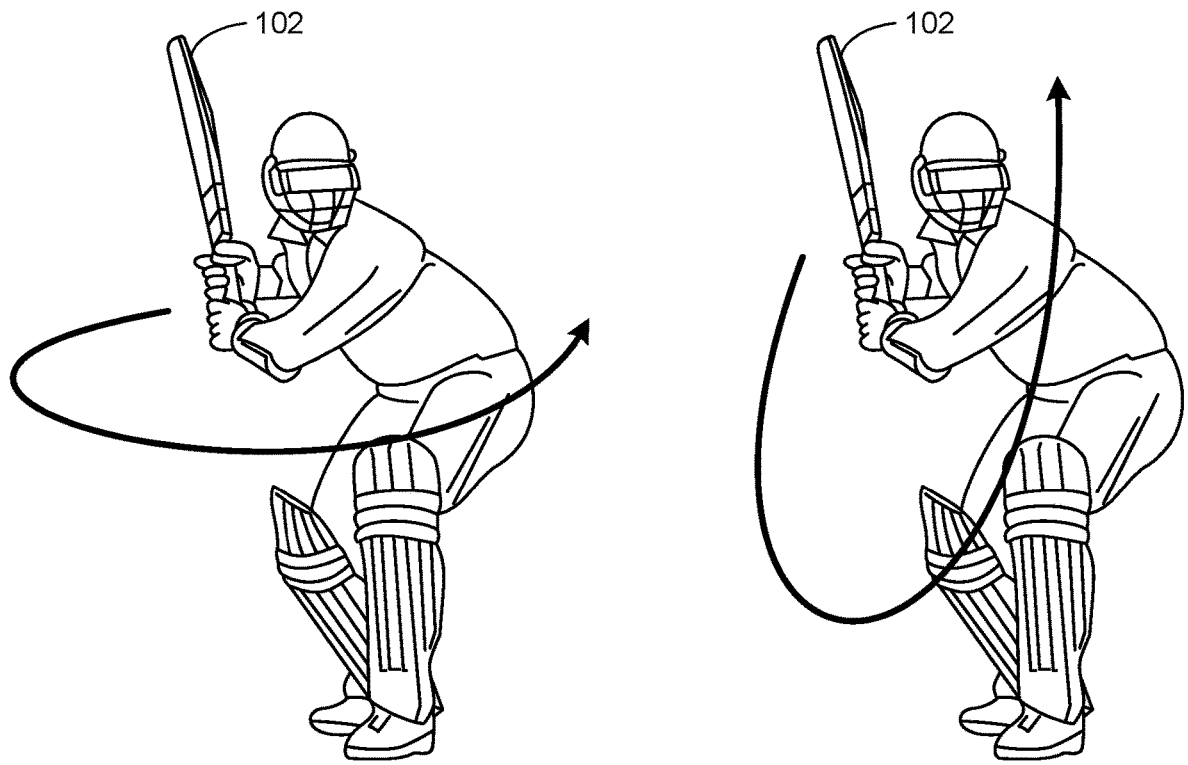
FIG. 12A  FIG. 12B

U S 10,695,632 B2

APPARATUS AND METHODS TO TRACK MOVEMENT OF SPORTS IMPLEMENTS

FIELD OF THE DISCLOSURE

This disclosure relates generally to sports implements, and, more particularly, to apparatus and methods to track movement of sports implements.

BACKGROUND

Many sports, including cricket, are played with sports equipment or implements, such as a bat, that is swung to hit a ball or other sports implement. There are also many different types or forms of swings that a batter may use to hit a ball or other sports implement with a bat.

BRIEF DESCRIPTION OF THE DRAWINGS

FIG. 11 is an example shot type determiner that may be implemented by the example swing analyzer of FIG. 4 to determine whether a swing is a horizontal shot or a vertical shot.

FIG. 12A illustrates an example motion path of the example cricket bat of FIG. 2 for a horizontal type shot.

FIG. 12B illustrates an example motion path of the example cricket bat of FIG. 2 for a vertical type shot.

Figure 1:
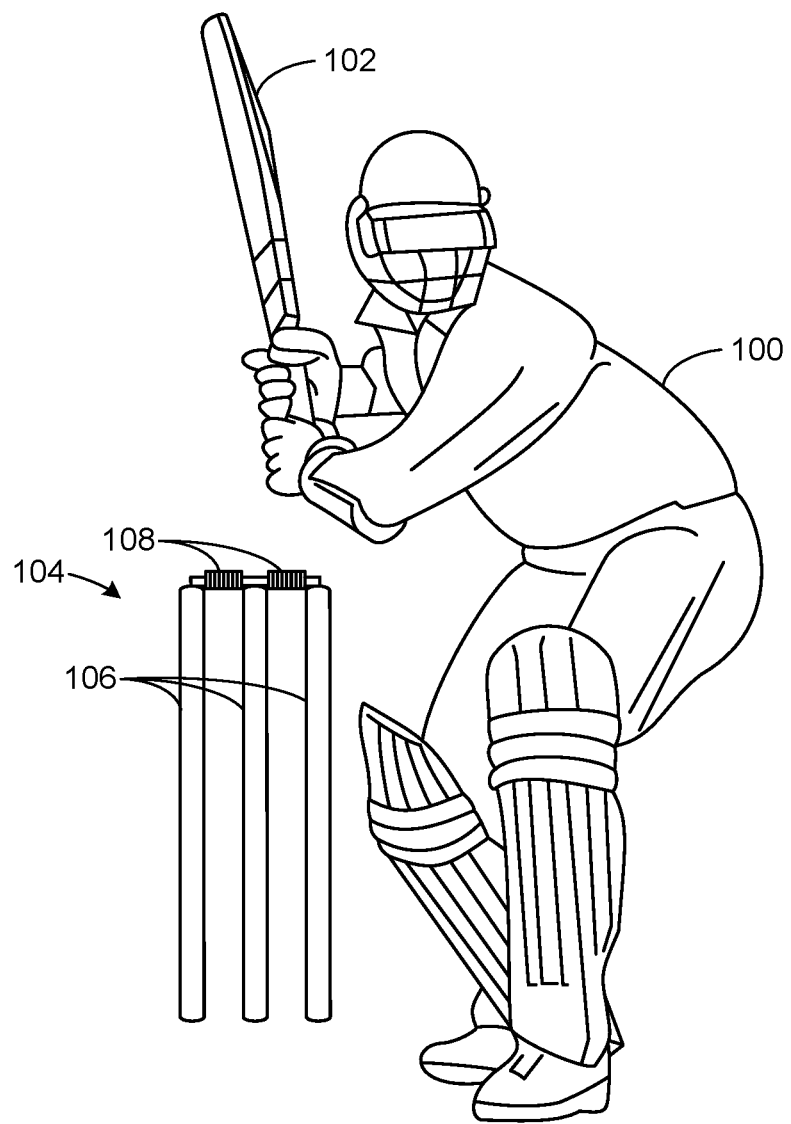
FIG. 1 illustrates an example cricket batter with an example cricket bat with which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example methods, apparatus, systems, and articles of manufacture for tracking movement of a sports implement or equipment, such as a bat. The example methods, apparatus, systems, and articles of manufacture may be used to detect a swing of a bat and determine one or more parameters of the swing, such as the angle of the bat (e.g., the vertical and/or horizontal angles of the bat) during one or more phases of a swing and/or at one or more positions during the swing, the velocity of the bat during one or more phases of the swing, the time duration between certain positions or phases of the swing, the shape of the swing (e.g., a horizontal shot or a vertical shot), a type of follow-through pattern of the swing, and/or a follow-through angle of the swing.

Many sports, including cricket, include a bat or other sports implement (e.g., a golf club, a hockey stick, etc.) that is swung to hit a ball or other sports implement (e.g., a puck, a shuttlecock, etc.). A batter or player swings the bat in a motion that can be divided into certain positions (sometimes referred to as points) and stages or phases between the positions. The positions may include a shot start position, a back lift position, a shot peak position, an impact position, and a shot end and follow-through position. The stage between the shot start and back lift position may be referred to a back lift stage, the stage between the back lift position and the impact position may be referred to as a forward swing stage, and the stage between the impact position and the shot end and follow-through position may be referred to as a follow-through stage. As used herein, the "follow-through" stage or phase of a swing is defined as the period between when the bat hits the ball (or other sports implement makes contact with another sports implement) and when the bat completes its swing and comes to a rest, before being brought back down to the side of the player or dropped to the ground. As used herein, "follow-through angle" is defined as the vertical angle of the bat (or other sports implement) at the end or final position of the follow-through stage of a swing. The motion and position(s) of a bat during the different stages of the swing (e.g., during the follow-through stage and/or at the follow-through angle) are important indicators that can be used to determine the angular degree a batter swings the bat, the style the bat was swung, the type of shot, and/or other metrics about a batter's swing. Cricket, for example, is one of the most popular sports in the world, and there is a high demand to accurately model, measure, present and fuse batter swing metrics for live broadcast, replay, decision making assistance, data driven coaching, new types of data mining, etc. The examples disclosed herein can be used to provide accurate metrics about a batter's swing, including, for example, the follow-through pattern and/or follow-through angle of the swing.

Some known sports tracking systems, which are used in connection with soccer, use high speed cameras or infrared (IR) cameras placed around a field to capture images or motion of the sports field and a complex vision analysis program that analyzes the images to determine goal or no-goal decisions. However, these known systems are often expensive, require complicated calibration processes, and require powerful backend servers to analyze the camera data. In particular, computer vision or motion tracking systems require relatively large computational processing power to generate the desired parameters for the sport. Further, these known systems require highly complex infrastructure, such as installing cameras around the field and, in some instances, LED lights are needed in the field to serve as markers.

Unlike the known systems mentioned above, the example methods, apparatus, systems, and articles of manufacture disclosed herein provide a relatively inexpensive, low-power, and accurate way to measure different parameters of a bat swing. Example sensing units are disclosed herein that can be coupled to a bat, such as a cricket bat, and determine one or more metrics of a swing, including one or more angles of the bat during the swing, the speed of the bat during the swing, whether impact was made with the ball, whether the swing is considered a horizontal shot or a vertical shot, a type or pattern of the follow-through, etc.

Example sensing units disclosed herein include one or more sensors, such as an accelerometer, a gyroscope, and/or a magnetometer, to obtain measurements or samples (referred to herein as movement data) during the swing of the bat. A swing analyzer, which may be implemented by a low-power microprocessor in the sensing unit, analyzes the measurements from the sensors and determines one or more metrics about the swing. In some examples, the swing analyzer determines whether a valid swing has occurred within a window of measurements (e.g., the last 3 seconds of measurements) and determines one or more positions (e.g., shot start, shot peak, follow-through, etc.) within the swing and/or one or more parameters (e.g., bat angle, speed, etc.) of the swing. In some examples, the swing analyzer includes a multi-layer shot detector that analyzes the window of measurements in multiple stages or phases to filter out invalid swings (e.g., random bat movement) early in the analysis. For example, the multi-layer shot detector may first analyze the accelerometer measurements in the time domain to determine if a potential swing has occurred within the window and identify one or more positions in the measurements corresponding to the swing. If the measurements are not indicative of a valid swing, the window f easements may be discarded and the next window of measurements may be analyzed. If the measurements are indicative of a valid swing, the multi-layer shot detector may perform further analysis using other measurements, such as the gyroscope measurement and/or the magnetometer measurements. At one or more of the stages or phases of analysis, one or more checks are performed to determine if the window includes a valid shot. By using multiple stages or phases of analysis, the multi-layer shot detector eliminates measurements corresponding to random bat movement earlier in the analysis process to avoid unnecessarily analyzing the measurements. As a result, the swing analyzer has lower computational power requirements and can be implemented in a smaller, less powerful processor. Further, by using multiple stages or phases of analysis, the example swing analyzer accurately determines if a swing has occurred. The example swing analyzer may also detect if the bat made contact with a ball during the swing. Once a valid shot is detected, for example, the swing analyzer may determine one or more parameters of the swing, such as the angle of the bat at different positions and/or throughout different phases of the swing, the velocity of the bat at different positions and/or throughout different phases of the swing, the time duration between different positions of the swing, etc. The swing analyzer may use these position(s) and parameter(s) to determine one or more other metrics about the swing, such as whether the swing a horizontal shot or a vertical shot, the type of follow-through pattern, the follow-through angle, etc.

Example swing analyzers disclosed herein are also able to determine when a direction of a swing has changed and establish a new reference system for tracking movement of the bat throughout the swing. For example, a sensing unit may be initially calibrated using a pitch angle (e.g., an angle between the direction the bowler throws the ball in the horizontal plane and Earth's magnetic North). The pitch angle is used to establish an initial XYZ reference frame that is used by the swing analyzer to determine the orientation and movement of the bat during the swings. However, during a sports game, for example, teams often switch directions of throwing and hitting and, thus, the direction of the swing may change. Instead of having to recalibrate the sensing unit each time the swing direction changes, the example swing analyzer detects a change in the pitch angle and establishes a new XYZ reference frame. As such, the players can continue to play the game without interruption.

As mentioned above, one example metric an example swing analyzer may determine is whether a swing is a horizontal shot or a vertical shot. These two categories of shots may be important classifiers for a type of swing. In some examples, to determine whether a swing is a horizontal shot or a vertical shot, an example swing analyzer uses an area based technique that compares the area of the bat path during the swing as projected in a substantially horizontal plane (e.g., an XY plane) to the area of the bat path during the swing as projected in a substantially vertical plane (e.g., a YZ plane). In other examples, the swing analyzer may utilize an angle based technique that compares the change in horizontal angle of the bat to the change in vertical angle of the bat during one or more phases of the swing to determine the dominant component of the swing.

Another example metric the swing analyzer may determine is the type of follow-through pattern of the swing and/or the follow-through angle. The swing analyzer may determine the follow-through pattern from a plurality of pre-defined patterns based on one or more other parameters or metrics about the swing. The follow-through pattern and/or follow-through angle are important metric that may be used to enhance a player's understanding of his/her swing. In some examples, the sensing unit includes a transceiver to wirelessly transmit the results of the swing analysis to a remote computer or electronic device after the swing. The results may be further fused with other data, presented to the batter and/or other people (e.g., an audience), used for training purposes, etc.

FIG. 1 shows a batter 100 (commonly referred to as a batsman) with a cricket bat 102 (referred to herein as the bat 102) standing in front of a wicket 104. The wicket 104 has three stumps 106 and two bails 108 resting on top of the three stumps 106. In the game of cricket, a bowler throws a ball at the wicket 104 and the batter 100 attempts to hit the ball with the bat 102 before the ball hits the wicket 104. If the ball hits the wicket 104 and knocks off one of the bails 108, the batter 100 is considered out.

As illustrated in FIG. 1, the batter 100 typically stands sideways relative to the bowler. In this example, the batter 100 is a right-handed batter. As such, the batter 100 stands in a position where the batter's left shoulder faces toward the bowler so that the ball travels across a front of the batter 100 toward the wicket 104. The batter 100 swings the bat 102 in the area in front of the wicket 104 and attempts to hit the ball. There are many different types of swing motions that a batter may use to hit a ball. For example, the batter 100 may swing the bat 102 in a horizontal type motion, similar to swinging a baseball bat, a vertical type swing, similar to swinging a golf club, or anywhere in between. Some example shot types include square, pull, hook, and sweep, which are examples of horizontal type shots, or back foot punch, cover, lofted straight, straight, and flick, which are examples of vertical type shots.

Figure 2:
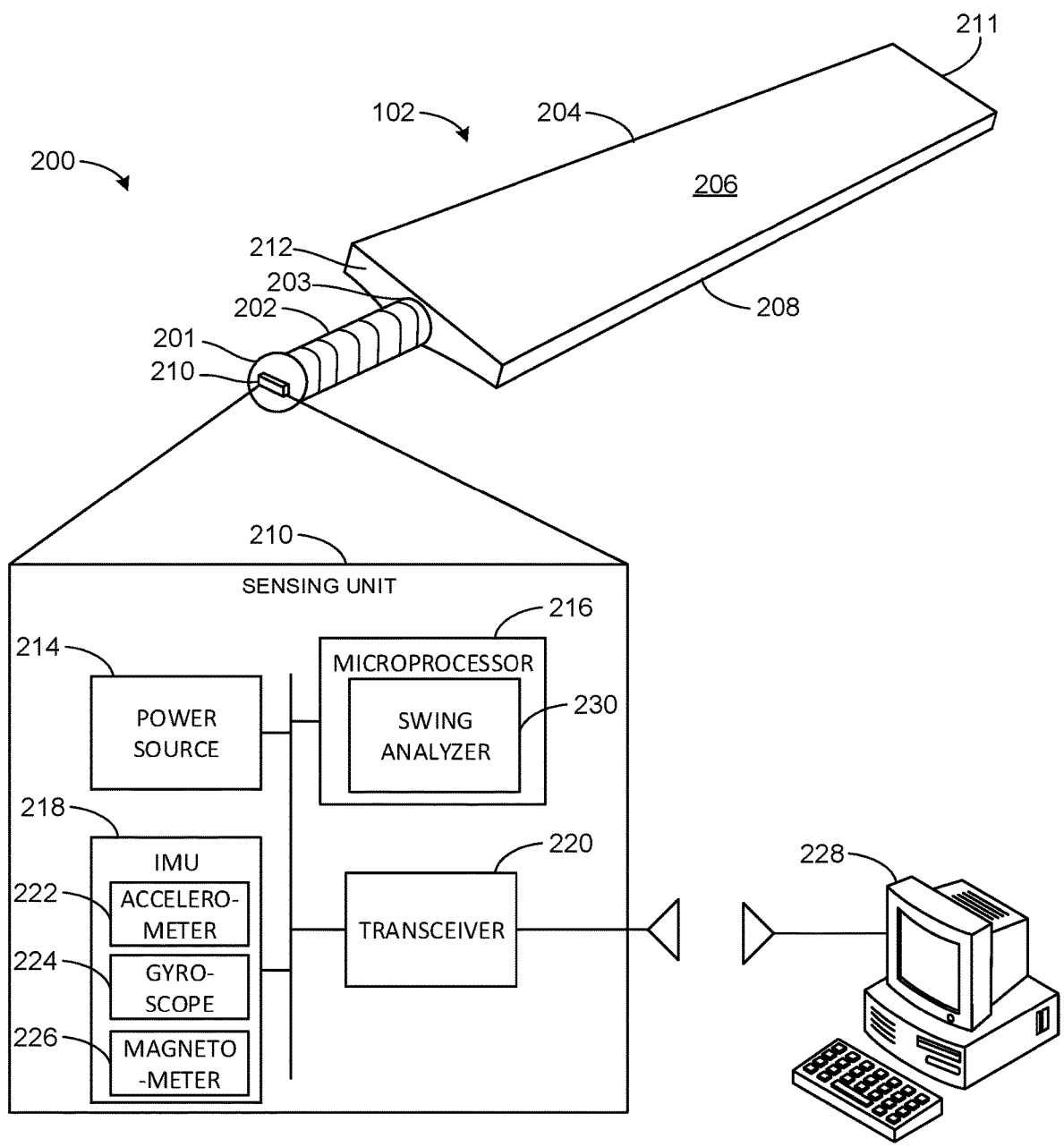
FIG. 2 illustrates an example sport tracking system, implemented in connection with the example cricket bat of FIG. 1, having an example sensing unit with an example swing analyzer and constructed in accordance with the teachings of this disclosure.

FIG. 2 illustrates an example sport tracking system 200 that may be used to track movement of a sports implement and determine one or more parameters of a swing of a sports implement in accordance with one or more principles of this disclosure. The sport tracking system 200 includes a sports implement that may be swung. In this example, the sports implement is the bat 102, which has a handle 202 and a blade 204 coupled to the handle 202. The handle 202 has a first end 201 and a second end 203, opposite the first end 201, which is coupled to the blade 204. The blade 204 also has a first end 212 and a second end 211 (e.g., a tip or distal end of the bat 102). The handle 202 is coupled to and extends from the first end 212 of the blade 204. The blade 204 has a front side 206 (commonly referred to as the string face), which is generally flat, and a back side 208 opposite the front side 206. The batter 100 (FIG. 1) holds the handle 202 of the bat 102 and attempts to hit the ball with the front side 206 of the blade 204. In the illustrated example, the first end 201 of the handle 202 is enlarged (compared to the rest of the handle 202) to help prevent a batter's hand(s) from sliding off of the handle 202. In other examples, the first end 201 of the handle 202 may not be enlarged.

To track movement of the bat 102, the example sport tracking system 200 includes an example sensing unit 210 constructed in accordance with the teachings of this disclosure. The sensing unit 210 is represented twice in FIG. 2, once as a hardware component (e.g., a chip) disposed on the cricket bat 102 and once as a block diagram. The sensing unit 210 is to be coupled to the bat 102. The sensing unit 210 may be coupled to the bat 102 via any mechanical fastener and/or chemical fastener (e.g., an adhesive). In some examples, the sensing unit 210 is to be coupled to the bat 102 at or near an end of the handle 202 of the bat 102. For example, in FIG. 2, the sensing unit 210 is coupled to the first end 201 of the handle 202. In other examples, the sensing unit 210 may be coupled to the bat 102 in another location, such as on the first end 212 of the blade 204 near the second end 203 of the handle 202, on the second end 211 of the blade 204, on the back side 208 of the blade 204, etc. In some examples, the sensing unit 210 may be disposed in a cavity formed in the cricket bat 102 (e.g., a cavity formed in the first end 201 of the handle 202, the second end 211 of the blade 204, the front side 206 of the blade 204, the back side 208 of the blade 204, etc.). In some such examples, a cover or plate may be disposed over the sensing unit 210 to protect the sensing unit 210.

As illustrated in the block diagram of the example sensing unit 210 in FIG. 2, the sensing unit 210 includes a power source 214, a microprocessor 216, an inertial measurement unit (IMU) 218, and a transceiver 220. The power source 214 may be implemented as, for example, a battery (e.g., a disposable or rechargeable battery) and provides electrical power to the components of the sensing unit 210. The IMU 218 includes one or more sensors that obtain measurements or samples, referred to herein as movement data, related to movement and orientation of the cricket bat 102. In the illustrated example, the IMU 218 includes an accelerometer 222, a gyroscope 224 (sometimes referred to as a gyrometer), and a magnetometer 226. The accelerometer 22 measures acceleration (or rate of change of velocity), the gyroscope 224 measures angular speed, and the magnetometer 226 measures magnetism, which may be used to determine an orientation/direction of the cricket bat 102. In other examples, the IMU 218 may include fewer or more sensors, including additional ones of the same sensors or different sensors. In some examples, the sensors of the IMU 218 obtain measurements at a frequency of about 100 Hertz (Hz). In other examples, measurements may be obtained at a higher or lower sampling rate.

The microprocessor 216 processes and analyzes the movement data from the IMU 218, as disclosed in further detail herein, and the transceiver 220 transmits the results of the analysis to a remote electronic device 228. The microprocessor 216 is a type of processor or central processing unit that is relatively small and may have low power consumption. In other examples, other types of processors or central processing units may be used. In the illustrated example, the electronic device 228 is depicted as a personal computer. However, the electronic device 228 may be implemented as any type of electronic device such as a laptop computer, a cell phone (e.g., a smart phone), a television, a tablet, etc. that may further process, display, and/or otherwise present the results of the swing analysis. Further, in some examples, the swing results may be transmitted to multiple electronic devices. The electronic device 228 may be located outside of the cricket playing field, for example. The transceiver 220 includes a transmitter and a receiver, such that the sensing unit 210 can communicate with the electronic device 228. The transceiver 220 may be, for example, a Bluetooth® transceiver. In other examples, the transceiver 220 may be implemented by other wireless technologies, such as a low band radio transceiver. In some examples, the sensing unit 210 may communicate with the electronic device 228 over a network, such as the Internet. In other examples, the sensing unit 210 may only include a transmitter and not a receiver, such that the sensing unit 210 can only output information but not receive information.

In the illustrated example, the sport tracking system 200 includes a swing analyzer 230 that determines one or more metrics about a swing of the bat 102 based on measurements from the IMU 218. The swing analyzer 230 is disclosed in further detail in connection with FIG. 4. In the illustrated example of FIG. 2, the swing analyzer 230 is implemented in the microprocessor 216 of the sensing unit 210. The swing analyzer 230 may be, for example, a program or application executed by the microprocessor 216. Thus, in some examples, the swing analysis results are determined in the sensing unit 210 and transmitted to the electronic device 228. In other examples, the swing analyzer 230 may be implemented in the electronic device 228 (e.g., by a processor of the electronic device 228). In such an example, the movement data from the IMU 218 may be transmitted to the electronic device 228, which may then analyze the movement data and determine the metric(s) about the swing.

While in the illustrated example of FIG. 1 the components of the sensing unit 210 are depicted as being included in a common package or unit, in other examples, one or more of the parts or components of the sensing unit 210 may be separated from the other part(s) and connected via any wired or wireless connection. For example, the power source 214 may be coupled to another part of the bat 102 (e.g., in the handle 202) and electrically coupled to the IMU 218, the microprocessor 216, and/or the transceiver 220, which may be disposed in other locations on the bat 102. Also, while the example sport tracking system 200, the example sensing unit 210, and the example swing analyzer 230 are described in connection with the cricket bat 102 for analyzing a swing of the bat 102, the example methods, apparatus, systems, and articles of manufacture disclosed herein can likewise be implemented with any other sports implement (a first sports implement) that is swung, such as a baseball bat, a golf club, a hockey stick, a tennis racket, a badminton racket, etc., to strike another sports implement (a second sports implement), such as baseball, a golf ball, a hockey puck, a tennis ball, a shuttlecock, etc., to analyze the swing in accordance with the principles of this disclosure.

Figure 3:
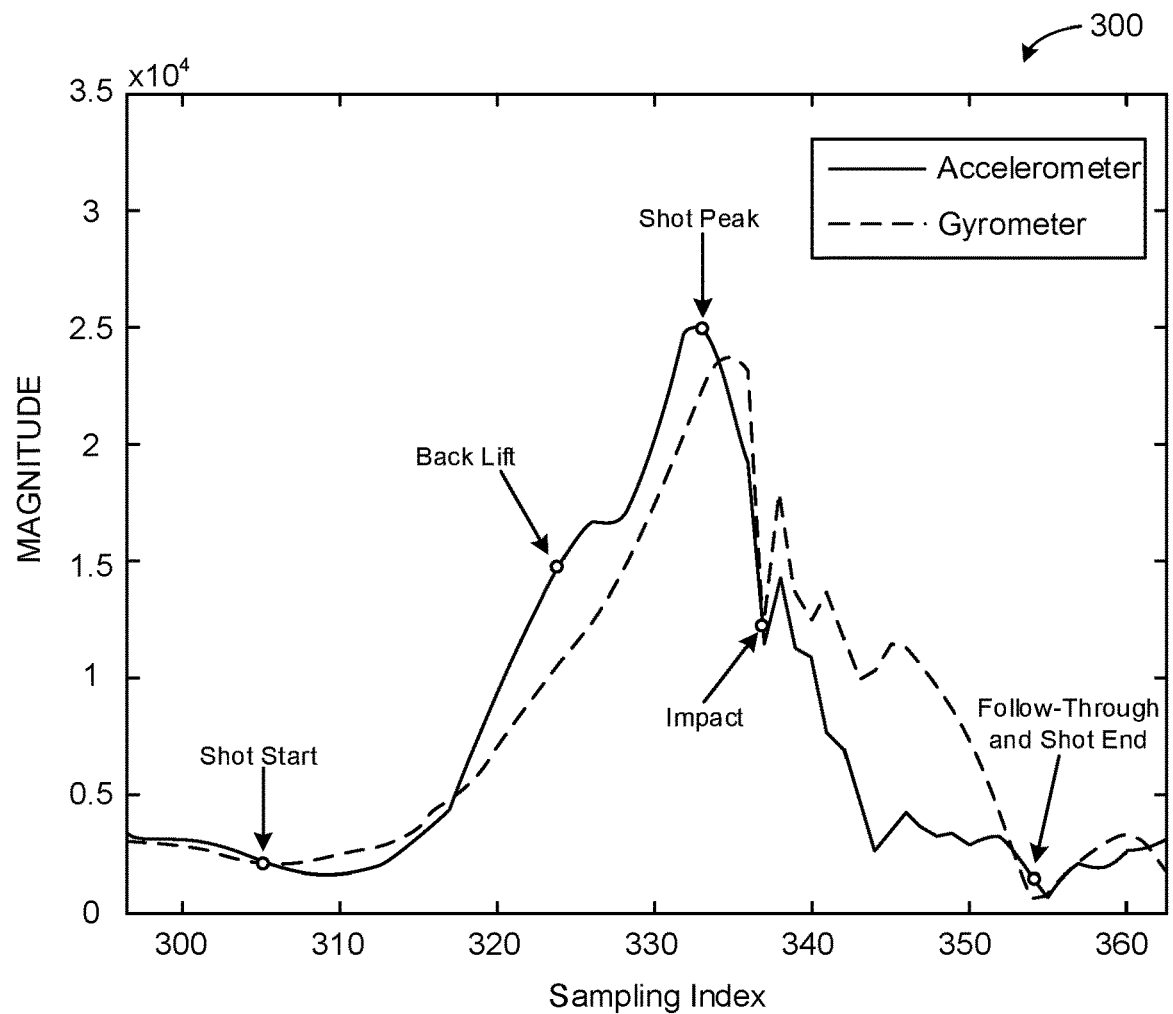
FIG. 3 illustrates an example graph showing example accelerometer and gyroscope measurements obtained by an example inertial measurement unit (IMU) of the example sensing unit of FIG. 2 during a swing of the example cricket bat.

FIG. 3 illustrates an example graph 300 showing measurements that may be obtained by the accelerometer 222 and the gyroscope 224 during an example swing of the bat 102. The Y axis of graph 300 represents magnitude and the X axis of the graph 300 represents a sampling index, which corresponds to the time (in seconds (s)) the data was obtained. Using a sampling frequency of 100 Hz, for example, the example graph 300 represents a time duration of about 0.6 seconds. Various positions or points of the swing are labeled in the graph 300. These positions in the data may be detected using the example swing analyzer 230 as disclosed in further detail herein. As illustrated, at the shot start point, the magnitudes of the accelerometer 222 and the gyroscope 224 increase as the batter 100 (FIG. 1) lifts the cricket bat 102 backward (e.g., to "wind up"). The back lift or wind up phase occurs between the shot start point and the back lift point, which represents the maximum or peak position behind the batter 100 before the batter 100 begins to swing the bat 102 forward to hit the ball. The shot peak point represents the maximum magnitude in acceleration. The bat 102 makes contact with the ball at the impact point, at which point the magnitudes of the accelerometer 222 and the gyroscope 224 continue to decrease. After the impact point, the bat 102 continues to move through the follow-through stage, which ends at the follow-through and shot end point. The follow-through and shot end point represents the follow-through angle where the bat 102 finally stops. Then, the batter 100 lowers the bat 102. These points and stages of the swing may be identified by the swing analyzer 230, based on the measurement data from the IMU 218, and used to determine various parameters about the swing, as disclosed in further detail herein.

Figure 4:
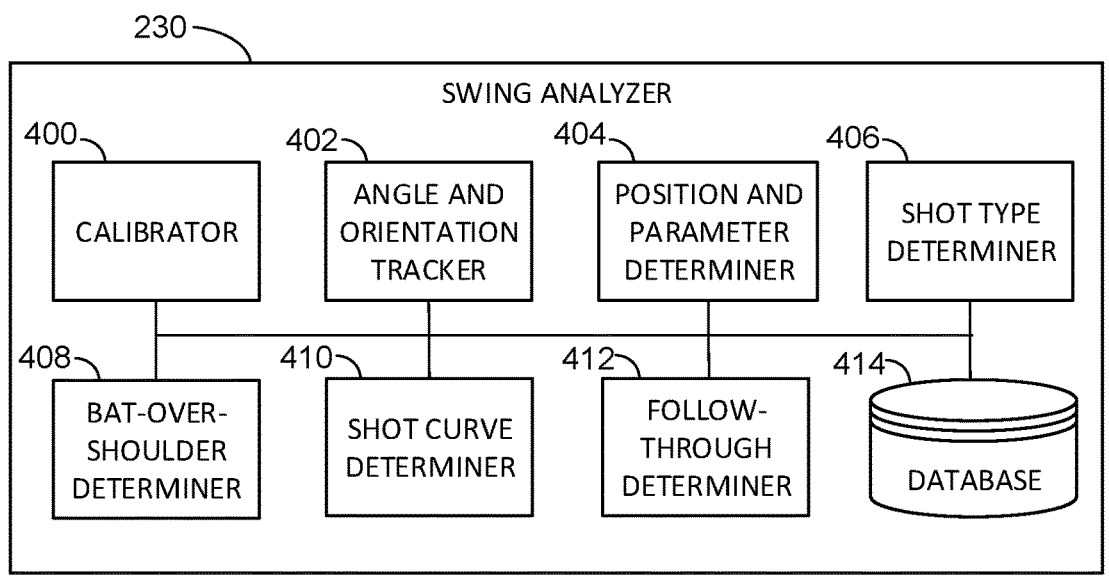
FIG. 4 is a block diagram of the example swing analyzer of FIG. 2.

FIG. 4 is a block diagram of the example swing analyzer 230, which may be implemented in the microprocessor 216 (FIG. 2) of the sensing unit 210 on the bat 102. In the illustrated example, the swing analyzer 230 includes a calibrator 400, an angle and orientation tracker 402, a position and parameter determiner 404, a shot type determiner 406, a bat-over-shoulder determiner 408, a shot curve determiner 410, a follow-through determiner 412, and a database 414.

Figure 5A:
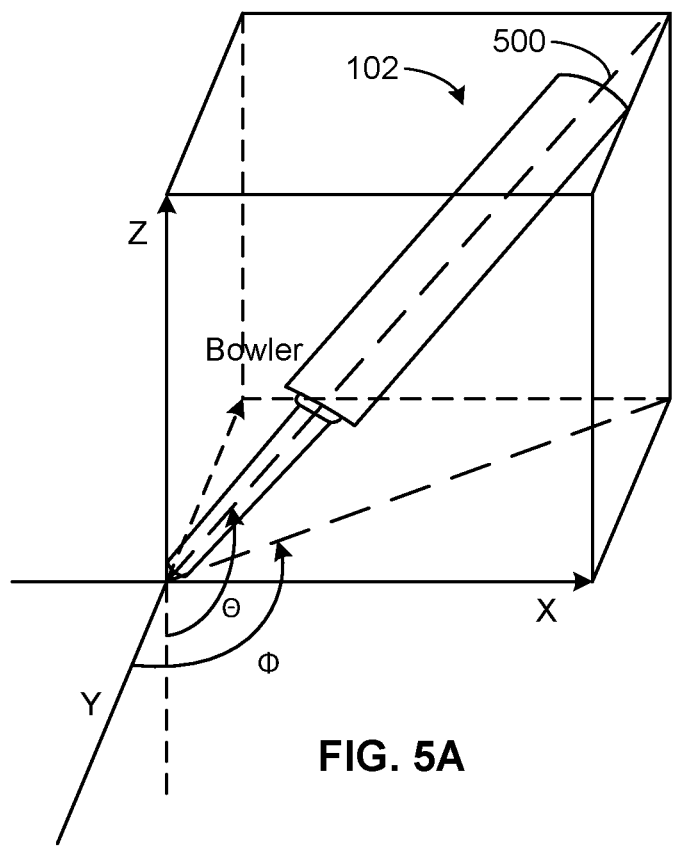
FIG. 5A illustrates an example reference frame for defining angles of orientation and movement of the example cricket bat of FIG. 2.

Before describing the details of the swing analyzer 230, an example XYZ reference frame or coordinate system is illustrated in FIG. 5A that is used to define the location, orientation, and movement of the bat 102 in the disclosed examples. As illustrated in FIG. 5A, the X and Y axes are horizontal axes that form a horizontal plane (XY plane) and the Z axis is the vertical axis perpendicular to the X, Y axes. In this example, the Y axis points toward the bowler. As such, positive Y is in the direction of the bowler and negative Y is in the opposite direction. Assuming the batter 100 is right handed and the batter's left shoulder is facing toward the bowler during a swing, the batter's body would be facing along the X axis (in the positive X direction). As illustrated in FIG. 5, the orientation of the bat 102 defines a bat vector 500 in the XYZ reference frame. The bat vector 500 can be defined by the longitudinal axis of the bat 102, for example.

As illustrated in FIG. 5, a vertical angle θ of the bat 102 is the angle measured between the bat vector 500 and the Z axis. The vertical angle θ has a range of 0° to 180°. In this example, a vertical angle θ of 0° means the bat 102 is pointing vertically downward, and a vertical angle θ of 180° means pointing vertically upward. If the bat 102 is rotated through the 180° angle, the vertical angle θ decreases from 180° back to 0°.

Further, in the illustrated example, a horizontal angle φ of the bat 102 is the angle of the bat vector 500 in the XY plane (i.e., the reflection of the bat vector 500 on the XY plane) relative to the Y axis. The horizontal angle φ is measured as 0° to 180° in the positive X direction (in the position shown in FIG. 5) and −0° to −180° in the negative X direction (on the opposite side of the YZ plane).

Figure 5B:
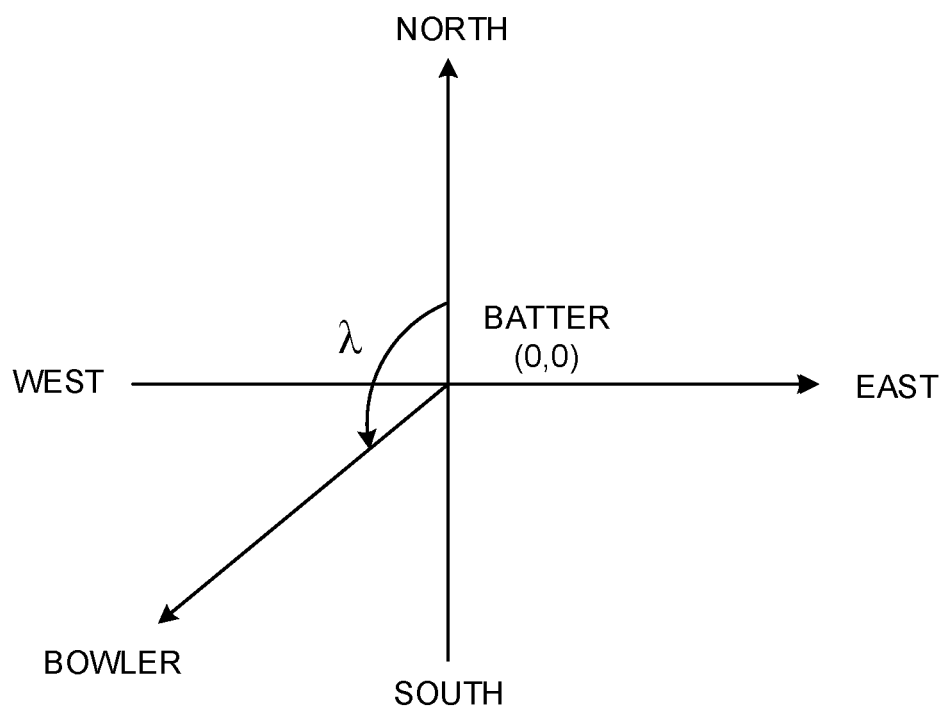
FIG. 5B illustrates an example pitch angle used to establish the example reference frame of FIG. 5A.

In some examples, prior to analyzing one or parameters of a swing, the calibrator 400 (FIG. 4) establishes the XYZ reference frame based on the direction of the bowler relative to Earth's magnetic North. In particular, the XYZ reference frame may be based on a pitch angle λ, as shown in FIG. 5B, which is the horizontal angle between Earth's magnetic North and the direction between the batter and the bowler. For example, prior to using the swing analyzer 230, a user may perform a calibration process that enables the calibrator 400 to determine the pitch angle λ. For instance, a user may point the bat 102 in the direction of the bowler, and the angle of the bat 102 relative to North may be detected by the magnetometer 226. The calibrator 400 may establish the XYZ reference frame such that the Y axis is aligned with the pitch angle λ and points in the direction of the bowler. The calibrator 400 may save the pitch angle λ and the XYZ reference frame in the database 414, for example.

Figure 6A:
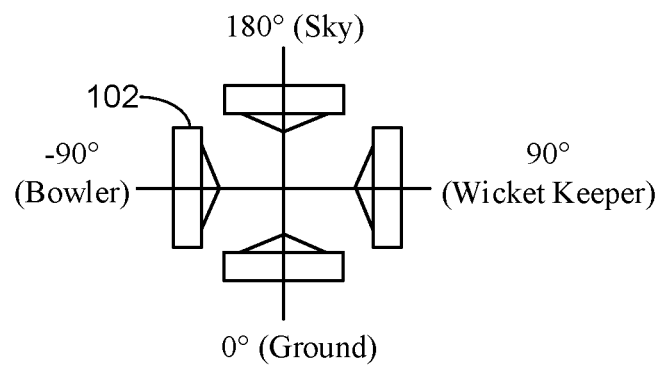
FIGS. 6A, 6B, and 6C illustrate example reference frames for determining a face angle of the example cricket bat of FIG. 2.
Figure 6B:
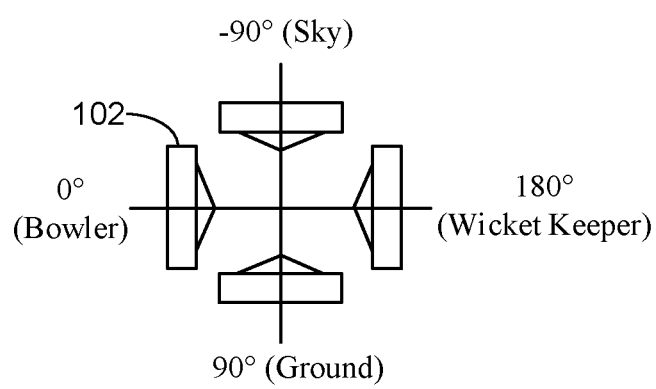
Figure 6C:
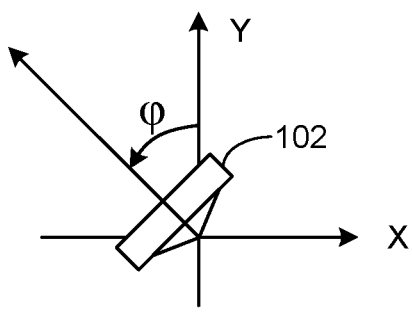

FIGS. 6A-6C illustrate reference frames for determining a face angle φ (which may be referred to as a rotational angle) of the bat 102, which represents the angle of the front side 206 (the face) of the blade 204. The angle definition is based on the type of shot and the stage or phase of the swing. For example, FIG. 6A shows the face angle φ definition for the bat 102 (labeled once in FIG. 6A) during the back lift phase of the swing (i.e., between shot start position to the back lift position) for either a horizontal shot or a vertical shot (disclosed in further detail in connection with FIGS. 11-13). In some examples, to calculate the face angle φ for the bat 102 during the back lift phase (as shown in FIG. 6A), the bat 102 is put into vector [0, −1, 0] (i.e., pointing backward along the Y axis), the bat 102 is rotated to the position given by the face angle φ, the bat 102 is rotated around the X axis by (90°—vertical angle) degrees, and then the bat 102 is rotated around the Z axis (horizontal) degrees. FIG. 6B shows the face angle φ definition for the bat 102 (labeled once in FIG. 6B) from the back lift position to the follow-through and shot end position for a horizontal shot. In some examples, the face angle φ for this phase of the swing for a horizontal shot is calculated the same as the back lift phase disclosed above in connection with FIG. 6A. FIG. 6C shows the face angle φ definition for the bat 102 from the back lift position to the follow-through and shot end position for a vertical shot. In FIG. 6C, the face angle φ is 0° facing the bowler, the face angle φ is positive in the negative X direction, and the face angle φ is negative in the positive X direction. In some examples, to calculate the face angle φ for the bat 102 during this phase for a vertical shot (as shown in FIG. 6C), the bat 102 is put into vector [0, 0, −1] (i.e., pointing vertically downward along the Z axis, the bat 102 is rotated to the position given by the face angle φ, the bat 102 is rotated around the Y axis by −(horizontal angle) degrees, and then the bat 102 is rotated around the X axis −(vertical angle) degrees.

Referring back to FIG. 4, the angle and orientation tracker 402 of the swing analyzer 230 determines the location of the bat 102 (in the XYZ reference frame) and the orientation, including the vertical angle θ, the horizontal angle φ, and/or the face angle φ (using the reference frames defined in FIGS. 5A-6C) of the bat 102 in the XYZ reference frame, throughout a swing or a portion of a swing based on the movement data (measurements) from the sensors of the IMU 218. For example, for each measurement from the IMU 218, the angle and orientation tracker 402 may determine the angle(s) of the bat 102 in the XYZ reference frame. Based on the angles(s) of the bat 102 in the XYZ reference frame, the angle and orientation tracker 402 can determine a location of the bat 102 in the XYZ reference frame. For example, based on the vertical and horizontal angles of the bat 102 and the length of the bat 102, and assuming the first end 201 of the handle 202 (FIG. 2) of the bat 102 (where the IMU 218 is located) is at (X=0, Y=0, Z=0), the angle and orientation tracker 402 can determine the XYZ location of the second end 211 of the bat 102 (e.g., the tip of the bat) at each measurement from the IMU 218. Additionally or alternatively, the angle and orientation tracker 402 may determine a location of another section or point of the bat 102 in the XYZ reference frame. The angle and orientation tracker 402 may condition the signals from the IMU 218, such as filtering, analog-to-digital conversion, etc. In some examples, the angle and orientation tracker 402 includes a 9 degree-of-free (DOF) filter to calculate the angles using the measurements from the accelerometer 222, the gyroscope 224, and the magnetometer 226.

In some examples, the position and parameter determiner 404 determines or identifies the various key positions and/or stages between the positions in the data during the swing, which may be used to determine one or more parameters of the swing, such as the location and angle(s) of the bat 102 at or during the key positions and/or the stages (e.g., based on the angle and/or orientation data from the angle and orientation tracker 402), the velocity and/or acceleration of the bat 102 at the key positions and/or during the different stages, the maximum and/or average bat velocities during the swing, the time-to-impact (which is the time between the shot start position and the impact position), and/or whether there was impact (contact with the ball) or not. The key positions may include the shot start position, the back lift position, the shot peak position, the impact position, and/or the follow-through and shot end position. In other examples, the bat motion may be divided into other key positions and/or stages between the positions. In some examples, the position and parameter determiner 404 may identify one or more of the key positions and/or stages based on certain changes in the vertical, horizontal, and/or face angle(s), for example.

Figure 7:
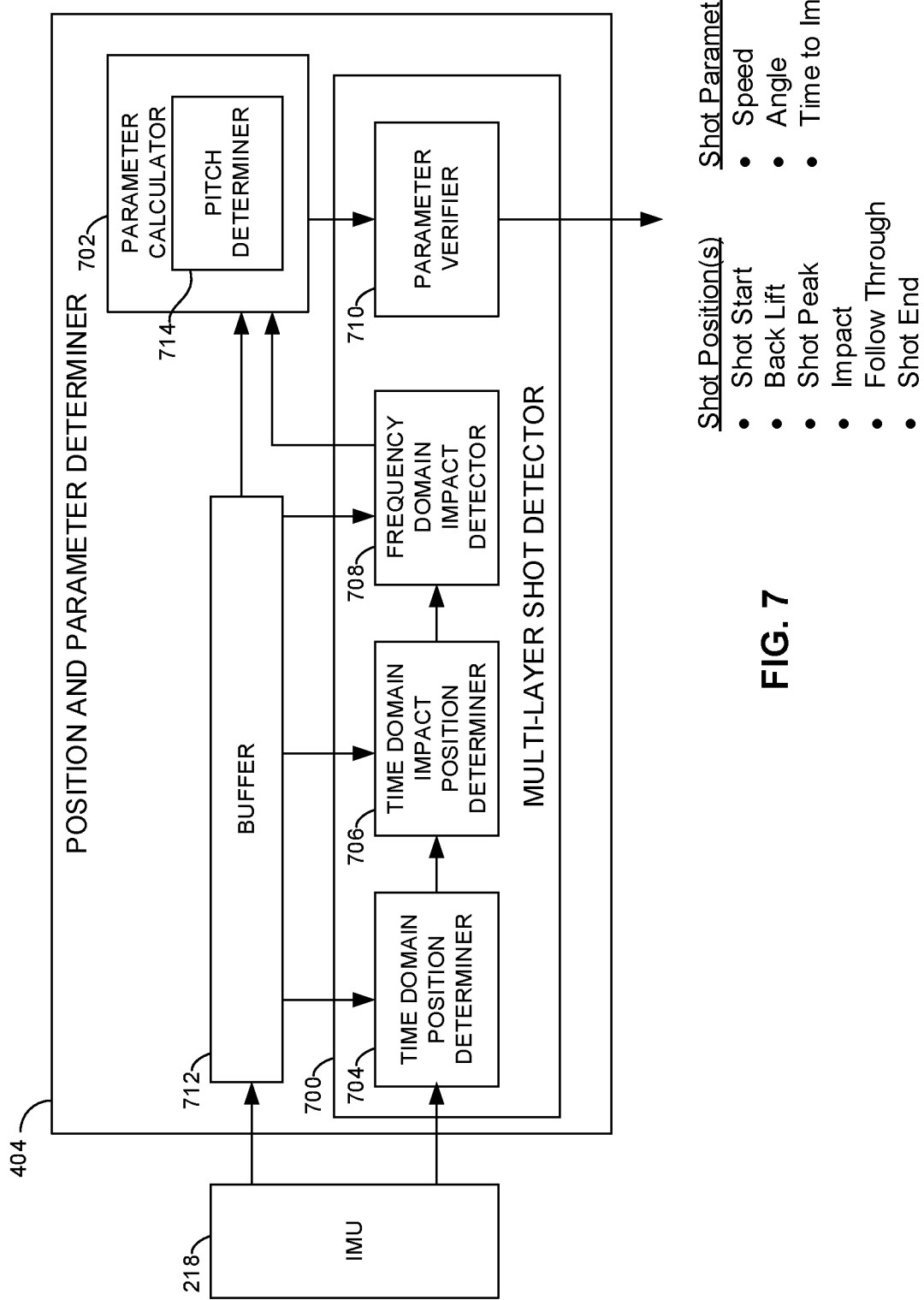
FIG. 7 is a block diagram of an example position and parameter determiner that may be implemented by the example swing analyzer of FIG. 2.

FIG. 7 is a block diagram of the example position and parameter determiner 404. The position and parameter determiner 404 includes a multi-layer shot detector 700 that analyzes the measurements from the IMU 218 to identify/distinguish between actual (intentional) swings from other random bat movement (e.g., carrying the bat around while walking). If an actual swing is detected in the measurements, the multi-layer shot detector 700 determines one or more positions of the swing (e.g., shot start, back lift, etc.) in the measurements and a parameter calculator 702 calculates one or more parameters of the swing (e.g., vertical angle at one or more positions, bat speed, time to impact, etc.). In some examples, the example multi-layer shot detector 700 also determines if an impact/contact is made during the shot. In some examples, only shots that make contact are valid and analyzed further. However, in other examples, such as in training, it may be beneficial to analyze a shot even if contact is not made and, thus, the data may be further analyzed. The example multi-layer shot detector 700 performs multiples stages or phases of analysis to provide accurate identification of a swing as well as one or more key position(s) and/or parameters in the swing, while using relatively low computational power and based on a relatively low sampling rate (e.g., 100 Hz). By using multiple stages or phases of analysis, the multi-layer shot detector 700 eliminates measurements corresponding to undesired bat movement earlier in the analysis process to avoid unnecessarily analyzing the measurements.

In the illustrated example, the multi-layer shot detector 700 includes a time domain position determiner (TDPD) 704, a time domain impact position determiner (TDIPD) 706, a frequency domain impact detector (FDID) 708, and a parameter verifier 710. The TDPD 704 receives the current accelerometer measurements from the IMU 218 as well as buffered (delayed) accelerometer measurements from a buffer 712. The buffer 712 may be implemented by, for example, the database 414. The buffer 712 stores measurements from a predetermined window (e.g., 3 seconds) of sensor data from the IMU 218.

The TDPD 704 determines whether a window of the sensor data includes a valid shot and, if so, determines one or more positions or points in the shot, such as the shot peak position, the shot start position, and the shot end position, based on a time domain analysis of the current accelerometer data (from the IMU 218) and the previous accelerometer data (from the buffer 712). Therefore, in some examples, the IMU 218 and/or the buffer 712 provide means for obtaining a window of measurements (which may include accelerometer measurement, gyroscope measurements and/or magnetometer measurements). In some examples, the TDPD 704 determines a general or rough estimation of the shot start and shot end positions, which may be verified and/or refined in other blocks in FIG. 7, as disclosed in further detail herein. The TDPD 704 analyzes a window of the accelerometer data, such as the last 3 seconds, each time a new measurement is received (e.g., at 100 Hz). If a valid shot is not detected in a given window, the window is discarded and the TDPD 704 analyzes the next window (e.g., which is shifted by 0.01 seconds), for example.

In some examples, the TDPD 704 compares the accelerometer data from the window to one or more thresholds to determine if a valid shot has occurred (as opposed to random bat movement) and identify one or more positions of the swing in the accelerometer data. In some examples, the TDPD 704 may use Thresholds 1-5 below:

Threshold 1: a magnitude threshold for shot peak;
Threshold 2: a magnitude threshold for shot start and shot end;
Threshold 3: a whole swing length threshold—minimum and maximum;
Threshold 4: a swing length threshold from start to peak; and
Threshold 5: a swing length threshold from peak to end.

For example, when a window containing the last three seconds of measurements is received, the TDPD 704 compares the accelerometer measurements in the window to Threshold 1: a magnitude threshold for shot peak. If the magnitude of the accelerometer measurements in the window does not satisfy Threshold 1 (e.g., does not exceed the magnitude threshold for shot peak), the window of data is discarded, and the next window (e.g., shifted by 0.01 seconds) is analyzed. If the magnitude of the accelerometer measurements in the window does satisfy Threshold 1 (e.g., a measurement in the accelerometer data is above the magnitude threshold for shot peak), the TDPD 704 identities the measurement or sample point in the data as a shot peak position. In some examples, if a subsequent window includes a sample that exceeds the previous shot peak, the previous window is discarded and the subsequent window is analyzed instead. The TDPD 704 then compares the accelerometer measurements in the window to Threshold 2: a magnitude threshold for shot start and shot end. In other words, the TDPD 704 compares the increase and/or decrease in magnitude of the measurements before and after the shot peak position (identified using Threshold 1) to the Threshold 2.

If the accelerometer measurements in the window do not satisfy Threshold 2, the window is discarded and the next window is analyzed. If the accelerometer measurements in the window do satisfy Threshold 2, the shot start and shot end positions are identified. The TDPD 704 then compares the measurements in the window to Threshold 3: the whole swing length threshold—minimum and maximum, to determine whether the window satisfies the swing length threshold. In some examples, Threshold 3 is a range (e.g., 0.5 seconds-0.8 seconds), which is used to determine if the time duration between the shot start position and the shot end position is too small or too large. If the time between the shot start and shot end positions does not satisfy Threshold 3 (e.g., if the time is greater than the upper limit of the threshold or below the lower limit of the threshold), the window is discarded and the next window is analyzed. If the time does satisfy Threshold 3 (e.g., the time is between the upper limit of the threshold and the lower limit of the threshold), the TDPD 704 compares the measurements in the window to Threshold 4: the swing length threshold from shot start to shot peak, and Threshold 5: the swing length threshold from peak to end. If either Threshold 4 or Threshold 5 are not satisfied, the window is discarded. Thresholds 4 and/or 5 may also be ranges, which can be used to determine if the durations are too large or too small between the respective points.

If all of the Thresholds 1-5 are satisfied, then the window is identified as including a valid shot or swing, and the shot start, shot peak, and shot end positions are identified in the measurements. The window may be saved in the database 414, for example. However, if any of the Thresholds 1-5 are not met, the measurements can be ignored without further analysis, which helps filter out random motion of the bat 102. As such, the TDPD 704 analyzes the window in a progressive manner to eliminate invalid shots early in the analysis to avoid unnecessary computation and analysis.

While in the example operation disclosed above the thresholds are applied in order of 1-5, in other examples, the thresholds may be applied in other orders and/or applied simultaneously to each other. Also, in other examples, more or fewer ones of the thresholds may be used (e.g., only Thresholds 1 and 2 may be used to identify a valid shot).

Figure 8:
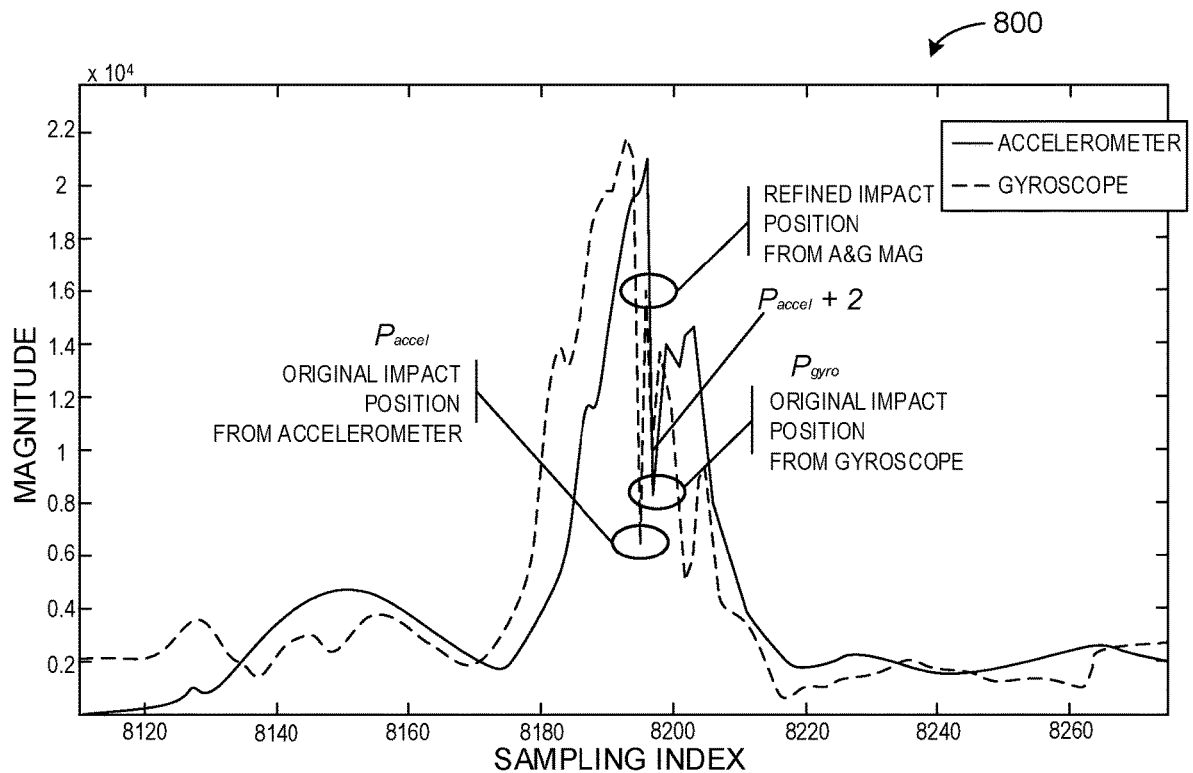
FIG. 8 illustrates an example graph showing example accelerometer and gyroscope measurements during a swing and that may be used by the position and parameter determiner of FIG. 7 to determine an impact position.

Once a valid swing is detected in a window by the TDPD 704, the TDIPD 706 analyzes the measurements in the window to determine the impact position in the window. The impact position usually occurs after the shot peak and with a relatively high bat swing velocity. In some examples, the impact position is defined as the maximum magnitude decrease position during the whole swing. In some examples, the TDIPD 706 determines the impact position by identifying the largest dip or drop in the accelerometer measurements after the shot peak position. For example, FIG. 8 illustrates an example graph 800 showing measurements that may be obtained by the accelerometer 222 and the gyroscope 224 during an example window of time identified by the TDPD 704 as a valid swing. Similar to the graph 300 of FIG. 3, the Y axis of graph 300 represents magnitude and the X axis of the graph 300 represents the sample index. As shown, the TDIPD 706 may identify the measurement in the accelerometer data that corresponds to the largest decrease in magnitude after the shot peak position. In some examples, the TDIPD 706 determines this measurements to correspond to the impact position.

In other examples, the TDIPD 706 uses acceleration decrease as the major factor and further refines the estimate based on the gyroscope magnitude trace if it has a comparable decrease. Depending on the shot type and the player swing pattern, for example, the maximum magnitude decrease position may slightly differ between the accelerometer measurements and the gyroscope measurements (e.g., the accelerometer measurements and the gyroscope measurements may have different peak and/or impact trace shapes). The TDIPD 706 may identify the largest decrease in magnitude in the gyroscope measurements. In some such examples, the TDIPD 706 may use the following correlations in Equation 1 to determine the impact position, where Px denotes the position (in time or sample indexes) of the maximum magnitude decrease position from x.

$$\text{If } P_{gyro} \geq P_{accel} + 2 \quad P_{final} = P_{accel} + 1 \qquad \text{Equation 1}$$
$$\text{If } P_{gyro} \leq P_{accel} - 2 \quad P_{final} = P_{accel} - 1$$
$$\text{Else} \qquad P_{final} = P_{accel}$$

In Equation 1 above, "2" means two measurements or data sample points and "1" means one measurement or data sample point. Therefore, in some examples, the TDIPD 706 provides means for identifying the measurement in the accelerometer measurements corresponding to the largest decrease in magnitude and/or identifying the measurement in the gyroscope measurements corresponding to the largest decrease in the magnitude.

For example, referring back to FIG. 8, the original impact position from the accelerometer data and the original impact position from the gyroscope data are highlighted. These points correspond to the largest decrease in magnitude. As can be seen in FIG. 8, the time of the original impact position from the gyroscope, $P_{gyro}$, is about equal to the two measurements (samples) after the original impact position from the accelerometer, $P_{accel}$. As such, using the above correlations, $P_{final}=P_{accel}+1$ (data sample point), the TDIPD 706 identifies the data sample point after $P_{accel}$ as being the impact position (which is the point highlighted in FIG. 8). As such, the above correlations can be used to correct the impact position if the $P_{gyro}$ position occurs outside of a threshold range (e.g., ±2 data sample points) of the $P_{accel}$ position. Otherwise, if the $P_{gyro}$ position occurs within the threshold range of the $P_{accel}$, the impact position is identified as the $P_{accel}$ position. Therefore, in some examples, the TDIPD 706 provides means for determining an impact position in a window based on accelerometer measurements and/or gyroscope measurements. In other examples, the TDIPD 706 may determine the impact position using other techniques and/or only one of the accelerometer measurements or the gyroscope measurements.

Referring back to FIG. 7, once the impact position is identified, the FDID 708 analyzes the measurements in the window to determine whether the bat 102 (a first sports implement) made contact or impact with the ball (a second sports implement) during the swing. In other words, although an impact position may be identified in the measurements, the bat 102 may not have actually made contact with the ball. The FDID 708 determines whether the swing is an impact shot or impact-less shot based on a comparison of the high frequency signals in the sensor data to the low frequency signals in the sensor data. An impact-less shot typically has less energy in the high frequency part of the signals then an impact shot.

In some instances, it may be difficult to determine whether a shot is an impact shot or an impact-less shot using the time domain because only a few measurements or samples may be available for analysis around the impact position. Therefore, in some examples, the FDID 708 converts the time domain data into the frequency domain and analyzes the data.

Figure 9:
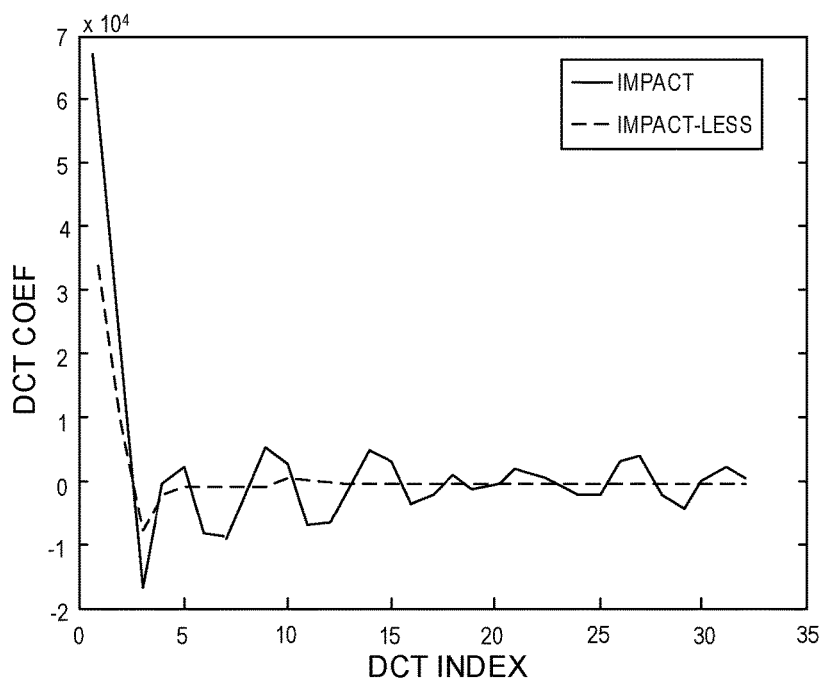
FIG. 9 illustrates an example frequency domain graph of accelerometer data for an impact shot and an impact-less shot that may be used by the example position and parameter determiner of FIG. 7.

In some examples, the FDID 708 takes N samples, such as 16 samples, from each side of the impact position (as identified by the TDIPD 706), which results in a 32 sample window. In other examples, the window may include more or fewer samples. Then, the FDID 708 converts the samples to the frequency domain using a Fast Fourier Transform (FFT) and/or a Discrete Cosine Transform (DCT), for example. Thus, in some examples, the FDID 708 provides means for converting the measurement into a frequency domain representation. FIG. 9 illustrates an example DCT graph showing the frequency domain comparison between an impact shot and an impact-less shot. The FDID 708 divides the whole frequency coefficients into one or more categories or levels, such as a high frequency component or range, a low frequency component or range, and/or a DC component. For example, the DC component may be DCT Index 0, the low frequency component or range may include DCT Indexes 1-15, and the high frequency component or range may include DCT indexes 16-31. As shown, the signal of the impact shot is still vibrating in the high frequency component (DCT Indexes 16-31), which results in a greater magnitude of high frequency signals (calculated as an absolute (ABS) sum of the magnitudes of the high frequency signals) than the signals of the impact-less shot (which is about 0). In other examples, the frequency coefficients may be divide into more or fewer categories and the categories may be larger or smaller. In some examples, the FDID 708 determines whether impact was made based on a sum of the measurements occurring in the high frequency range, the sum of the measurements occurring in the low frequency range, and/or the measurements occurring in the DC component. For example, the FDID 708 may use one of the following relative ratios in Equations 2-4, which may be compared to respective thresholds, to determine whether impact was made during the swing.

$$\text{Ratio 1: } \text{Sum}_{high\_freq}/\text{Sum}_{low\_freq} \qquad \text{Equation 2}$$

$$\text{Ratio 2: } \text{Sum}_{high\_freq}/\text{DC} \qquad \text{Equation 3}$$

$$\text{Ratio 3: } \text{Std}_{high\_freq}/\text{DC} \qquad \text{Equation 4}$$

In Equations 2-4, $\text{Sum}_{high\_freq}$ is the ABS sum of the magnitudes of the signals in the high frequency range (e.g., DCT Indexes 16-31), $\text{Sum}_{low\_freq}$ is the ABS sum of the magnitudes of the signals in the low frequency range (e.g., DCT Indexes 1-15), $\text{Std}_{high\_freq}$ is the standard deviation of the high frequency signals, and DC is the DCT coefficient (e.g., at DCT Index 0). Thus, in some examples, the FDID 708 provides means for calculating a sum of the measurements occurring a high frequency range of a frequency domain representation, a sum of measurements occurring in a low frequency range of the frequency domain representation, and/or DC component of the frequency domain representation. Ratios 2 and 3 use the DC coefficient to normalize the results, which, in some examples, provides a more robust analysis for different swing speeds while using less computation. If Ratio 1 is used, for example, the resulting value may be compared to a threshold. If the value satisfies the threshold (e.g., exceeds the threshold, indicating the high frequency component is relatively large compared to the low frequency component), the FDID 708 determines that impact was made. However, if the resulting value dos not satisfy the threshold (e.g., is below the threshold, indicating the high frequency component is relatively low compared to the low frequency component), the FDID 708 determines that no impact was made. A similar operation may be performed using Ratios 2 and/or 3. Further, the example Ratios 1-3 may be performed using measurements from the gyroscope in addition to or as an alternative to the accelerometer data. In other examples, the $Sum_{high\_freq}$ or the $Sum_{low\_freq}$ may be compared to a threshold to determine if impact was made.

Another example technique is found below in Equation 5, which combines the normalized sum of the high frequency component from the accelerometer 222 and the gyroscope 224 together. In other words, FDID 708 may similarly obtain the gyroscope measurements from the same window, convert the measurement into the frequency domain, and sum the measurements in one or more components or ranges of the frequency domain. In some examples, Ratio 4 in Equation 5 further increases the robustness against different swing velocity and types.

$$\text{Ratio 4: } \left(\frac{Sum_{accel\_high\_freq}}{DC_{accel}}\right) + \left(\frac{Sum_{gyro\_high\_freq}}{DC_{gyro}}\right) \quad \text{Equation 5}$$

In Equation 5, $Sum_{accel\_high\_freq}$ is the ABS sum of the magnitudes of the signals from the accelerometer 222 in the high frequency range (e.g., DCT Indexes 16-31), $Sum_{gyro\_high\_freq}$ is the ABS sum of the magnitudes of the signals from the gyroscope 224 in the high frequency range (e.g., DCT Indexes 16-31), $DC_{accel}$ is the DCT coefficient for the signals from the accelerometer 222 (e.g., DCT Index 0), and $DC_{gyro}$ is the DCT coefficient for the signals from the gyroscope 224 (e.g., DCT Index 0). In some examples, the FDID 708 compares the value of Ratio 4 to a threshold, such as 0.186210. In other examples, the threshold may be more or less. If the value satisfies the threshold (e.g., exceeds the threshold, indicating the high frequency component is relatively large compared to the low frequency component), the FDID 708 determines that impact was made. However, if the resulting value dos not satisfy the threshold (e.g., is below the threshold, indicating the high frequency component is relatively low compared to the low frequency component), the FDID 708 determines that no impact was made.

In some examples, the multi-layer shot detector 700 may still continue with the analysis even if the swing is determined to be an impact-less shot. For example, during training, it may still be beneficial to determine the position(s) and parameter(s) of the swing, such as the bat speed, the shot type, the back lift angle, etc. However, in other examples, if an impact-less shot is identified, the window of measurements may discarded and the next window is analyzed.

Once a valid shot is detected by the TDPD 704, the TDIPD 706, and the FDID 708, the parameter calculator 702 determines one or more parameters of the swing based on the sensor data including the accelerometer measurements, the gyroscope measurements, and the magnetometer measurements using the previously determined positions. The example parameters may include the speed during one or more phases of the swing, the angle of the bat 102 during one or more phases of the swing and/or at one or more of the positions, the time between different positions in the swing (e.g., the time to impact, which is the time from the back lift position to the impact position), and/or any other parameter of interest. In some examples, the parameter calculator 702 determines a trace of the angles during the swing. In some examples the parameter calculator 702 determines the back lift position based on a maximum in the vertical angle after the shot start position.

Also, in some examples, the parameter calculator 702 further refines the shot start position and/or the shot end position. For example, the TDPD 704, the TDIPD 706, and the FDID 708 may only use accelerometer and/or gyroscope measurements, whereas the parameter calculator 702 may use the accelerometer, gyroscope, and magnetometer measurements to further refine and confirm the previous determinations. For example, the shot start position may be defined as where the batter 100 starts to lift the bat 102. In such an example, the parameter calculator 702 may determine the shot start position based on the position where the vertical angle trace has a continuous increase. In other words, the parameter calculator 702 may identify the dip or trough in the vertical angle (before a long increase) as the shot start position. In regards to the shot end position, in some instances, the parameter calculator 702 determines the shot end position to be the same position as the follow-through position. After the impact position, the batter 100 continues to swing the bat until reaching a rest position (the follow-through position), which may be determined using a combination of vertical and horizontal angle trace, for example. Thus, the parameter calculator 702 uses angle based analysis to confirm or adjust the positions.

In some examples, the parameter verifier 710 performs one or more checks to verify the swing is a true shot based on one or more threshold ranges. For examples, the parameter verifier 710 may compare one or more of the positions and/or parameters to a threshold including one or more of the following parameter thresholds: (1) a time duration threshold from the shot start position to the back lift position; (2) a time duration threshold from the back lift position to the follow-through position; (3) a valid range for vertical angle θ at the back lift position (e.g., greater than about 60°); (4) a valid range for vertical angle θ at the shot start position (e.g., less than or equal to about 90°); (5) a horizontal angle change during the whole swing (from the shot start position to the follow-through and shot end position), which may be greater than or equal to a threshold; and/or (6) a vertical angle change during the whole swing (from the shot start position to the follow-through and shot end position), which may be greater than a threshold. In some examples, the parameter verifier 710 confirms the swing is a valid shot if all six of the parameter thresholds are satisfied. If one of the parameter thresholds is not satisfied, however, the parameter verifier 710 may determine the window of measurements is not indicative of a valid shot and the window may be discarded. In other examples, more or fewer ones of the parameter thresholds may be used (e.g., only one or a few of the parameter thresholds may need to be satisfied to be determined as a valid shot). After a valid shot is detected and the positions and/or parameters are determined, the parameter verifier 710 outputs the window of measurements, the identified shot positions, and/or the parameters, which may be saved in the database 414 and used in one or more other analyses disclosed herein and/or output to the remote electronic device 228 via the transceiver 220.

As such, the multi-layer shot detector 700 performs one or more stages or phases of analysis (e.g., first using just accelerometer data, then accelerometer and gyroscope data, and then accelerometer, gyroscope, and magnetometer data, etc.). At each stage, invalid shots may be rejected, which prevents further analysis of the data and, thus, reduces computational requirements. As a result, the multi-layer shot detector 700 enables the computations to be performed with minimal processing power.

In some instances, the direction the batter 100 swings the bat 102 may change. For example, in a cricket game, each team switches their court every six balls. As such, the direction the ball is thrown and the direction the bat 102 is swung is reversed (e.g., by 180°). As mentioned above, the pitch angle λ may be pre-calibrated together with the calibration of the magnetometer 226 or given by the end user as an input to the cricket algorithm initially, such that the Y axis of the reference frame is aligned with the bowler. However, if the batter 100 switches sides, the direction of the swing is in the opposite direction in the XYZ reference frame and, thus, may affect the position and parameter calculations disclosed herein. To account for the change in direction, the example parameter calculator 702 includes a pitch determiner 714. As shown in FIG. 5B, the pitch angle λ is defined as the horizontal angle from the batter 100 (at X, Y position 0, 0) to the bowler relative to magnetic North in the Earth's coordinate system. The pitch determiner 714 automatically detects a switch in the direction of a swing and, thus, there is no need to recalibrate the pitch angle λ.

Using the reference frame shown in FIG. 5A, positive Y points toward the bowler. In other words, the positive Y direction is on the side of the XZ plane facing the bowler, whereas the negative Y direction is on the opposite side of the XZ, pointing away from the bowler. To determine whether a switch in the batting direction has occurred, the direction determiner may use Equation 6 below:

$$y\_negative\_ratio = \sum_{i=shot\_start}^{back\_lift} (\text{for all } y_i < 0) \Big/ \sum_{i=shot\_start}^{back\_lift} y_i \quad \text{Equation 6}$$

In Equation 6, $y_i$ is the Y component of the XYZ location of the bat 102 at each measurement (of the IMU 218) during the swing. In Equation 6, the summation of the negative Y values are compared to the summation of all the Y values between the shot start position and the back lift position. In a typical swing, the back lift stage (between the shot start and back lift positions) occurs mostly in the negative Y direction, and then the bat 102 is swung into the positive Y direction to hit the ball. Therefore, if the batter 100 is facing the correct direction (in which Y points to the bowler), the negative Y component of the Equation 6 is relatively large and, thus, no change is made in the reference frame.

For example, FIG. 12 shows an example bat path 1200 as projected into the XY plane. The bat path 1200 may correspond to a path of the second end 211 (e.g., the tip or distal end) of the bat 102 in the XY plane. The bat path 1200 may be determined by the angle and orientation tracker 402 (FIG. 4), for example. For example, the angle and orientation tracker 402 may be able to determine a path of the bat 102 in the XYZ reference based on the angle of the bat 102 at each measurement and the length of the bat 102. As shown, the bat path 1200 between the shot start position and the back lift position is entirely in the negative Y direction. Therefore, using Equation 6 would result in a relative large value. However, if the batter 100 changes or switches directions, the negative Y component becomes relatively small or becomes 0, because most (if not all) of the back lift stage is in the positive Y direction. In some examples, the pitch determiner 714 compares the y_negtative_ratio value to a threshold. If the y_negtative_ratio value satisfies the threshold (e.g., is greater than the threshold), the pitch determiner 714 determines the swing is in the correct direction and no changes are made to the reference frame for the other calculations. However, if the y_negtative_ratio value does not satisfy the threshold (e.g., is below the threshold), the pitch determiner 714 determines the swing has been switched and, thus, modifies the XYZ reference frame (e.g., by establishing a new or updated XYZ reference frame). In some examples, the pitch determiner 714 switches the pitch angle by 180°, such that the positive Y direction is facing the bowler. As such, the pitch determiner 714 can detect if a switch has occurred and the reference frame can be reversed automatically and, thus, the swing analyzer 230 does not need to be recalibrated (which can be time consuming and undesired when playing a game, for example).

In some examples, if a switch is detected by the pitch determiner 714 and the reference frame is adjusted, the parameter calculator 702 performs one or more post-processing operations on one or more of the angles previously determined for the swing and/or recalculates the one or more parameters with the updated angles. While the vertical angle θ may be the same, for example, the horizontal angle φ and the face angle φ may change when the direction of the reference frame switches. For example, if the reference frame is correct, then a normal shot start angle has a horizontal angle φ of 0°-90°. However, if the bat 102 is swung in the opposite direction, the horizontal angle φ is −90° to −180. As such, the pitch determiner 714 can automatically detect a change in the pitch angle λ and modify the XYZ reference frame so that the further calculations are correct.

Figure 13:
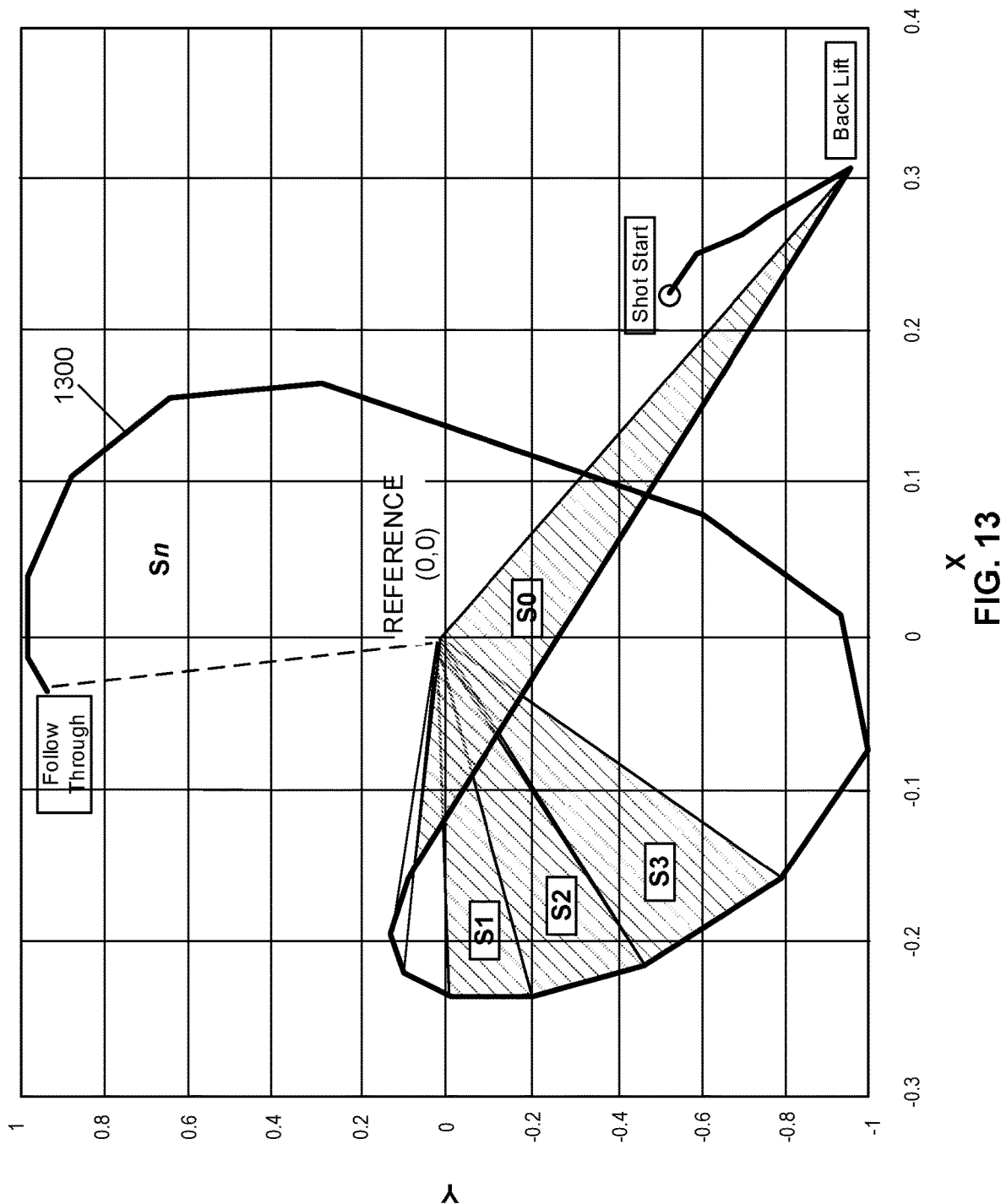
FIG. 13 illustrates an example bat path plotted in the XY plane that may be generated by the example shot type determiner of FIG. 11 and used to determine whether a swing is a horizontal shot or a vertical shot.

Another metric or parameter that may be determined by the swing analyzer 230 is determining whether the swing is a horizontal shot or a vertical shot. FIG. 13 is a block diagram of the example shot type determiner 406 of the swing analyzer 230 (FIGS. 2 and 4) that determines whether the swing is a horizontal shot or a vertical shot. In some examples, the type of shot is used to determine the type of follow-through pattern and/or the follow-through angle, as disclosed in further detail in connection with FIG. 19. A cricket swing, for example, can be categorized as a horizontal shot or a vertical shot. FIG. 12A shows an example motion path of the bat 102 during a horizontal type shot, and FIG. 12B shows an example motion path of the bat 102 during a vertical type shot. In the horizontal type shot of FIG. 12A, the cricket bat 102 remains more horizontal and there is less change in the vertical angle of the bat 102 during the swing. Horizontal type shots may include square, pull, hook, and/or sweep shots. On the other hand, in the vertical type shot of FIG. 12B, there is greater change in the vertical angle of the bat 102 and less change in the horizontal angle during the swing. Vertical type shots may include back foot punch, cover, lofted straight, straight, and/or flick shots.

In some examples, the shot type determiner 406 determines whether the swing is a horizontal shot or a vertical shot based on the change(s) in the vertical angle θ and/or the horizontal angle φ of the bat 102 during the swing. One example technique the shot type determiner 406 may use is to determine the horizontal angle change and the vertical angle change between two points/positions of the swing (as determined by the angle and orientation tracker 402) (e.g., between the back lift position and the follow-through position) and determine which component is the dominant or primary component. For instance, if the swing results in a vertical angle change that is relatively large compared to the horizontal angle change, then the swing is considered a vertical shot. As mentioned above, a vertical type shot typically has a significant change in the vertical angle and only a small change in the horizontal angle. However, if the swing results in a horizontal angle change that is relatively large compared to the vertical angle change, then the swing is considered a horizontal shot.

An example technique the shot type determiner 406 may use to determine whether the swing is a horizontal shot or a vertical shot is an area based technique. In the illustrated example of FIG. 11, the shot type determiner 406 includes a plane plotter 1100 that projects or plots the bat path observed during the swing in the XY plane (e.g., a first plane) between two positions, such as the shot start point and the follow-through point. FIG. 13 shows an example bat path 1300 as projected onto the XY plane that may be plotted using the plane plotter 1100. In some examples, the bat path 1300 may correspond to the path of the second end 211 (FIG. 2) (the tip) of the bat 102 projected onto the XY plane. The bat path 1300 may be determined by the angle and orientation tracker 402 (FIG. 4) and/or the parameter calculator 702 (FIG. 7) based on the movement data from the IMU 218. For example, the angle and orientation tracker 402 may determine the XYZ coordinates of the second end 211 of the bat 102 based on the angle of the bat 102 at each measurement and the length of the bat 102. In other examples, the path of another section or point of the bat 102 may be used as the bat path 1300. In FIG. 13, the shot start, back lift, and follow-through positions/points are labeled. Also labeled is the reference point (X=0, Y=0), which corresponds to the location of the first end 201 of the handle 202 of the bat 102 and where the batter 100 is located and holds the bat 102.

Referring back to FIG. 11, the shot type determiner 406 includes an area calculator 1102 that determines a horizontal area, denoted as D·Area$_{XY}$, for the swing using a right hand rule, meaning that area(s) defined by the bat path in the counter-clockwise direction (in the direction of a person folding their fingers on their right hand with their thumb facing upward) are positive and area(s) defined by the bat path in the clockwise direction (the opposite direction) are negative. For example, the area calculator 1102 may determine the horizontal area D·Area$_{XY}$ by adding the area(s) on the XY plane defined by the bat path 1300 and a reference point (e.g., (X=0, Y=0) where the first end 201 of the handle 202 is located) when the bat path 1300 is moving in the counter-clockwise direction, and subtracting the area(s) on the XY plane defined by the bat path 1300 and the reference point when the bat path 1300 is moving in the clockwise direction between the back lift point and the follow-through or end point. In other words, the area calculator 1102 may calculate the horizontal area D·Area$_{XY}$ by calculating a total area defined by the bat path 1300 and the reference point in the XY plane between the back lift position and the follow-through position and then subtracting, from the total area, the area defined by the are in the XY plane defined by the bat path 1300 an the reference point when the bat path is in the clockwise direction relative to the reference point.

In some examples, the shot type determiner 406 includes a triangle definer 1104 that defines the total area into a plurality of triangles defined by two or more sample points (e.g., adjacent sample points) of the bat path 1300 and the reference point. For example, looking at FIG. 15, the triangle S0 corresponds to the area defined by the back lift point, the next sample point, and the reference point. Further, the triangle S1 corresponds to the area defined between two sample points of the bat path 1500 and the reference point (0, 0), the triangle S2 corresponds to the area defined by one of the points from the triangle S1, the next sample point, and the reference point, and so forth. While only a few example triangles are illustrated, it is understood that more or fewer triangles may be defined by the bat path 1300 and the reference point.

The area calculator 1102 may use Equation 7 below to calculate the horizontal area D·Area$_{XY}$:

$$D\cdot Area_{XY} = \Sigma S_i \qquad \text{Equation 7}$$

The area $S_i$ is defined as the area for a triangle $\Delta_{O b_i b_{i+1}}$ where 0 is the origin or reference point (X=0, Y=0), $b_i$ is the current position (sample point), and $b_{i+1}$ is the next position (sample point). As mentioned above, the sign of the area $S_i$ is determined using the right hand rule for the triangle. For example, in FIG. 13, S0 is defined by the bat path 1300 moving in the clockwise direction relative to the reference point and, thus, is counter to the right hand rule and therefore receives a negative value. On the other hand, S1, S2, etc. are defined by the bat path 1300 moving in the counter-clockwise direction relative to the reference point and, thus, comply with the right hand rule and are given positive values. Therefore, the area calculator 1102 may calculate the horizontal area D·Area$_{XY}$ by adding the areas of the triangles that are defined by the bat path 1300 in the counter-clockwise direction relative to the reference point and subtracting the areas of the triangles that are defined by the bat path 1300 in the clockwise direction relative to the reference point.

In some examples, a comparator 1106 may compare a ratio of the horizontal area D·Area$_{XY}$ to a vertical area, denoted as D·Area$_{YZ}$, which is determined using a similar operation with the bat path defined in the YZ plane (e.g., a second plane), which represents the change in vertical angle. For example, similar to the area defined by the bat path 1300 in XY plane, the plane plotter 1100 may project or plot the bat path in the YZ plane, which is a vertical plane, and the area calculator 1102 may calculate the vertical area D·Area$_{XY}$ defined by the bat path a reference point (Y=0, Z=0) using the right hand rule (e.g., by adding areas defined by the bat path moving in the counter-clockwise direction and subtract areas defined by the bat path moving in the clockwise direction).

In some examples, the comparator 1106 calculates an Area Ratio of the horizontal area D·Area$_{XY}$ to the vertical area D·Area$_{YZ}$ using Equation 8 below:

$$\text{Area Ratio} = \frac{D\cdot Area_{XY}}{D\cdot Area_{YZ}} \qquad \text{Equation 8}$$

The Area Ratio determines whether the horizontal component is dominant or the vertical component is dominant for a given shot. In some examples, the comparator 1106 determines whether the swing is horizontal or vertical based on whether the Area Ratio satisfies a threshold. In some examples, the threshold is 0.754444. For example, if the Area Ratio is greater than 0.754444, then the comparator 1106 determines the swing is a horizontal shot (because the horizontal component is relatively large compared to the vertical component), whereas if the Area Ratio is less than 0.754444, the comparator 1106 determines the swing is a vertical shot (because the vertical component is relatively large compared to the horizontal component). In other examples, another threshold value may be used. While in the illustrated example the shot type determiner 406 uses the area between the back lift and the follow-through positions, in other examples, the area between other positions may be used (e.g., the horizontal and vertical areas between the impact position and the follow-through position). Further, in other examples, the horizontal area D·Area$_{XY}$ or the vertical area D·Area$_{YZ}$ may be compared to a threshold to determine whether the shot is vertical or horizontal.

Another example technique the shot type determiner 406 may use is an angle based technique. In some such examples, the shot type determiner 406 includes an angle determiner 1108 that identifies the horizontal angle change and vertical angle change that occurs from the back lift position to the follow-through position. For example, the angle determiner 1108 determines the ABS sum of the horizontal angle changes between each measurement from the back lift position to the follow-through position, and determines the ABS sum of the vertical angle changes between each measurement from the back lift position to the follow-through position. In some examples, the comparator 1106 compares a ratio of the ABS sum of the horizontal angle change and the ABS sum of the vertical angle change to a threshold. If the ratio satisfies the threshold (e.g., horizontal angle change/vertical angle change exceeds the threshold), the shot is a considered a horizontal shot (because the horizontal angle change is dominant), whereas if the ratio does not satisfy the threshold (e.g., horizontal angle change/vertical angle change is less than the threshold), the shot is considered a vertical shot (because the vertical angle change is dominant). Additionally or alternatively, the shot type determiner 406 may analyze the horizontal and vertical angle changes occurring between other positions of the swing, such as from the shot start position to the follow-through position, from the impact position to the follow-through position, from when the bat changes from Quadrant 1 to Quadrant 2 (as shown and described in connection with FIG. 14), etc. Additionally or alternatively, the shot type determiner 406 may determine the ABS sum of the X component of the location of the bat 102 and/or the ABS sum of the Y component of the location of the bat 102 between the back lift position and the follow-through position. The comparator 1106 may compare one, both, or a ratio of the ABS sum of the X component and the ABS sum of the Y component to a threshold to determine whether the swing is a horizontal shot or a vertical shot.

As another example technique, the shot type determiner 406 may determine whether the swing is a horizontal shot or a vertical shot based on the follow-through angle, which is the vertical angle $\theta$ of the bat 102 at the end of the follow-through stage. For example the angle determiner 1108 may identify the position where the horizontal angle $\phi$ reverses, which indicates the swing is over and the batter 100 is bringing the bat 102 back around. In some examples, the angle determiner 1108 identifies the vertical angle $\theta$ at this point and the comparator 1106 compares the vertical angle $\theta$ to a threshold. If the vertical angle $\theta$ at the end position does not meet the threshold (e.g., is below the threshold), the comparator 1106 may determine the swing is horizontal shot. However, if the vertical angle $\theta$ does meet the threshold (e.g., is at or above the threshold), the comparator 1106 may determine the swing is a vertical shot. Therefore, in some examples, the shot type determiner 406 may only analyze the vertical angle $\theta$ to determine the shot type.

As another example, the comparator 1106 of the shot type determiner 406 may compare the change in vertical angle $\theta$ during the full swing or a portion of the swing to a threshold. If the vertical angle change does not meet the threshold (e.g., is below the threshold), the shot type determiner 406 may determine the swing is horizontal shot. However, if the vertical angle change meets the threshold (e.g., is at or above the threshold), the shot type determiner 406 may determine the swing is a vertical shot. In other examples, the shot type determiner 406 may determine whether the swing is a horizontal shot or a vertical shot using other techniques, including machine learning techniques such as log regression, decision tree, support vector model (SVM), Hidden Markov Model (HMM), as log regression, decision tree, and/or Gaussian mixture model (GMM).

Figure 14:
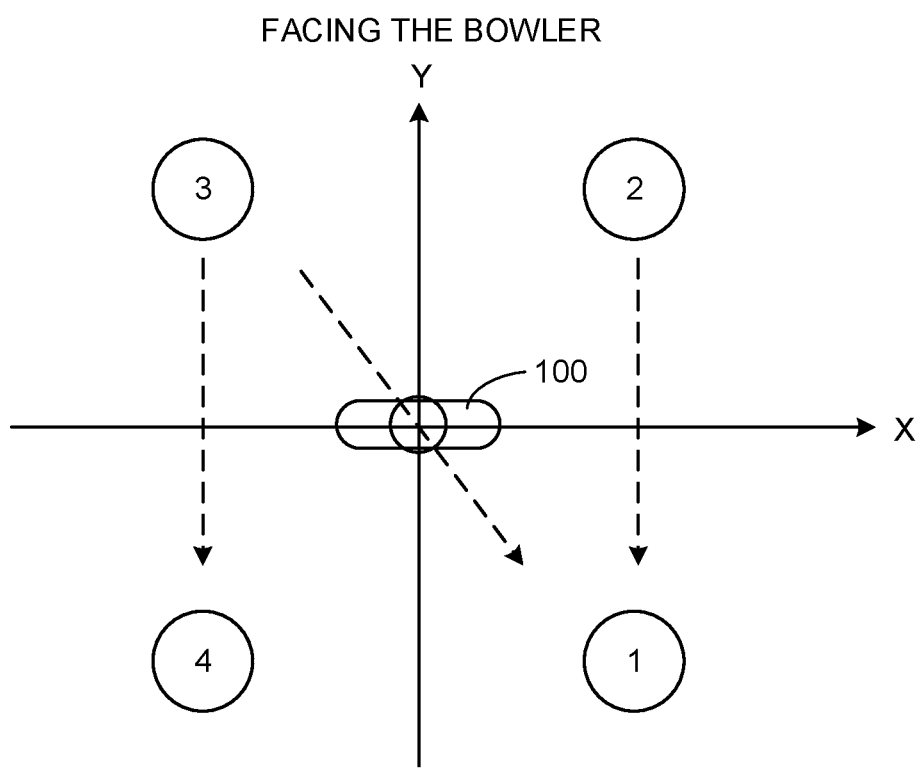
FIG. 14 is an example schematic that may be used to determine whether the example cricket bat of FIG. 2 traveled over a batter's shoulder during a swing.

Another metric or parameter that may be determined by the swing analyzer 230 is whether the bat 102 was swung, during the follow-through stage, over the shoulder of the batter 100. In some examples, this parameter is used to determine the type of follow-through pattern and/or the follow-through angle, as disclosed in further detail herein. This metric or parameter is determined by the bat-over-shoulder determiner 408 (FIG. 4) of the swing analyzer 230. Because the vertical angle $\theta$ is defined between 0° and 180°, it may be important to determine whether the bat 102 is over the batter's shoulder or not when determining the follow-through angle and/or other metrics about the follow-through of the swing. If the bat 102 is over the shoulder, for example, then the follow-through angle may be calculated by: 360°— the original vertical angle at the end of the follow-through stage. FIG. 14 shows an example schematic used to illustrate how the bat-over-shoulder determiner 408 may determine whether the bat 102 was swung over the batter's shoulder. In FIG. 14, the batter 100 is facing the bowler in the direction of the Y axis, which may be the batter's body position during the follow-through stage. The XY plane is divided into four quadrants: Quadrant 1, Quadrant 2, Quadrant 3, and Quadrant 4. The bat-over-shoulder determiner 408 may determine which Quadrant the bat 102 is in based on the horizontal angle $\phi$ (determined by the angle and orientation tracker 402). For example, Quadrant 1 represents a horizontal angle $\phi$ of 0° to 90°, Quadrant 2 represents a horizontal angle $\phi$ of 90° to 180°, Quadrant 3 represent a horizontal angle $\phi$ of 0° to −90°, and Quadrant 4 represent a horizontal angle $\phi$ of −90° to −180°. The bat-over-shoulder determiner 408 determines whether the bat 102 traveled over the shoulder depending on the movement of the bat 102 through Quadrants 1, 2, 3, and/or 4 during the follow-through stage.

For example, a swing typically starts with the bat 102 in Quadrant 1, and the bat 102 usually contacts the ball at around the intersection of Quadrants 1 and 2 (e.g., in front of the batter 100). During the follow-through stage, the bat 102 is sometimes swung into Quadrant 3 (or sometimes through Quadrant 2 to Quadrant 3). Then, the cricket bat 102 may travel from Quadrant 3 into Quadrant 1 (over the right shoulder of the batter 100) or from Quadrant 3 into Quadrant 4 (over the left shoulder of the batter 100). As indicated by the arrows between Quadrant 3 and Quadrant 1 and Quadrant 4, this movement indicates the cricket bat 102 has been swung over the batter's shoulder. As another example, the cricket bat 102 may be swung into Quadrant 2 after or during impact. Then, during the follow-through stage, the bat 102 is sometimes swung from Quadrant 2 back to Quadrant 1 (over the right shoulder of the batter 100). Thus, the bat-over-shoulder determiner 408 determines whether the bat 102 traveled over the shoulder during the follow-through stage depending on the movement of the bat 102 through Quadrants 1, 2, 3 and/or 4.

In some examples, the shot type determiner 406, the bat-over-shoulder determiner 408, and the shot curve determiner 410 determine or calculate one or more metrics relating the motion and/or position of the bat 102 during the swing, and the follow-through determiner 412 determines the type of follow-through pattern and/or the follow-through angle based on or more of the metric(s). In some examples, the follow-through determiner 412 selects a follow-through pattern from a plurality of predefined patterns. For example, there may be nine established follow-through patterns. Based on the one or more metrics calculated by the other blocks, the follow-through determiner 412 can identify with accuracy the type of follow-through pattern performed by the batsman.

As mentioned above, a metric or parameter that may be used to determine the type of follow-through pattern and/or the follow-through angle is the profile or curve of the vertical angle $\theta$ during the swing. FIGS. 15A, 15B, 15C, and 15D illustrate example graphs of vertical angle $\theta$, horizontal angle $\phi$, and face angle $\varphi$ calculated by the angle and orientation tracker 402 for different types of shots. In each of the graphs, the Y axis represents degrees and the X axis represents time (in seconds). The shot start point, back lift point, shot peak point, impact point, and follow-through and shot end point are labeled in each of the graphs (which may be identified by the position and parameter determiner 404). The shot curve determiner 410 of FIG. 4 determines whether the vertical angle $\theta$ follows an 'N' type curve or an 'M' type curve based on the shape of the vertical angle $\theta$ line. In some examples, the shot curve determiner 410 of FIG. 4 determines whether the curve is an 'N' type or an 'M' type based on the number of peaks (crests) and valleys (i.e., local maximums and local minimums) in the vertical angle $\theta$ after the impact point but before the magnitudes of the accelerometer 222 and the gyroscope 224 are less than a threshold (e.g., 0.2). In some examples, an 'N' type curve means the vertical angle $\theta$ includes one peak and one valley after the impact point, while an 'M' type curve means the vertical angle $\theta$ includes two or more peaks and on more valleys after the impact position. The number of peaks and valleys are different for different types of follow-through patterns. This metric may be used to determine the follow-through pattern of the swing.

Figure 15A:
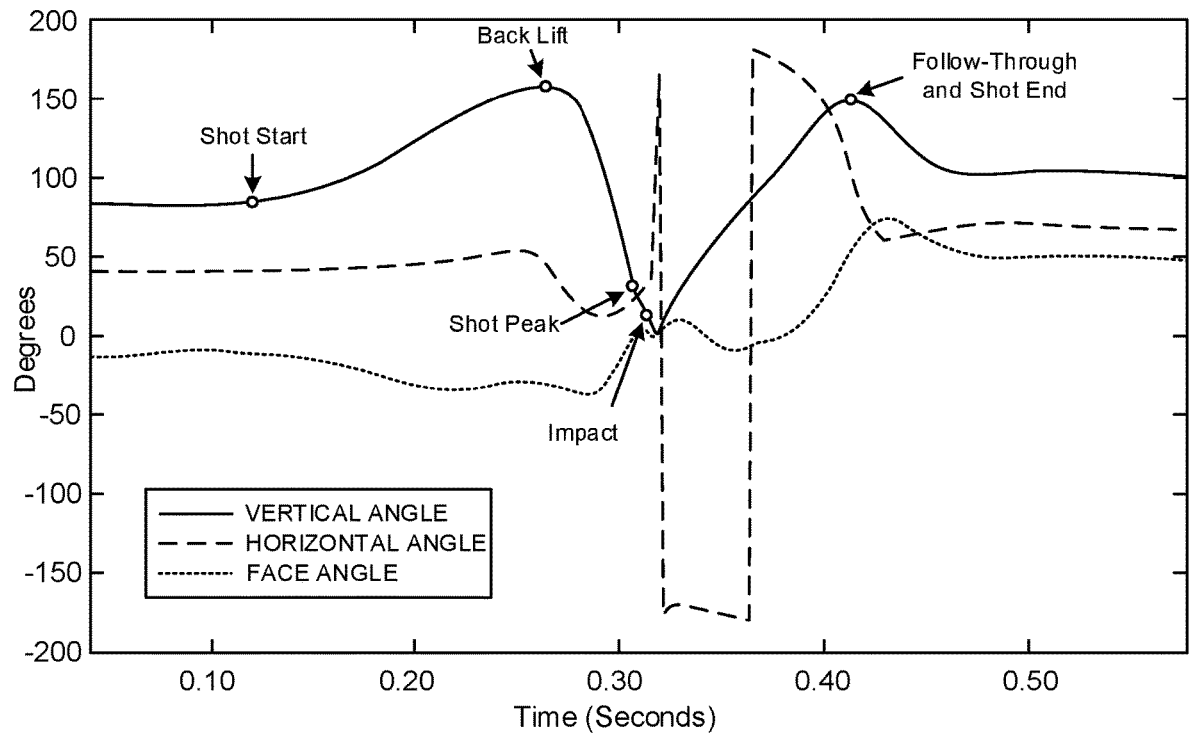
FIGS. 15A, 15B, 15C, and 15D illustrate example graphs of vertical angle, horizontal angle, and face angle during example swings that may be determined by the example swing analyzer of FIG. 2.

FIG. 15A is an example of an 'N' type curve for a vertical shot. If the curve is an 'N' type, the follow-through end point is the maximum position of the vertical angle $\theta$. As can be seen by the vertical angle $\theta$ line, at the shot start point, the batter 100 rotates the bat 102 backwards. In other words, the bat 102 is rotated and lifted upward in the reverse direction, which produces a position change in the vertical angle $\theta$. The back lift point is the peak of the wind up, at which point the batter 100 then swings the bat 102 down toward the ground (decreasing vertical angle $\theta$) to the shot peak and the impact point where the ball is hit. After the impact point, the batter 100 continues to swing the bat 102 upward, which is considered the follow-through stage. The follow-through stage ends at the follow-through and shot end point, which is the maximum vertical angle $\theta$ after the impact. In this example, the vertical angle $\theta$ during the follow-through does not pass 180°. Instead, the bat 102 stops or comes to a rest before 180° vertical. As can been seen in FIG. 15A, the vertical angle $\theta$ measurements form one valley and one peak during after the impact point. Therefore, the shot curve determiner 410 may determine the vertical angle $\theta$ follows an 'N' type curve based on the number of peaks and valleys in the vertical angle $\theta$.

Figure 15B:
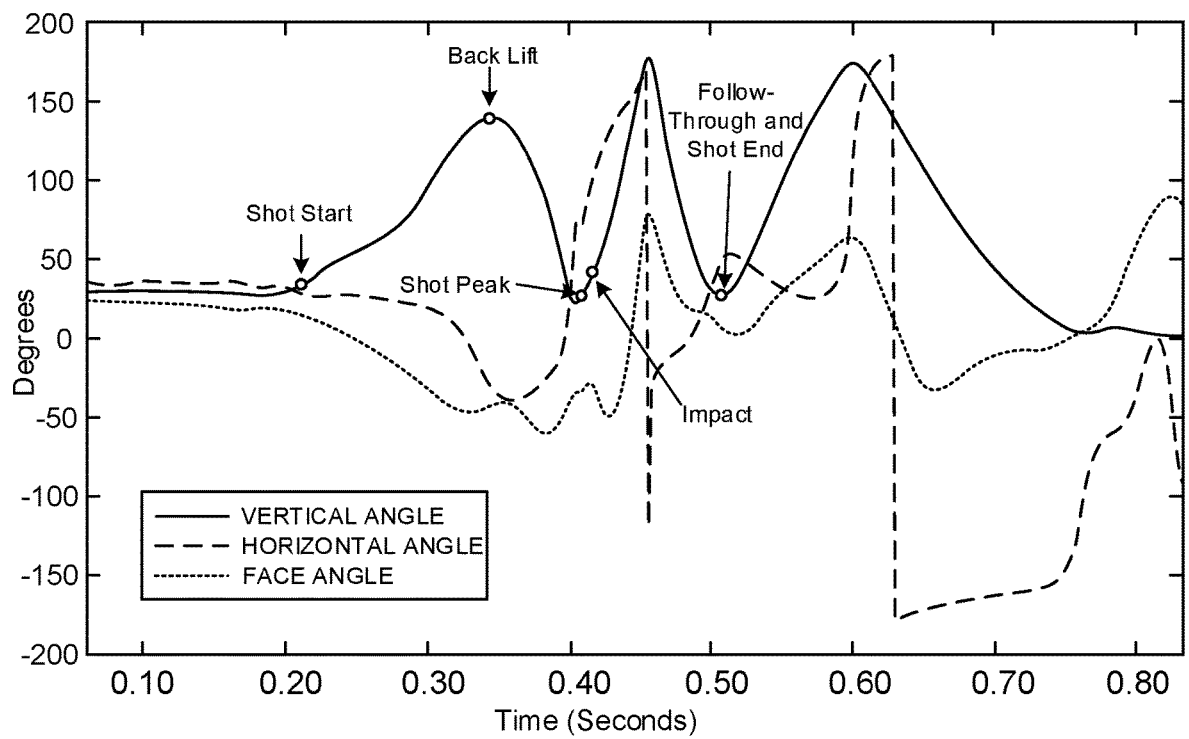

FIG. 15B, on the other hand, is an example of an 'M' type curve for a vertical shot where the bat 102 is swung passed 180° vertical during the follow-through stage. As mentioned above, the vertical angle $\theta$ is measured relative to the Z axis from 0° to 180°. After the shot peak and impact point, the bat 102 continues to rotate upward and passes the 180° vertical position, at which point the vertical angle $\theta$ then decreases from 180°. Then, once the follow-through stage ends, the bat 102 is moved back through the 180° vertical position and back to the ground as the batter 100 lowers the bat 102. This motion through the 180° vertical position in the follow-through and then back through the 180° vertical position as the bat 102 is brought back down is what generates the 'M' shape curve or profile in the vertical angle line. As can be seen in FIG. 15B, the vertical angle $\theta$ measurements form two peaks and one valley during after the impact point. This type of curve or profile is identified by the shot curve determiner 410 as an 'M' type curve.

For an 'M' type curve, such as the graph in FIG. 15B, the follow-through end point is the valley of the M shape, and the follow-through angle can be calculated using: 360°— vertical angle at the valley. For example, in FIG. 15B, the valley of the vertical angle $\theta$ (after the impact) is about 40°. Therefore, the follow-through angle is about 320°. Thus, the batter 100 almost swung the bat 102 in a complete circle from the 0° vertically downward position where the ball was hit.

Figure 15C:
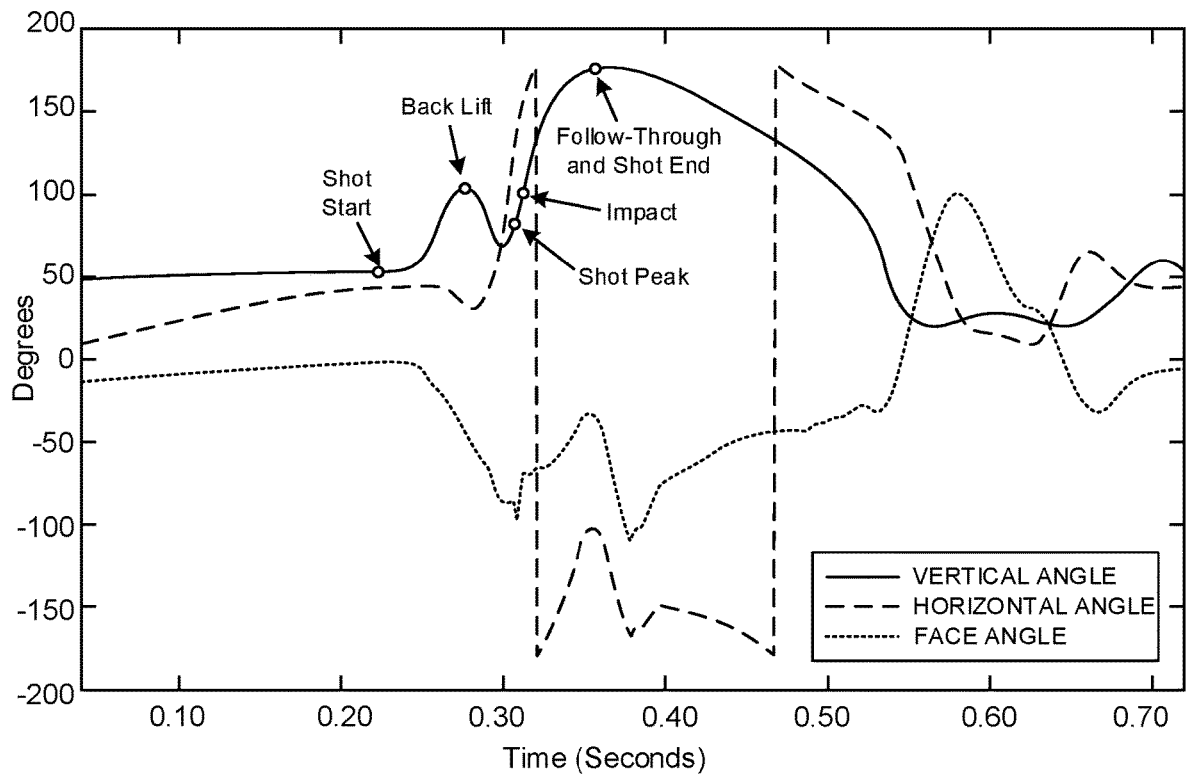
Figure 15D:
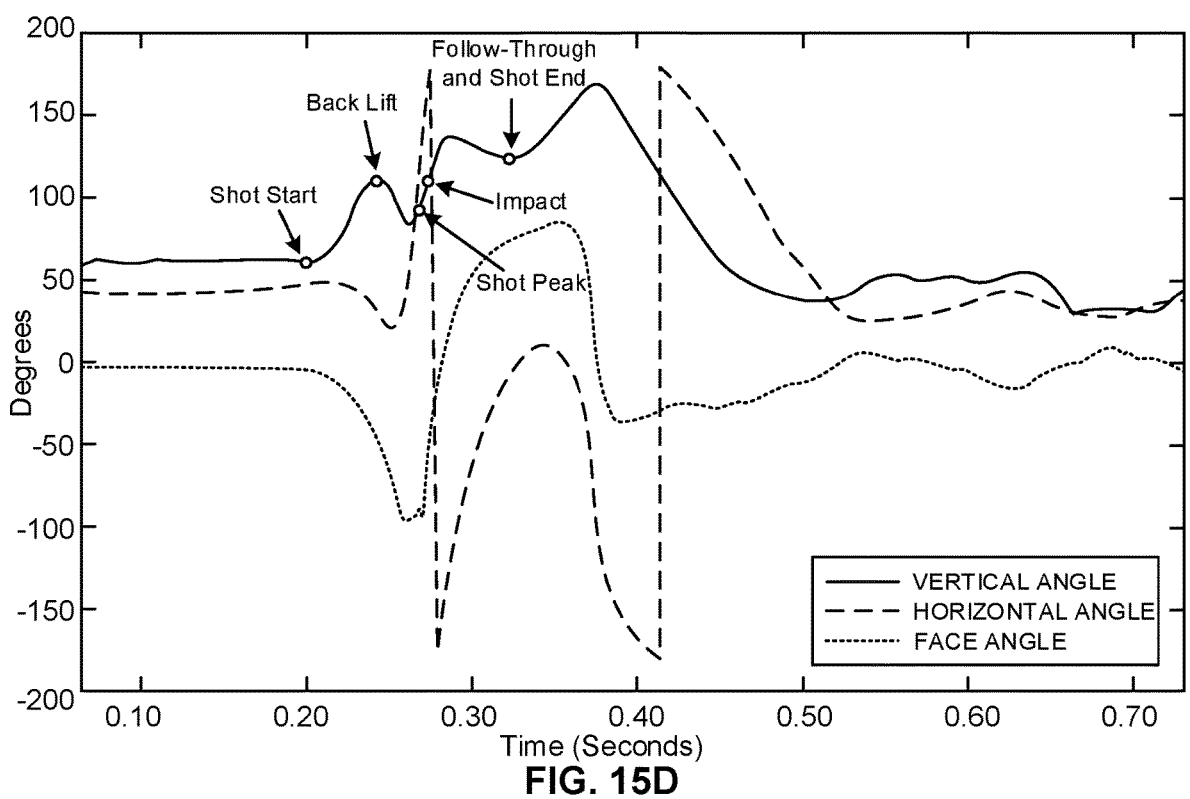

FIG. 15C is an example of an 'N' type curve of a horizontal shot. Similar to the graph of FIG. 15A, the vertical angle $\theta$ line forms one peak and one valley after the impact point (and before the magnitudes of the accelerometer 222 and the gyroscope 224 reach a minimum threshold). As such, the shot curve determiner 410 determines the swing follows an 'N' type curve. FIG. 15D is an example of an 'M' type curve of a horizontal shot. Similar to the graph of FIG. 15A, the vertical angle $\theta$ line forms two peaks and one valley after the impact point (and before the magnitudes of the accelerometer 222 and the gyroscope 224 reach a minimum threshold). As such, the shot curve determiner 410 determines the swing follows an 'M' type curve. While in the example graphs of FIGS. 15A-15D the horizontal angle $\phi$ and the face angle $\varphi$ are included, in other examples, the horizontal angle $\phi$ and the face angle $\phi$ may not be calculated or graphed by the angle and orientation tracker 402.

Referring back to FIG. 4, the follow-through determiner 412 of the swing analyzer 230 determines the type of follow-through pattern and/or the follow-through angle based on the one or more metrics or parameters. For example, the follow-through determiner 412 may determine the type of follow-through pattern based on whether the shot is horizontal shot or vertical shot, whether the bat 102 went over the shoulder, and the type of curve ('N' or 'M') from vertical angle $\theta$, as determined by the shot type determiner 406, the bat-over-shoulder determiner 408, and the shot curve determiner 410, respectively. Thus, the example follow-through determiner 412 determines the type of follow-through pattern based on movement data from the IMU 218.

In some examples, the follow-through determiner 412 determines the type of follow-through pattern from a set of follow-through patterns. For example, Table 1 below is an example table that may be used to identify the type of follow-through pattern based on various combinations of the metrics. The table may be stored in the database 414, for example. In Table 1, there are nine (9) types of follow-through patterns, numbered as Index Positions 1-9. However, in other examples, more or fewer follow-through patterns may be utilized based on different combinations of data. In Table 1, the first column indicates the Index Position or type of follow-through pattern, the second column indicates whether the swing was a vertical shot or a horizontal shot, the third column indicates whether the bat traveled over the batter's shoulder (Y) or not (N), the fourth column indicates whether the vertical angle followed an 'N' type or 'M' type curve, the fifth column indicates the number of peak(s) and valley(s) in the vertical angle after the impact point (and, in some examples, before the magnitudes of the accelerometer 222 and/or the gyroscope 224 are less than a threshold), and the sixth column represents the definition for determining the follow-through angle for the respective Index Position.

TABLE 1

| Index | Shot-Type | Over-the-Shoulder | N or M | Peak + Valley # | Follow-Through Angle Definition |
|---|---|---|---|---|---|
| 1 | Vertical | N | N | ≤2 | Vertical Angle Peak After Impact |
| 2 | Vertical | N | M | ≥3 | Second Vertical Angle Peak After Impact |
| 3 | Vertical | Y | N | 1 (last sample, no true peak found) | 360° - Vertical Angle Peak After Impact (which takes the maximum sample in vertical angle curve) |
| 4 | Vertical | Y | N | 1 (true peak) | 360° - Vertical Angle Valley After Impact (which takes the last minimum sample in vertical angle curve) |
| 5 | Vertical | Y | M | ≥2 | 360° - Vertical Angle Valley After Impact |
| 6 | Horizontal | N | N | ≤2 | Vertical Angle (After Impact) at Horizontal Angle Change Position |
| 7 | Horizontal | N | M | ≥3 | Vertical Angle (After Impact) at Horizontal Change Position |
| 8 | Horizontal | Y | N | 1 | 360° - Vertical Angle (After Impact) at Horizontal Change Position |
| 9 | Horizontal | Y | M | ≥2 | 360° - Vertical Angle Valley After Impact |

As shown in Table 1 above, each of the follow-through patterns is defined by a different combination of horizontal v. vertical, over-the-shoulder, 'N' v. 'M' type curves, and number of peaks and valleys occurring after the impact positions. For example, if the swing is identified as a vertical shot (e.g., determined by the shot type determiner 406), the bat 102 does not travel over the shoulder of the batter 100 (e.g., determined by the bat-over-shoulder determiner 408), the vertical angle θ forms an 'N' type curve (e.g., determined by the shot curve determiner 410), and there is one peak and one valley (e.g., determined by the shot curve determiner 410) after the impact point, the follow-through determiner 412 determines the follow-through of the swing matches the pattern of Index Position 1. FIG. 15A is an example of a swing having the follow-through pattern of Index Position 1. As shown in FIG. 15A, there is one valley and one peak after the impact point. FIG. 15B is an example of a swing having the follow-through pattern of Index Position 5, FIG. 15C is an example of a swing having the follow-through pattern of Index Position 6, and FIG. 15D is an example of a swing having the follow-through pattern of Index Position 9. Thus, different combinations of these metrics may result in different follow-through patterns. In other words, each of the Index Positions represents a different follow-through pattern defined by a certain combination of the metrics.

Further, in some examples, the type of follow-through pattern can be used to identify the follow-through end point in the movement data and determine how to calculate the follow-through angle. For example, the sixth column in Table 1 includes a definition of how to calculate the follow-through angle (i.e., the angle of the bat 102 at the end of the follow-through stage) for each of the different types of follow-through patterns. For example, with the follow-through pattern of Index Position 1, the vertical angle peak after the impact point defines the follow-through, or ending position, angle. Therefore, referring back to FIG. 15A, the follow-through angle would correspond to the vertical angle at the peak (e.g., where the follow-through and shot end point is labeled), around 150°.

As another example, for the follow-through pattern of Index Position 5, the follow-through angle is defined by: 360°—the vertical angle valley after the impact point. For example, looking at FIG. 15B, the valley after the impact point is about 40°. Therefore, in this example, the follow-through angle is about 320°=360°−40°. Thus, the follow-through determiner 412 may calculate the follow-through angle using the associated definition from Table 1.

In some examples, the results of the swing analysis, such as the window of measurements indicative of a valid swing, the determination of whether the swing was an impact shot or an impact-less shot, the key positions and/or stages in the measurements of the window, the angle(s) of the bat 102 at one or more of the positions and/or during one or more of the stages of the swing, the speed of the bat 102 at one or more of the positions and/or during one or more of the stages of the swing, the time to impact, the determination of whether the bat 102 traveled over the shoulder, the determination of whether the swing was a horizontal shot or a vertical shot, the type of follow-through pattern of the swing, the follow-through angle of the swing, etc. are transmitted (e.g., via the transceiver 220) to the electronic device 228. In some examples, the electronic device 228 uses the swing results for bat path generation and shot reconstruction. In some examples, the swing results may be used to identify a type of shot, such square, pull, hook, and sweep, which are examples of horizontal type shots, or back foot punch, cover, lofted straight, straight, and flick, which are examples of vertical type shots. In some examples, the electronic device 228 may include a display screen that presents one or more of the results of the swing analysis to the batter 100 and/or another person. In some examples, presenting the results of the swing analysis can be used for training. For example, certain shot types may be preferred over other types of shots. A batter may learn what type of follow-through swing he/she is using. Further, some shot types have certain angle ranges. As such, a user may determine whether he/she is utilizing the full angle range of the shot type, which can help identify whether the player needs more practice or not. Additionally or alternatively, the results of the swing analysis may be presented to an audience. For example, this information may be broadcast on TV to an audience watching a cricket game after a batter swings, thereby providing the audience with enhanced data and information about the player's abilities.

While an example manner of implementing the swing analyzer 230 of FIG. 2 is illustrated in FIGS. 4, 7, and 11, one or more of the elements, processes and/or devices illustrated in FIGS. 4, 7, and 11 may be combined, divided, re-arranged, omitted, eliminated and/or implemented in any other way. Further, the example calibrator 400, the example angle and orientation tracker 402, the example position and parameter determiner 404, the example shot type determiner 406, the example bat-over-shoulder determiner 408, the example shot curve determiner 410, the example follow-through determiner 412, the multi-layer shot detector 700, the example parameter calculator 702, the example TDPD 704, the example TDIPD 706, the example FDID 708, the example parameter verifier 710, the example pitch determiner 714, the example plane plotter 1100, the example area calculator 1102, the example triangle definer 1104, the example comparator 1106, the example angle determiner 1108, and/or, more generally, the example swing analyzer 230 of FIGS. 4, 7, and 11 may be implemented by hardware, software, firmware and/or any combination of hardware, software and/or firmware. Thus, for example, any of the example calibrator 400, the example angle and orientation tracker 402, the example position and parameter determiner 404, the example shot type determiner 406, the example bat-over-shoulder determiner 408, the example shot curve determiner 410, the example follow-through determiner 412, the multi-layer shot detector 700, the example parameter calculator 702, the example TDPD 704, the example TDIPD 706, the example FDID 708, the example parameter verifier 710, the example pitch determiner 714, the example plane plotter 1100, the example area calculator 1102, the example triangle definer 1104, the example comparator 1106, the example angle determiner 1108, and/or, more generally, the example swing analyzer 230 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example calibrator 400, the example angle and orientation tracker 402, the example position and parameter determiner 404, the example shot type determiner 406, the example bat-over-shoulder determiner 408, the example shot curve determiner 410, the example follow-through determiner 412, the multi-layer shot detector 700, the example parameter calculator 702, the example TDPD 704, the example TDIPD 706, the example FDID 708, the example parameter verifier 710, the example pitch determiner 714, the example plane plotter 1100, the example area calculator 1102, the example triangle definer 1104, the example comparator 1106, and/or the example angle determiner 1108 is/are hereby expressly defined to include a non-transitory computer readable storage device or storage disk such as a memory, a digital versatile disk (DVD), a compact disk (CD), a Blu-ray disk, etc. including the software and/or firmware. Further still, the example swing analyzer of FIGS. 4, 7, and 11 may include one or more elements, processes and/or devices in addition to, or instead of, those illustrated in FIGS. 4, 7, and 11, and/or may include more than one of any or all of the illustrated elements, processes and devices.

Flowcharts representative of example machine readable instructions for implementing the swing analyzer of FIGS. 4, 7, and 11 are shown in FIGS. 16A, 16B, 16C, 17, 18, and 19. In these examples, the machine readable instructions comprise a program for execution by a processor such as the processor 2012 shown in the example processor platform 2000 discussed below in connection with FIG. 20. The program may be embodied in software stored on a non-transitory computer readable storage medium such as a CD-ROM, a floppy disk, a hard drive, a digital versatile disk (DVD), a Blu-ray disk, or a memory associated with the processor 2012, but the entire program and/or parts thereof could alternatively be executed by a device other than the processor 2012 and/or embodied in firmware or dedicated hardware. Further, although the example programs are described with reference to the flowcharts illustrated in FIGS. 16A-19, many other methods of implementing the example swing analyzer 230 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 16A-19 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the terms non-transitory computer readable medium and non-transitory machine readable medium are expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIGS. 16A-19 are flowcharts representative of example machine readable instructions that may be executed by the sensing unit 210 (e.g., via the microprocessor 216) to implement the swing analyzer 230 of FIG. 4 (and further in FIGS. 7 and 11). The example processes of FIGS. 16A-19 are described in connection with the cricket bat 102. However, any of the example processes of FIGS. 16A-19 may likewise be performed in connection with another sports implement, such as a baseball bat, a hockey stick, a golf club, etc.

Figure 16A:
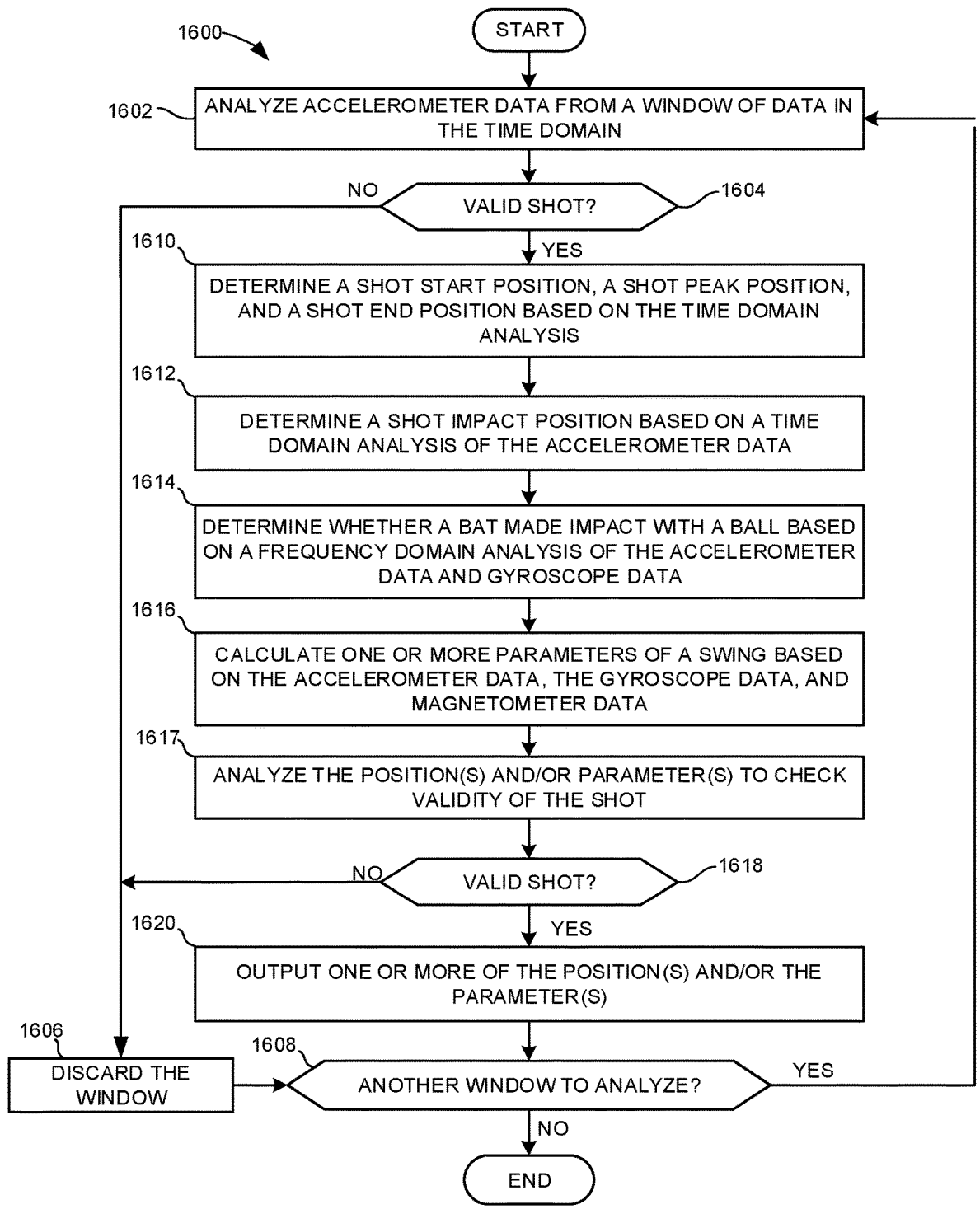
FIG. 16A is a flowchart representative of example machine readable instructions that may be executed to implement the example swing analyzer of FIG. 2 to detect a valid swing of the example cricket bat and determine one or more positions and/or one or more parameters of the swing.

FIG. 16A is a flowchart 1600 representative of example machine readable instructions that may be executed by the sensing unit 210 (e.g., via the microprocessor 216) to implement the example swing analyzer 230 of FIG. 4 to detect a swing and determine one or more positions and/or parameters of a swing. The example process of FIG. 16A may be implemented as least in part by the position and parameter determiner 404 of FIG. 7, for example.

At block 1602, the TDPD 704 receives and analyzes the accelerometer data from a window (e.g., the last 3 seconds, the last 200 measurements, etc.) of previously collected measurements in the time domain. The window contains the measurements from the accelerometer 222, the gyroscope 224, and the magnetometer 226. The TDPD 704 receives the window of data from the IMU 218 and/or the buffer 712, which stores previous measurements from the IMU 218. In some examples, the TDPD 704 analyzes the accelerometer measurements in the window by comparing the accelerometer measurements in the window to one or more of Thresholds 1-5. An example process of applying Thresholds 1-5 at block 1602 is disclosed in connection with FIG. 16B.

At block 1604, the TDPD 704 determines whether the window of accelerometer data is indicative of a valid shot (i.e., an actual swing) as opposed to random movement of the bat 102 that is not considered a valid shot or swing based on the time domain analysis of block 1602. An example process of determining whether a valid shot is contained in a window is disclosed in connection with FIG. 16B. If the TDPD 704 determines the window does not contain data indicative of a valid shot, the TDPD 704 discards (e.g., deletes) the window (at block 1606) and control proceeds to block 1608, where the TDPD 704 determines if another window of accelerometer measurements is received. In some examples, the IMU 218 obtains measurements at a frequency of 100 Hz. In such an example, a new window of data, containing the last 3 seconds of measurements, is obtained every 0.01 seconds. If another measurement is obtained by the IMU 218 and another window is available, control returns to block 1602 and the TDPD 704 analyzes the accelerometer measurements in next window (which are shifted by 0.01 seconds). If no more windows are received (e.g., because the sensing unit 210 is turned off), the example process may end.

Referring back to block 1604, if the TDPD 704 determines the window includes data indicative of a valid shot, the TDPD 704, at block 1610, determines one or more positions (e.g., measurements that correspond to a certain times or sampling indexes) of the swing in the data, such as the shot start position, the shot peak position, and/or the shot end position. In some examples, the TDPD 704 determines the shot start position, shot peak position, and/or shot end position at blocks 1602 and 1604 when the TDPD 704 compares the accelerometer data in the window to Thresholds 1-5 (e.g., at blocks 1622 and 1626 of FIG. 16B). For example, Threshold 1 may be used to identify the shot peak position in the data and Threshold 2 may be used to identify the shot start and shot end positions in the data. The TDPD 704 outputs the one or more position(s) to the TDIPD 706. Therefore, in some examples, the position and parameter determiner 704 provides means for determining the shot start position, shot peak position, and/or shot end position.

At block 1612, the TDIPD 706 analyzes the window of data and determines an impact position in the window based on a time domain analysis of the accelerometer measurements. In some examples, the TDIPD 706 determines the impact position by identifying the largest drop in the accelerometer magnitude after the shot peak position. In other examples, the TDIPD 706 may also use the gyroscope measurements from the window to adjust the impact position. For example, as shown and described in connection with FIG. 8, the TDIPD 706 may adjust the impact position if the drop in the gyroscope magnitude occurs outside of a range (e.g., ±2 measurements) of the drop in the accelerometer magnitude. The TDIPD 706 outputs the impact position (and/or one or more of the previously determined positions) to the FDID 708.

At block 1614, the FDID 708 determines whether the bat 102 (a first sports implement) made impact with the ball 104 (a second sports implement) during the swing based on a frequency domain analysis of the accelerometer measurements and the gyroscope measurements. In some examples, the FDID 708 obtains a window of measurements centered at the impact position (e.g., 16 samples before and after the impact position) and converts the window of measurements into the frequency domain using an FFT or DCT. The FDID 708 may divide the frequency spectrum into two or more components, such as the DC component, the low frequency component, and high frequency component. The FDID 708 calculates the ABS sum of the magnitudes in each of the components for the accelerometer data and/or the gyroscope data. In some examples, the FDID 708 uses one or more of the Ratios 1-4 to determine whether an impact was made. For example, the FDID 708 may compare the resulting value of Ratio 4 to a threshold. If the value satisfies the threshold (e.g., exceeds the threshold, indicating the high frequency component is relatively large compared to the low frequency component), the FDID 708 determines that impact was made. However, if the resulting value dos not satisfy the threshold (e.g., is below the threshold, indicating the high frequency component is relatively low compared to the low frequency component), the FDID 708 determines that no impact was made. The FDID 708 may output the previously determined positions and impact determination to the parameter calculator 702. Thus, in some examples, the FDID 708 may provide means for determining whether the bat 102 made contact with the ball based on one or more of the high frequency signals, the low frequency signals, and/or the DC component of the accelerometer measurements and/or the gyroscope measurements.

In some examples, even if the FDID 708 determines that no impact was made, it may still be desirable to continue with the analysis of the swing. For example, during training, even if no impact is made, it still may be desired to determine one or more positions and/or parameters of the swing to help the player improve his/her swing. However, in other examples, if the FDID 708 determines that no impact was made, the window of data may be discarded at block 1606 and control may proceed to block 1608.

At block 1616, the parameter calculator 702 calculates one or more parameters of the swing based on the accelerometer measurements, the gyroscope measurements, and the magnetometer measurements using the previously determined positions. Example parameters may include the velocity of the bat 102 during one or more phases of the swing and/or at one or more positions of the swing, the angle(s) of the bat 102 (e.g., the vertical angle θ, the horizontal angle φ, and/or the face angle ϕ) during one or more phases of the swing and/or at one or more of the positions of the swing, the time between different positions in the swing (e.g., the time to impact, which is the time from the back lift position to the impact position, the total swing time, etc.), and/or any other parameter of interest. In some examples, the parameter calculator 702 determines the angle(s) based on the angle(s) calculated by the angle and orientation tracker 402 (FIG. 4). In some examples, the parameter calculator 702 further refines (e.g., adjusts) the location of the shot start position and/or the shot end position in the window using the magnetometer measurements in addition to the accelerometer measurements and the gyroscope measurements. In some examples, the parameter calculator 702 determines the back lift position by identifying a maximum vertical angle that occurs after the shot start position.

At block 1617, the parameter verifier 710 receives the position(s) and/or parameter(s) from the parameter calculator 702 and analyzes the position(s) and/or parameters to check the validity of the shot and, at block 1618, determines whether the shot is still valid or not based on the analysis of block 1617. An example process of verifying the validity of a shot at block 1617 is disclosed in connection with FIG. 16C. If the parameter verifier 710 determines the position(s) and/or parameter(s) as previously determined are not indicative of a valid shot, the window is discarded at block 1606 and control proceeds to block 1608. If the parameter verifier 710 determines the position(s) and/or parameter(s) as previously determined are valid or indicative of a valid shot, the parameter verifier 710 outputs the one or more position(s) and/or parameter(s) at block 1620. The position(s) and/or parameter(s) (e.g., the impact position, the determination of whether the bat 102 made impact with the ball, etc.) may be saved in the database 414, used in one or more other analyses by the swing analyzer 230, and/or transmitted via the transceiver 220 to the remote electronic device 228, which may be used to display and/or further analyze the results. Therefore, in some examples, the transceiver 220 provides means for transmitting any of the results of the analysis. At block 1608, the TDPD 704 determines if another window of measurements is received that can be analyzed. If so, control proceeds to block 1602, and the example process begins again. As disclosed herein, in some examples, the IMU 218 obtains measurements at a frequency of 100 Hz. As such, the example process of FIG. 16A may be repeated every 0.01 seconds when a new sample is received from the IMU 218. In other examples, the IMU 218 may obtain measurements at different frequency and/or the analysis may occur at a different time interval. Otherwise, if no more data samples are received, the example process ends.

Figure 16B:
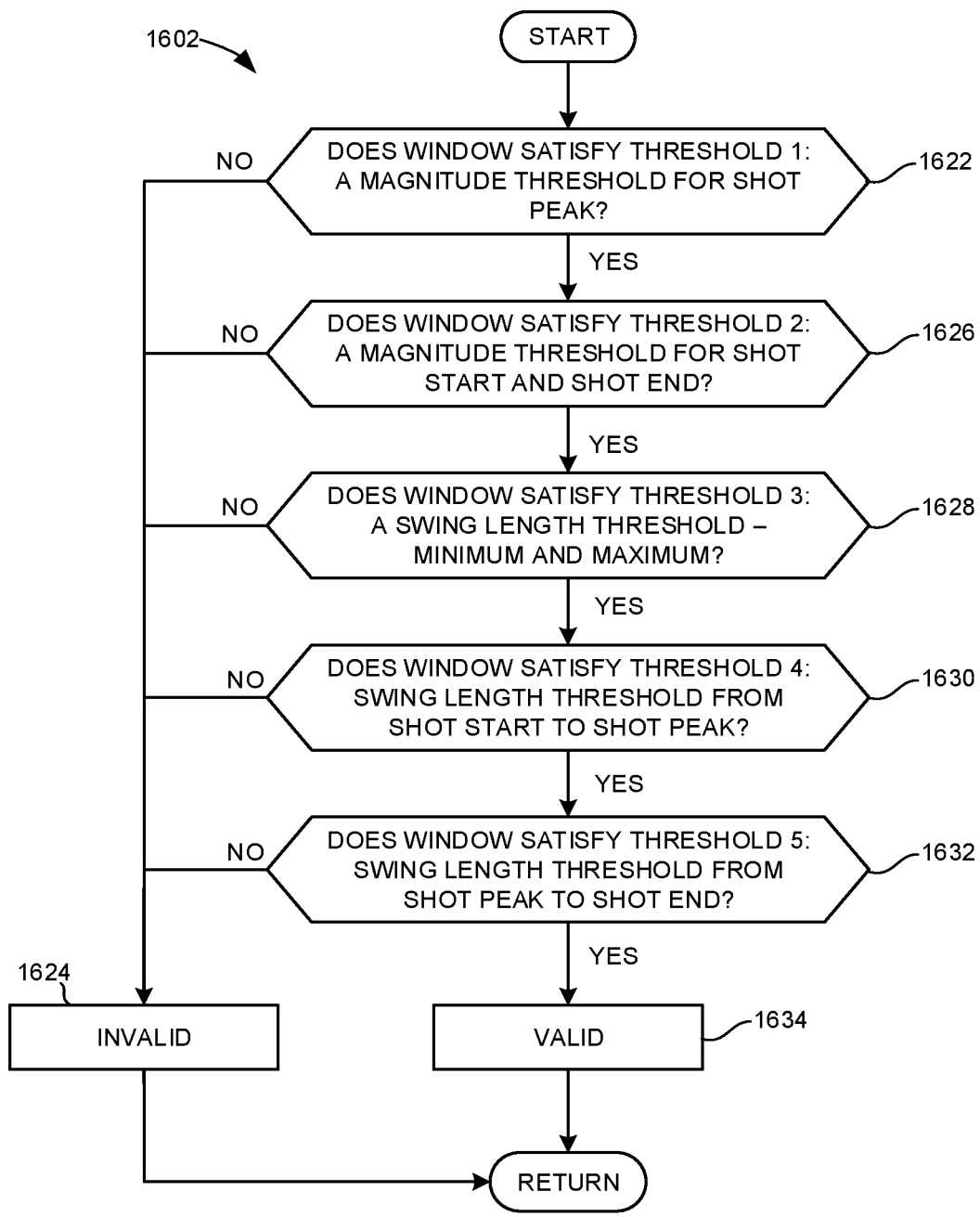
FIG. 16B is a flowchart representative of example machine readable instructions that may be executed to implement the example swing analyzer of FIG. 2 to initially determine whether a window of measurements includes a valid swing and determine one or more positions of the swing and which may be implemented as an operation of the flowchart in FIG. 16A.

FIG. 16B is a flowchart representative of example machine readable instructions that may be executed by the sensing unit 210 (e.g., via the microprocessor 216) to implement block 1602 of FIG. 16A to determine whether a valid shot is contained within a window of measurements. At block 1622, the TDPD 704 compares accelerometer measurements in the window to Threshold 1: a magnitude threshold for shot peak. If the measurements in the window do not satisfy Threshold 1 (e.g., the measurements do not exceed a magnitude threshold for shot peak), the TDPD 704 determines the window is invalid, at block 1624, and the result is returned to block 1604 of FIG. 16A. If the measurements in the window do satisfy Threshold 1 (e.g., a measurement in the accelerometer data is above the magnitude threshold for shot peak), the TDPD 704 identities the measurement corresponding to the shot peak position and control proceeds to block 1626.

At block 1626, the TDPD 704 compares the accelerometer measurements in the window to Threshold 2: a magnitude threshold for shot start and shot end. If the measurements in the window do not satisfy Threshold 2 (e.g., the measurements exceed a magnitude threshold for shot start or shot end), the TDPD 704 determines the window is invalid, at block 1624, and the result is returned to block 1604 of FIG. 16A. If the measurements in the window do satisfy Threshold 2 (e.g., the measurements in the accelerometer data are below a magnitude threshold for shot start and shot end), the TDPD 704 identities the measurements corresponding to the shot start and shot end positions, and control proceeds to block 1628.

At block 1628, the TDPD 704 compares the time between the shot start position and the shot end position in the window to Threshold 3: a magnitude threshold for shot start and shot end—minimum and maximum. If the time between the shot start position and the shot end position does not satisfy Threshold 3 (e.g., is outside of a range (minimum and maximum)), the TDPD 704 determines the window is invalid, at block 1624, and the result is returned to block 1604 of FIG. 16A. If the time between the shot start position and the shot end position does satisfy Threshold 3 (e.g., is inside of a range (minimum and maximum)), control proceeds to block 1630.

At block 1630, the TDPD 704 compares the time between the shot start position and the shot peak position in the window to Threshold 4: a swing length threshold from start to peak. If the time between the shot start position and the shot peak position does not satisfy Threshold 4 (e.g., the time between the shot start position and the shot peak position exceeds a threshold time), the TDPD 704 determines the window is invalid, at block 1624, and the result is returned to block 1604 of FIG. 16A. If the time between the shot start position and the shot peak position does satisfy Threshold 4 (e.g., the time between the shot start position and the shot peak position is less than the threshold), control proceeds to block 1632.

At block 1632, the TDPD 704 compares the time between the shot peak position to the shot end position in the window to Threshold 5: a swing length threshold from peak to end. If the time between the shot peak position and the shot end position does not satisfy Threshold 5 (e.g., the time between the shot peak position and the shot end position exceeds a threshold), the TDPD 704 determines the window is invalid, at block 1624, and the result is returned to block 1604 of FIG. 16A. If the time between the shot peak position and the shot end position does satisfy Threshold 5 (e.g., the time between the shot peak position and the shot end position is less than the threshold), the TDPD 704 determines the window is valid, at block 1634, and the result is returned to block 1604 of FIG. 16A. Therefore, in this example, a window is determined to include a valid shot if all of Thresholds 1-5 are satisfied.

While in this example the TDPD 704 applies the thresholds in sequence from 1-5, in other examples, one or more of the Thresholds 1-5 may be applied in a different order or simultaneously to each other. In still other examples, more or fewer thresholds may be applied. For example, only Thresholds 1-3 may be applied. In some examples, even if one or more of the thresholds fails, the TDPD 704 may determine the window contains a valid shot.

Figure 16C:
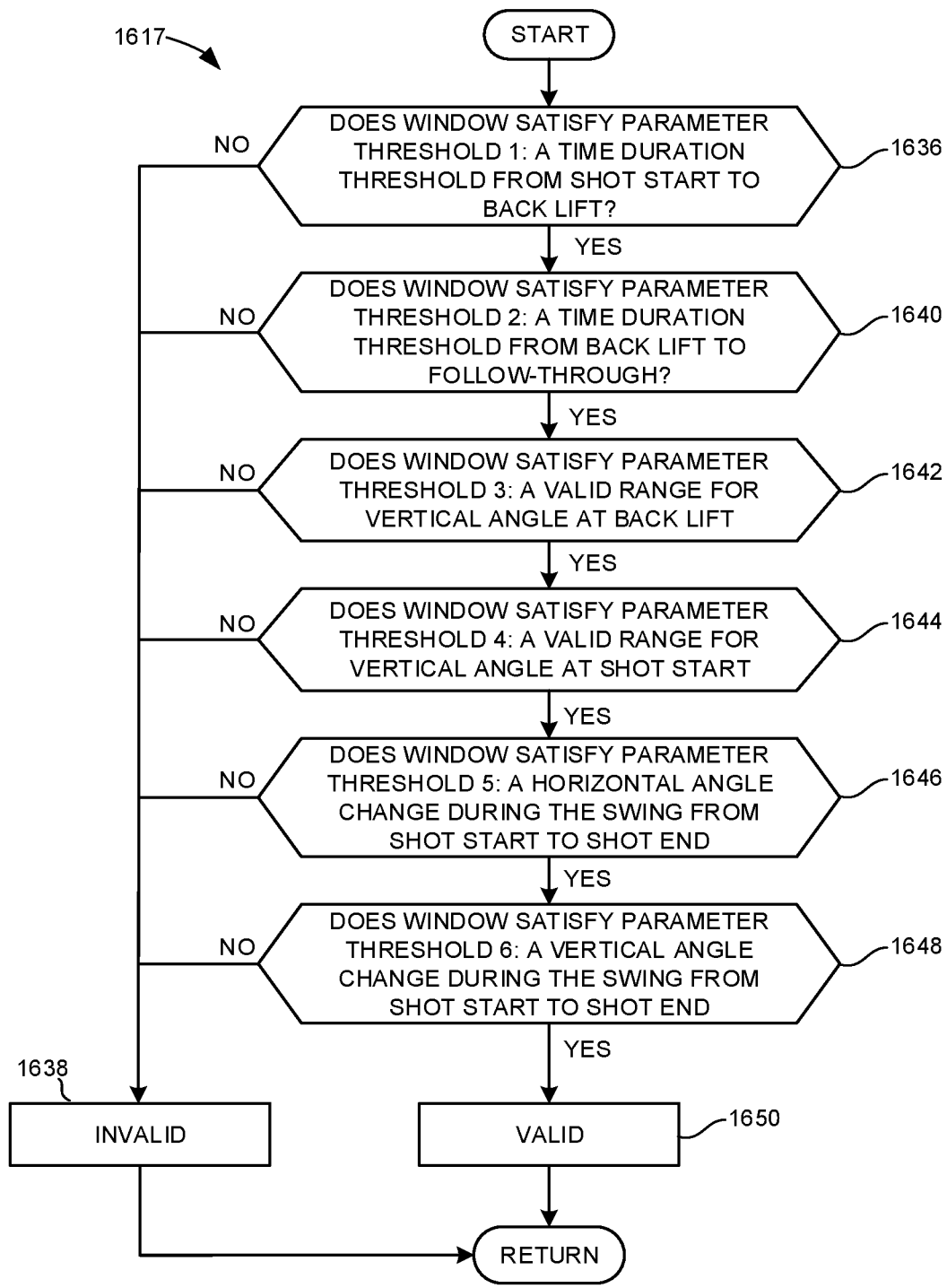
FIG. 16C is a flowchart representative of example machine readable instructions that may be executed to implement the example swing analyzer of FIG. 2 to confirm or verify a window of measurements includes a valid swing and which may be implemented as an operation of the flowchart of FIG. 16A.

FIG. 16C is a flowchart representative of example machine readable instructions that may be executed by the sensing unit 210 (e.g., via the microprocessor 216) to implement block 1617 of FIG. 16A to verify whether a valid shot is still contained within a window of measurements. The parameter verifier 710 verifies whether a valid shot is contained in the window by comparing the previously determined parameters of the window of measurements to one or more parameter thresholds. For example, at block 1636, the parameter verifier 710 compares the time duration between the shot start position and the back lift position in the window to Parameter Threshold 1: a time duration threshold from the shot start position to the back lift position. If the time duration does not satisfy Threshold 1 (e.g., the time duration does not exceed Parameter Threshold 1, is outside of a threshold range, etc.), the parameter verifier 710 determines the window is invalid, at block 1638, and the result is returned to block 1618 of FIG. 16A. If the time duration does satisfy Parameter Threshold 1 (e.g., the time duration does exceed Parameter Threshold 1, is within a range, etc.), control proceeds to block 1640.

At block 1640, the parameter verifier 710 compares the time duration between the shot start position and the back lift position in the window to Parameter Threshold 2: a time duration threshold from the back lift position to the follow-through position. If the time duration does not satisfy Threshold 1 (e.g., the time duration does not exceed Parameter Threshold 2, is outside of a threshold range, etc.), the parameter verifier 710 determines the window is invalid, at block 1638, and the result is returned to block 1618 of FIG. 16A. If the time duration does satisfy Parameter Threshold 2 (e.g., the time duration does exceed Parameter Threshold 2, is within a range, etc.), control proceeds to block 1642.

At block 1642, the parameter verifier 710 compares the vertical angle θ at the back lift position in the window to Parameter Threshold 3: a valid range for vertical angle θ at the back lift position. Parameter Threshold 3 may be, for example, greater than about 60°. In other examples, Parameter Threshold 3 may be a greater or smaller angle. If the vertical angle θ at the back lift position does not satisfy Parameter Threshold 3 (e.g., the vertical angle θ at the back lift position is less than 60°), the parameter verifier 710 determines the window is invalid, at block 1638, and the result is returned to block 1618 of FIG. 16A. If the vertical angle θ at the back lift position does satisfy Parameter Threshold 3 (e.g., the vertical angle θ at the back lift position is greater than 60°), control proceeds to block 1644.

At block 1644, the parameter verifier 710 compares the vertical angle θ at the shot start position in the window to Parameter Threshold 4: a valid range for vertical angle θ at the shot start position. Parameter Threshold 4 may be, for example, less than or equal to about 90°. In other examples, Parameter Threshold 4 may be a greater or smaller angle. If the vertical angle θ at the shot start position does not satisfy Parameter Threshold 4 (e.g., the vertical angle θ at the shot start position is greater than 90°), the parameter verifier 710 determines the window is invalid, at block 1638, and the result is returned to block 1618 of FIG. 16A. If the vertical angle θ at the shot start position does satisfy Parameter Threshold 4 (e.g., the vertical angle θ at the shot start position is less than or equal to about 90°), control proceeds to block 1646.

At block 1646, the parameter verifier 710 compares the change in horizontal angle ϕ during the swing between the shot start position and the shot end position in the window to Parameter Threshold 5: a horizontal angle change during the swing from the shot start position to the follow-through and shot end position. If the change in horizontal angle ϕ during the swing does not satisfy Parameter Threshold 5 (e.g., the change in horizontal angle ϕ is less than a threshold), the parameter verifier 710 determines the window is invalid, at block 1638, and the result is returned to block 1618 of FIG. 16A. If the change in horizontal angle ϕ during the swing does satisfy Parameter Threshold 5 (e.g., the change in horizontal angle ϕ is greater than or equal to the threshold), control proceeds to block 1648.

At block 1648, the parameter verifier 710 compares the change in vertical angle θ during the swing between the shot start position and the shot end position in the window to Parameter Threshold 6: a vertical angle change during the swing from the shot start position to the follow-through and shot end position. If the change in vertical angle θ during the swing does not satisfy Parameter Threshold 6 (e.g., the change in vertical angle θ is less than a threshold), the parameter verifier 710 determines the window is invalid, at block 1638, and the result is returned to block 1618 of FIG. 16A. If the change in vertical angle θ during the swing does satisfy Parameter Threshold 6 (e.g., the change in vertical angle θ exceeds the threshold), the parameter verifier 710 determines the window of measurements is still a valid shot, at block 1650, and the result is returned to block 1618 of FIG. 16A. Therefore, in this example, if one or more of the thresholds are not satisfied, the parameter verifier 710 determines the window does not contain a valid shot. In other examples, the parameter verifier 710 may determine the shot is still valid even if a few of the thresholds are not satisfied. In other examples, more or fewer thresholds or criteria may be used.

Figure 17:
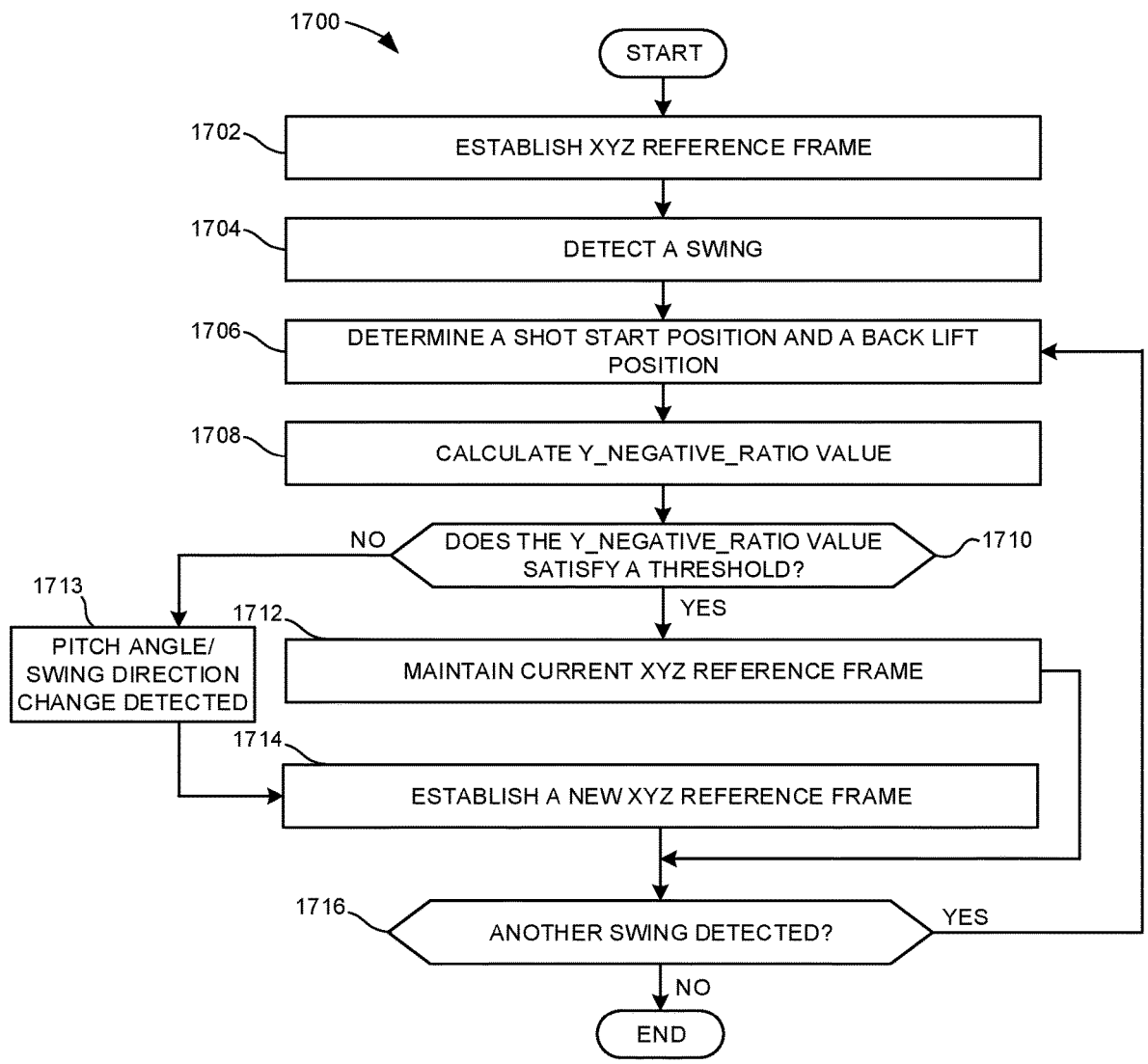
FIG. 17 is a flowchart representative of example machine readable instructions that may be executed to implement the example swing analyzer of FIG. 2 to determine if a pitch angle, corresponding to a swing direction, has changed.

FIG. 17 is a flowchart 1700 representative of example machine readable instructions that may be executed by the sensing unit 210 (e.g., via the microprocessor 216) to implement the example swing analyzer of FIG. 4 to detect when the pitch angle λ has changed. The example process of FIG. 17 may be implemented as least in part by the pitch determiner 714 of FIG. 7, for example.

At block 1702, the calibrator 400 establishes an XYZ reference frame (e.g., a first reference frame) based on the pitch angle λ, which is the horizontal angle between Earth's magnetic north and the direction from the batter to the bowler. The pitch angle λ may be determined via a manual calibration process a user performs before using the sensing unit 210 (e.g., by pointing the bat 102 toward the bowler and detecting, via the magnetometer 226, the direction relative to North). In some examples, the XYZ reference fame is established such that the Y axis is aligned with the pitch angle λ, so that positive Y points toward the bowler or ball (as shown in FIGS. 5A and 5B, for example), and negative Y points in the opposite direction. Using this reference frame, the swing analyzer 230 may detect a swing and/or determine one or more positions and/or parameters of a swing as disclosed in accordance with the teachings of this disclosure. Therefore, in some examples, the calibrator 400 provides means for establishing a reference frame for the bat 102.

At blocks 1704 and 1706, the position and parameter determiner 404 detects a swing and determines the shot start position and the back lift position. An example process in which the position and parameter determiner 404 may detect a swing and determine one or more positions in a swing is disclosed in connection with FIG. 16A. Therefore, in some examples, the position and parameter determining 404 provides means for determining a shot start position and a back lift position in a window of measurements.

At block 1708, the pitch determiner 714 calculates the y_negtative_ratio value using Equation 6, which compares the ABS sum of the negative Y values of the location of the bat 102 to the ABS sum of all of the Y values of the location of the bat 102 (determined at each data sample) occurring between the shot start position and the back lift position. Therefore, in some examples, the pitch determiner 714 provides means for calculating a Y negative ratio.

At block 1710, the pitch determiner 714 compares the y_negtative_ratio value to a threshold and determines whether the y_negtative_ratio value satisfies the threshold. If the batter 100 is facing the correct direction (in which the Y axis is aligned with the pitch angle λ), for example, the y_negtative_ratio value may be relatively large because a larger portion of the back swing occurs in the negative Y direction. However, if the batter 100 is facing the opposite direction (e.g., when the teams switch batting sides), the y_negtative_ratio value may be relatively small because a larger portion of the back swing occurs in the positive Y direction. If the y_negtative_ratio value satisfies the threshold (e.g., exceeds the threshold), the pitch determiner 714, at block 1712, maintains the same XYZ reference frame using the same pitch angle λ, and no change is made. However, if the y_negtative_ratio value does not satisfy the threshold (e.g., is below the threshold), the pitch determiner 714, at block 1713, detects the pitch angle and the swing direction have changed and, at block 1714, establishes a new XYZ reference frame (e.g., a second reference frame). Therefore, in some examples, the pitch determiner 714 provides means for determining whether to modify a reference frame based on a comparison of a Y negative ratio value to a threshold. In some examples, the pitch determiner 714 establishes a new XYZ reference frame by rotating the first XYZ reference frame 180° (about the Z axis), such that the positive Y direction is facing is in the opposite direction as in the original XYZ reference frame. This new XYZ reference frame may be saved in the database 414 and used in one or more of the other analyses disclosed herein. Thus, in some examples, the pitch determiner 714 provides means for establishing a second reference.

After determining whether to maintain or modify the XYZ reference frame, the position and parameter determiner 404, at block 1716, determiners whether another swing is detected. If another swing is detected, control proceeds to block 1706, and the example process may begin again. Otherwise, the example process ends.

Figure 18:
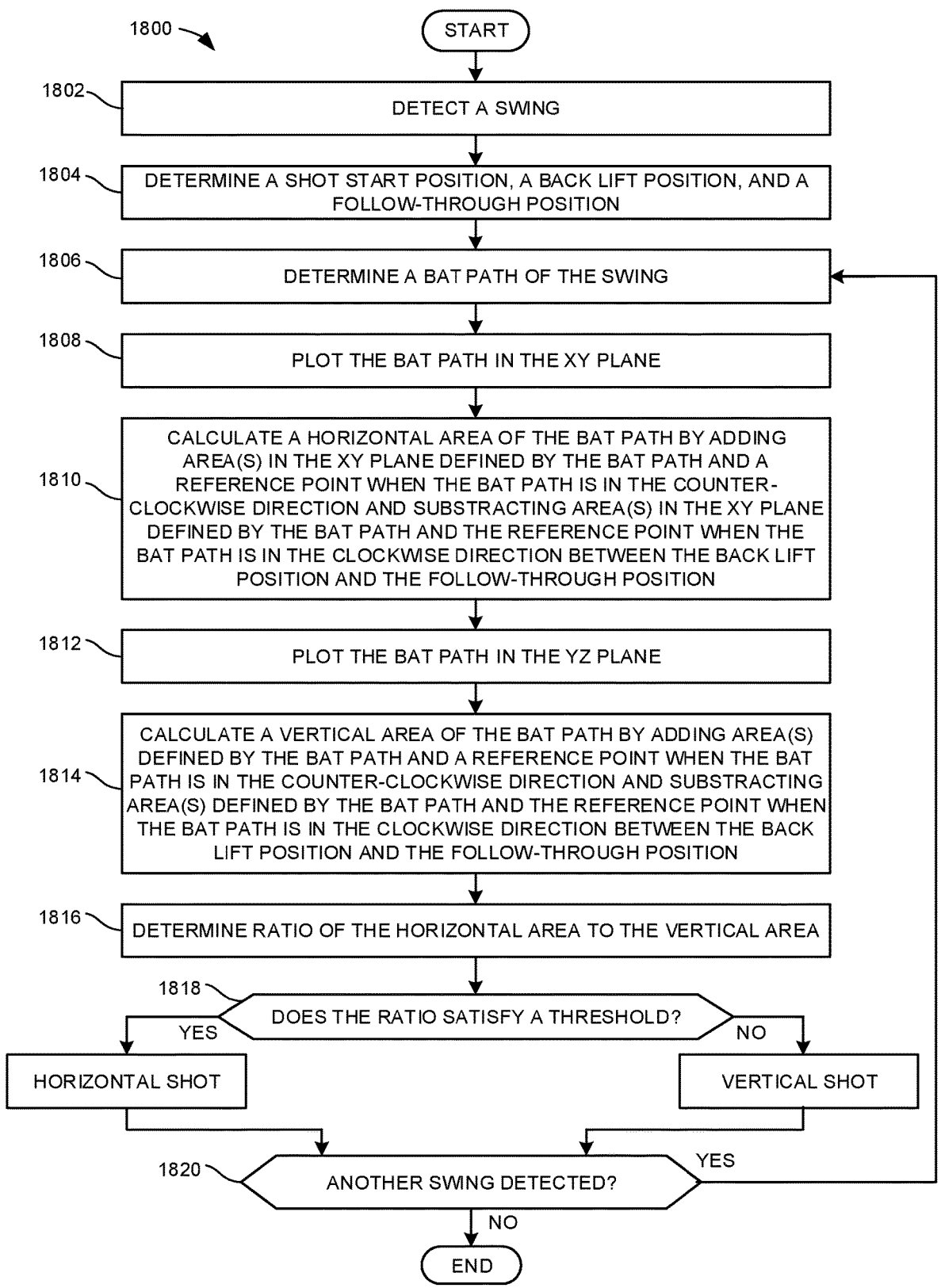
FIG. 18 is a flowchart representative of example machine readable instructions that may be executed to implement the example swing analyzer of FIG. 2 to determine whether a swing of the example cricket bat is a vertical shot or a horizontal shot.

FIG. 18 is a flowchart 1800 representative of example machine readable instructions that may be executed by the sensing unit 210 (e.g., via the microprocessor 216) to implement the example swing analyzer of FIG. 4 to determine whether a swing is a horizontal shot or a vertical shot. The example process of FIG. 18 may be implemented as least in part by the shot type determiner 406 of FIG. 11, for example.

At blocks 1802 and 1804, the position and parameter determiner 404 detects a swing and determines the back lift position and the follow-through or shot end position. An example process in which the position and parameter determiner 404 may detect a swing and determine one or more positions in a swing is disclosed in connection with FIG. 16A. Thus, in some examples, the position and parameter determining 404 provides means for determining a back lift position and a follow-through position of a swing.

At block 1806, the angle and orientation tracker 402 determines a bat path of the swing based on the angle and location of the bat 102 (in the XYZ reference frame) through the swing. Thus, in some examples, the angle and orientation tracker 402 provides means for determining a bat path. While the path is referred to herein as a bat path, the path may be associated with another type of sports implement, such as a golf club, a hockey stick, etc. At block 1808, the plane plotter 1100 plots the bat path of the swing in the XY plane (e.g., as shown in FIG. 13). At block 1810, the area calculator 1102 calculates the horizontal area D·Area$_{XY}$ of the bat path by adding the area(s) in the XY plane defined by the bat path 1300 and the reference point when the bat path 1300 is in the counter-clockwise direction, and subtracting the area(s) in the XY plane defined by the bat path 1300 and the reference point when the bat path 1300 is in the clockwise direction between the back lift point and the follow-through or end point. In some examples, the shot type determiner 406 uses the triangle definer 1104 to divide the area(s) defined by the bat path (occurring between the back lift position and the follow-through position) and the reference point into a plurality of triangles. Then, the area calculator 1102 may use Equation 7, for example, which adds the area(s) of the triangle(s) defined when the bat path is in the counter-clockwise direction around the reference point and subtracts the area(s) of the triangle(s) defined when the bat path is in the clockwise direction. Therefore, in some examples, the area calculator 1102 provides means for calculating a horizontal area and/or the triangle definer 1104 provides means for dividing an area into a plurality of triangles.

At block 1812, the plane plotter 1100 similarly plots the bat path in the YZ plane. Therefore, in some examples, the plane plotter 1100 provides means for plotting a projection of a path of a swing in a first plane (e.g., a substantially horizontal plane such as the XY plane) and in a second plane (e.g., a substantially vertical plane such as the YZ plane). At block 1814, the area calculator 1102 calculates the vertical area D·Area$_{YZ}$ of the bat path, similar to calculating the horizontal area D·Area$_{XY}$, by adding the area(s) in the YZ plane defined by the bat path and the reference point when the bat path is in the counter-clockwise direction, and subtracting the area(s) in the YZ plane defined by the bat path and the reference point when the bat path is in the clockwise direction between the back lift point and the follow-through or end point. Therefore, in some examples, the area calculator 1102 provides means for calculating a vertical area.

At block 1816, the comparator 1106 determines the Area Ratio (e.g., using Equation 8) of the horizontal area D·Area$_{XY}$ to the vertical area D·Area$_{YZ}$. The Area Ratio is representative of whether the horizontal component of the swing is dominant or the vertical component of the swing is dominant for a given shot. At block 1818, the comparator 1106 may compare the Area Ratio to a threshold to determine whether the swing is a horizontal shot or a vertical shot. In some examples, the threshold is 0.754444. In other another threshold may be used. In some examples, if the Area Ratio satisfies the threshold (e.g., the Area Ratio exceeds the threshold), the comparator 1106 may determine the swing to be a horizontal shot, whereas if the Area Ratio does not satisfy the threshold (e.g., the Area Ratio is below the threshold), the comparator 1106 determines the swing to be a vertical shot. Therefore, in some examples, the comparator 1106 provides means for determining a ratio of a horizontal area and a vertical area and means for determining whether the swing corresponds to a horizontal swing or a vertical swing.

In some examples, the shot type determiner 406 outputs final determination of whether the shot is a horizontal shot or a vertical shot, which may be saved in the memory 414, used in one or more other analyses (disclosed in further detail here) and/or transmitted to the remote electronic device 228 via the transceiver 220. Therefore, in some examples, the transceiver 220 provides means for transmitting the results.

At block 1820, the position and parameter determiner 404 determines whether another swing is detected. If another swing is detected, control proceeds to block 1804, and the example process may begin again. Otherwise, the example process ends.

Figure 19:
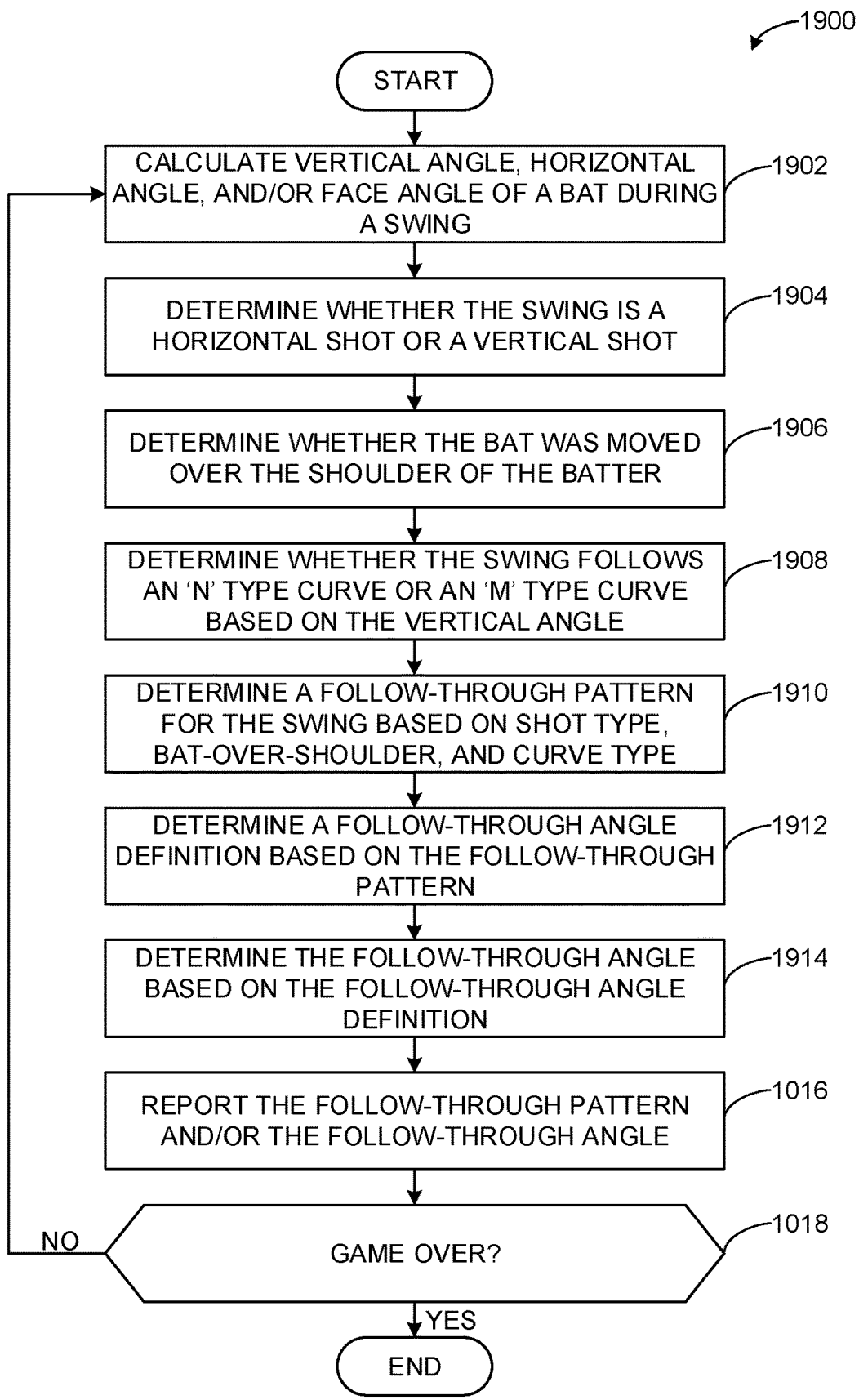
FIG. 19 is a flowchart representative of example machine readable instructions that may be executed to implement the example swing analyzer of FIG. 2 to determine a follow-through pattern and/or a follow-through angle of a swing of the example cricket bat.

FIG. 19 is a flowchart 1900 representative of example machine readable instructions that may be executed by the sensing unit 210 (e.g., via the microprocessor 216) to implement the example swing analyzer of FIG. 4 to determine a follow-through pattern and/or a follow-through angle of a swing of the example cricket bat.

At block 1902, the angle and orientation tracker 402 calculates the vertical angle θ, the horizontal angle φ, and/or the face angle φ of the bat 102 during the swing. In some examples, the angle and orientation tracker 402 calculates the vertical angle θ, the horizontal angle φ, and/or the face angle φ based on the movement data from the IMU 218, including measurements from the accelerometer 222, the gyroscope 224, and/or the magnetometer 226. In some examples, the angle(s) are calculated at a sampling rate of 100 HZ. In other examples, the angle(s) may be calculated at a higher or lower sampling rate. Therefore, the angle and orientation tracker 402 provides means for determining at least one of the vertical angle θ, the horizontal angle φ, or the face angle φ of the bat 102 during a swing based on the movement data. In some examples, the position and parameter determiner 404 identifies the various key point(s) (e.g., shot start point, back lift point, etc.) and/or stage(s) (e.g., wind up, forward swing, follow-through, etc.) in the angle data based on the measurements from the IMU 218. An example process in which the position and parameter determiner 404 may detect determine one or more positions in a swing is disclosed in connection with FIG. 16A.

At block 1904, the shot type determiner 406 determines whether the swing is a horizontal shot or a vertical shot. In some examples, the shot type determiner 406 determines whether the swing is a horizontal shot or a vertical shot based on whether the change in vertical angle θ or horizontal angle φ is larger during the swing or a portion of the swing. An example process in which the shot type determiner 406 using the area based techniques to determine whether a swing is a horizontal shot or a vertical shot is disclosed in connection with FIG. 18. In other examples, other techniques may be implemented by the shot type determiner 406. Therefore, the shot type determiner 406 provides means for determining whether the swing is a vertical shot or a horizontal shot.

At block 1906, the bat-over-shoulder determiner 408 determines whether the bat 102 was moved, during the follow-through stage, over the shoulder over the batter 100. In some examples, the bat-over-shoulder determiner 408 analyzes the angle and orientation data from the angle and orientation tracker 402 to determine the path of movement of the bat 102 during the follow-through. For example, referring briefly to FIG. 14, the bat-over-shoulder determiner 408 may determine the bat 102 was moved over the batter's shoulder if the bat 102 moves, during the follow-through, from Quadrant 2 into Quadrant 1, from Quadrant 3 into Quadrant 1, or from Quadrant 3 into Quadrant 4, based on the changes in horizontal angle φ. If the bat 102 does not move through the quadrants according to one of these criteria, the bat-over-shoulder determiner 408 determines the bat 102 did not move over the batter's shoulder during the follow-through stage. Therefore, the bat-over-shoulder determiner 408 provides means for determining whether the bat 102 traveled over a batter's shoulder.

At block 1908, the shot curve determiner 410 determines whether the swing follows an 'N' type curve or an 'M' type curve based on the shape of the vertical angle change throughout the swing. In some examples, the shot curve determiner 410 determines whether the swing follows an 'N' type curve or an 'M' type by identifying the number and/or positions of the peak(s) and valley(s) (i.e., minimums and maximums) of the vertical angle θ during the swing. For example, referring to FIGS. 15A-15D, the shot curve determiner 410 may analyze the vertical angle measurements to determine how many peaks and/or valleys are present and the position of the peaks and/or valleys relative to the different points and/or stages of the swing. A vertical angle θ having one peak and one valley (i.e., one maximum and one minimum) after the impact point may be considered an 'N' type curve, whereas a vertical angle θ having at least two peaks and one valley (i.e., two maximums and one minimum) after the impact point may be considered an 'M' type curve. Therefore, the shot curve determiner 410 provides means for identifying one or more peaks and valleys in the vertical angle θ and/or determining whether the bat 102 followed an 'N' type curve or an 'M' type curve.

At block 1910, the follow-through determiner 412 determines the type of follow-through pattern of the bat 102 based on whether the swing was a horizontal shot or a vertical shot (determined at block 1904), whether the bat 102 moved over the batter's shoulder during the follow-through (determined at block 1906), and whether the swing followed an 'N' type curve or an 'M' type curve (determined at block 1908). In some examples, the follow-through determiner 412 determines the type of follow-through pattern from a set of possible follow-through patterns, such as defined in Table 1 above. For example, as shown in Table 1, there are nine different follow-through patterns, representing a different combination of the results from the determinations at blocks 1904-1908. Thus, the follow-through determiner 412 provides means for determining a follow-through pattern of a swing based on movement data (e.g., acceleration measurement(s), gyroscope measurement(s), and/or magnetometer measurement(s)) obtained by the IMU 218.

At block 1912, the follow-through determiner 412 determines which follow-through angle definition should be used based on the follow-through pattern. For example, referring to Table 1 above, each follow-through pattern includes a definition of how to calculate the follow-through angle for the respective follow-through pattern. Further, in some examples, the definition may be used to by the position and parameter determiner 404 to determine the follow-through point. At block 1914, the follow-through determiner 412 determines and/or calculates the follow-through angle of the swing using the follow-through angle definition for the identified follow-through pattern. In some examples, once the follow-through position is identified (e.g., as a time or sampling index), the follow-through determiner 412 obtains the angle of the bat 102 at the corresponding time or sampling index from the angle and orientation tracker 402, which is then identified as the follow-through angle. Therefore, in some examples, the angle and orientation tracker 402 and/or the follow-through determiner 412 provides means for determining a definition for determining a follow-through angle of the bat 102 and/or means for determining the follow-through angle based on the definition.

At block 1916, swing analyzer 230 reports the identified/determined follow-through pattern (e.g., whether the swing was a horizontal shot or vertical shot, whether the bat 102 went over the shoulder, etc.), the follow-through angle, and/or any other data from the swing analysis. For example, the sensing unit 210 includes the transceiver 220 that can transmit the results to the electronic device 228. Therefore, in some examples, the transceiver 220 provides means for transmitting the results to the remote electronic device 228. In addition to or as an alternative to the follow-through pattern, the sensing unit 210 may transmit the angle data (e.g., the vertical angle θ, the horizontal angle φ, and/or the face angle φ), the position data, and/or any of the other measurements or metrics to the electronic device 228, which may be further processed and/or present the results (e.g., on a display screen, broadcast over TV, etc.).

Figure 10:
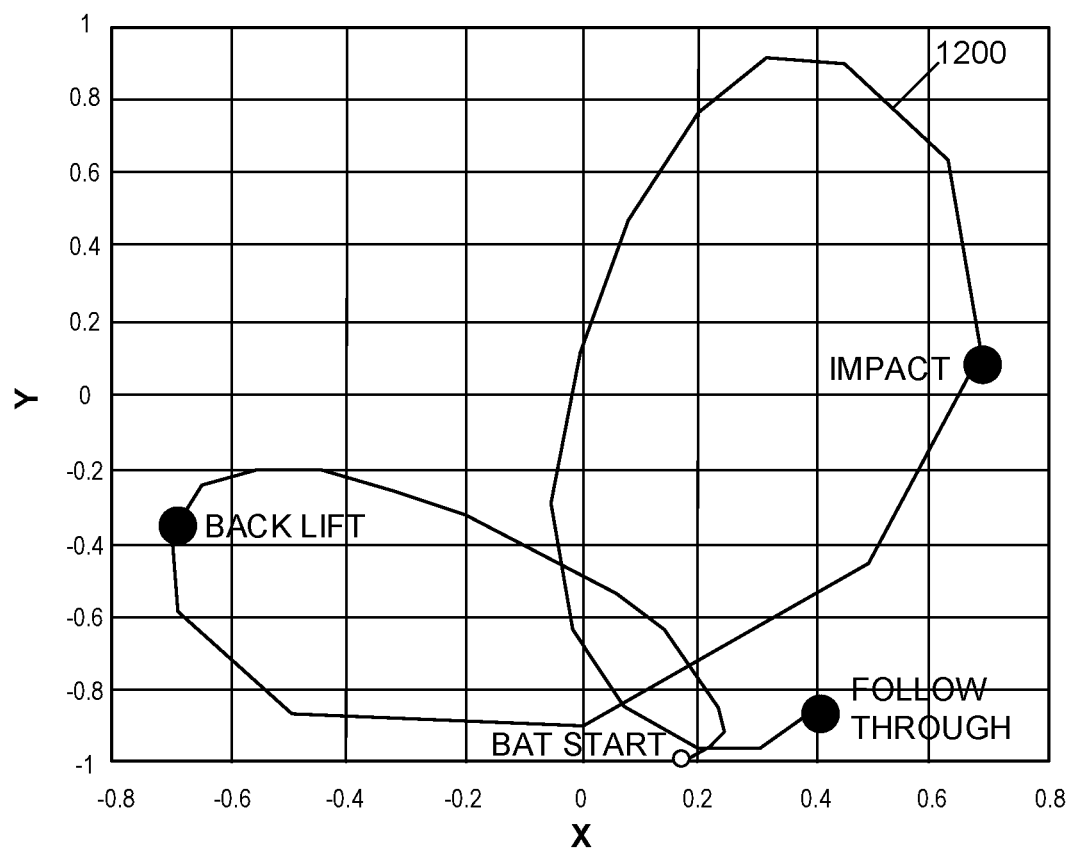
FIG. 10 illustrates an example bat path plotted in an XY plane that may be used to determine a direction of a swing by the example position and parameter determiner of FIG. 7.

At block 1918, the swing analyzer 230 determines whether the game is still being played and/or another swing is to be analyzed. If so, control returns to block 1902 and the swing analyzer 230 analyzes the next swing of the bat 102. If the game is over or the swing analyzer 230 is no longer needed (e.g., practice is over), the example process of FIG. 10 ends. In some examples, the swing analyzer 230 determines the game is still being played based on movement of the bat 102 (e.g., as detected by measurements from the IMU 218) within a threshold time (e.g., 5 minutes). If the bat 102 is not moved within the threshold time, the swing analyzer 230 may determine the game is over.

Figure 20:
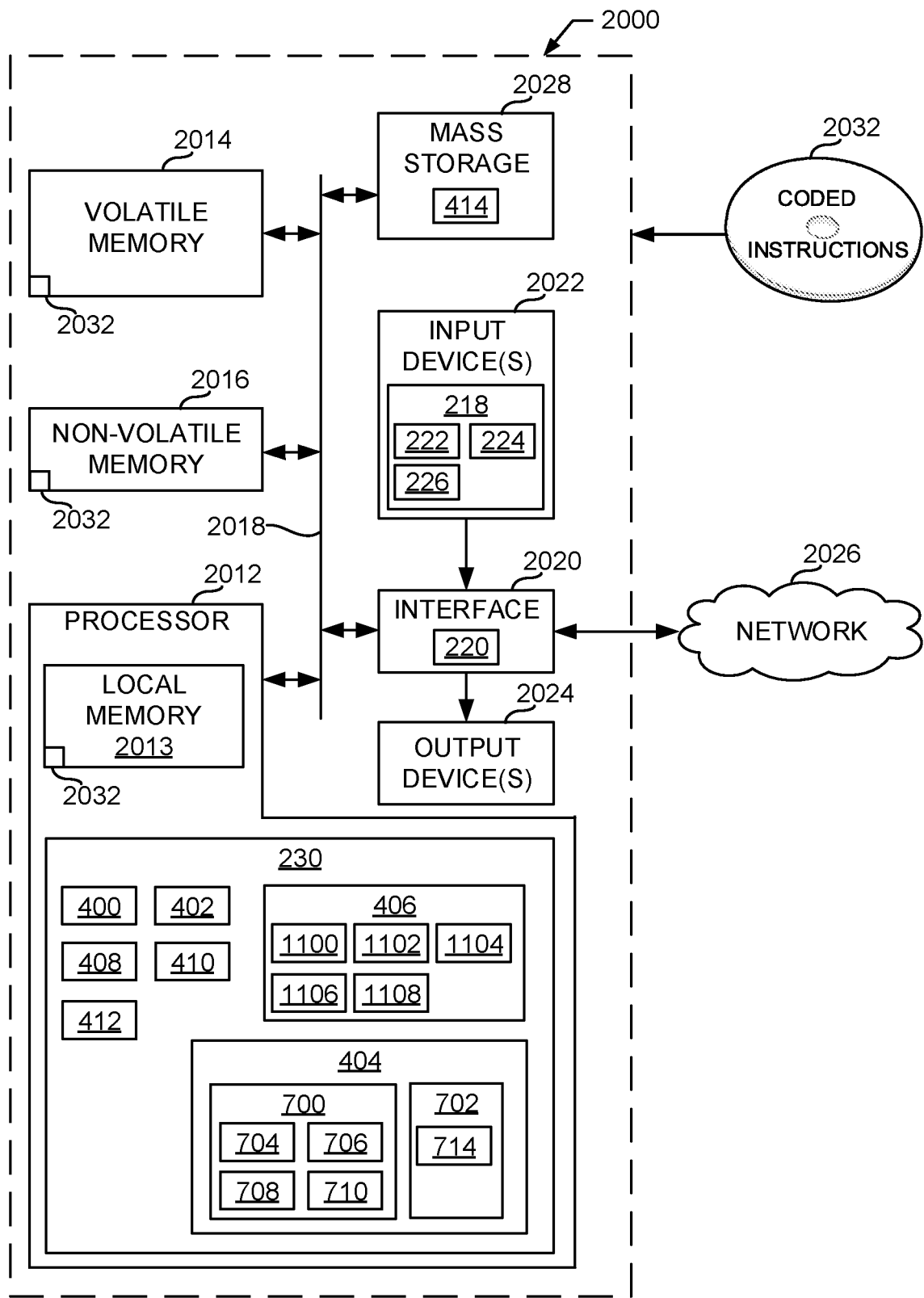
FIG. 20 is a processor platform that may execute the example instructions of FIGS. 16A-19 to implement the example swing analyzer of FIG. 2.

FIG. 20 is a block diagram of an example processor platform 2000 capable of executing the instructions of FIGS. 16A-19 to implement the swing analyzer 230 of FIG. 4. The processor platform 2000 may represent, for example, the sensing unit 210 of FIG. 2. In other examples, the processor platform 2000 may represent the electronic device 228 of FIG. 2, which can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors or controllers from any desired family or manufacturer. The hardware processor may be a semiconductor based (e.g., silicon based) device. The processor 2012 may be, for example, the microprocessor 216 of FIG. 2. In this example, the processor 2012 implements the example calibrator 400, the example angle and orientation tracker 402, the example position and parameter determiner 404, the example shot type determiner 406, the example bat-over-shoulder determiner 408, the example shot curve determiner 410, the example follow-through determiner 412, the multi-layer shot detector 700, the example parameter calculator 702, the example TDPD 704, the example TDIPD 706, the example FDID 708, the example parameter verifier 710, the example pitch determiner 714, the example plane plotter 1100, the example area calculator 1102, the example triangle definer 1104, the example comparator 1106, the example angle determiner 1108, and/or, more generally, the example swing analyzer 230.

The processor 2012 of the illustrated example includes a local memory 2013 (e.g., a cache). The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 1120 may be implemented by any type of interface standard, such as an Ethernet interface, a universal serial bus (USB), and/or a PCI express interface. In this example, the interface circuit 2020 may include the transceiver 220.

In the illustrated example, one or more input devices 2022 are connected to the interface circuit 2020. The input device(s) 2022 permit(s) a user and/or a device to enter data and/or commands into the processor 2012. In this example, the input device(s) 2022 may include the IMU 218, including the accelerometer 222, the gyroscope 224, and/or the magnetometer 226. Additionally or alternatively, the input device(s) 2022 can be implemented by, for example, an audio sensor, a microphone, a camera (still or video), a keyboard, a button, a mouse, a touchscreen, a track-pad, a trackball, isopoint and/or a voice recognition system.

One or more output devices 2024 are also connected to the interface circuit 2020 of the illustrated example. The one or more output device(s) may correspond to an output of the remote electronic device 228 and may be implemented, for example, by display devices (e.g., a light emitting diode (LED), an organic light emitting diode (OLED), a liquid crystal display, a cathode ray tube display (CRT), a touch-screen, a tactile output device, a printer and/or speakers). The interface circuit 2020 of the illustrated example, thus, typically includes a graphics driver card, a graphics driver chip and/or a graphics driver processor.

The interface circuit 2020 of the illustrated example also includes a communication device such as a transmitter, a receiver, a transceiver, a modem and/or network interface card to facilitate exchange of data with external machines (e.g., computing devices of any kind) via a network 2026 (e.g., an Ethernet connection, a digital subscriber line (DSL), a telephone line, coaxial cable, a cellular telephone system, etc.).

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, RAID systems, and digital versatile disk (DVD) drives. In this example, the massage storage device(s) 2028 may include the memory 414.

Coded instructions 2032 of FIGS. 16A-19 may be stored in the mass storage device 2028, in the volatile memory 2014, in the non-volatile memory 2016, and/or on a removable tangible computer readable storage medium such as a CD or DVD.

From the foregoing, it will be appreciated that example methods, apparatus, systems, and articles of manufacture have been disclosed that track movement of sports implements, such as a bat, and determine certain metrics about a swing of the bat, such as a follow-through pattern. Tracking the movement of a bat or other sports implement during a swing and, in some examples, the follow-through stage, can be used for training the player, informative entertainment, etc. The examples disclosed herein provide a relatively simple, low-power sensing unit that may be used to analyze the movement of a sports implement during a swing and automatically report the results to be displayed and/or further processed. The example sensing units disclosed herein can be easily coupled to a bat and automatically report the swing results. Thus, the example sensing units do not require complex, expensive backend processors and additional infrastructure (e.g., cameras on a field) that are needed with known sports tracking systems.

Example methods, apparatus, systems, and/or articles of manufacture to track a sports bat are disclosed herein. Further examples and combinations thereof include the following:

Example 1 includes a sensing unit to be coupled to a sports implement. The sensing unit includes an inertial measurement unit to obtain movement data of said sports implement during a swing of said sports implement and a swing analyzer to determine a follow-through pattern of the swing of said sports implement based on the movement data.

Example 2 includes the sensing unit of Example 1, wherein the swing analyzer is to determine a follow-through angle of said sports implement based on the movement data.

The follow-through angle corresponds to a vertical angle of said sports implement an end of a follow-through stage of the swing.

Example 3 includes the sensing unit of any of Examples 1 or 2, wherein the swing analyzer is to calculate at least one of a vertical angle, a horizontal angle, or a face angle of said sports implement during the swing based on the movement data, and wherein the swing analyzer is to determine the follow-through pattern based the at least one of the vertical angle, the horizontal angle and the face angle.

Example 4 includes the sensing unit of Example 3, wherein the swing analyzer is to identify one or more stages of the swing of said sports implement based on the at least one of the vertical angle, the horizontal angle and the face angle.

Example 5 includes the sensing unit of any of Examples 1 or 2, wherein the swing analyzer is to determine whether the swing is a horizontal shot or a vertical shot, and wherein the swing analyzer is to determine the follow-through pattern based on the determination of whether the swing of said sports implement is a horizontal shot or a vertical shot.

Example 6 includes the sensing unit of any of Examples 1 or 2, wherein the swing analyzer is to determine whether said sports implement traveled over a batter's shoulder during a follow-through stage of the swing, and wherein the swing analyzer is to determine the follow-through pattern based on the determination of whether said sports implement traveled over the batter's shoulder.

Example 7 includes the sensing unit of any of Examples 1 or 2, wherein the swing analyzer is to track a vertical angle of said sports implement during the swing, and wherein the swing analyzer is to determine the follow-through pattern based on a number of peaks and valleys in the vertical angle of the swing after an impact point.

Example 8 includes the sensing unit of any of Examples 1 or 2, wherein the inertial measurement unit includes at least one of an accelerometer, a gyroscope, or a magnetometer.

Example 9 includes the sensing unit of any of Examples 1 or 2, further including a power source.

Example 10 includes the sensing unit of any of Examples 1 or 2, further including a transceiver to transmit the follow-through pattern to a remote electronic device.

Example 11 includes a sports tracking system including a sensing unit coupled to a sports implement. The sensing unit includes an inertial measurement unit (IMU) to obtain movement data of the sports implement during a swing of the sports implement. The sports tracking system further includes a swing analyzer to determine a follow-through angle of the sports implement based on the movement data. The follow-through angle corresponds to a vertical angle of the sports implement an end of a follow-through stage of the swing.

Example 12 includes the sports tracking system of Example 11, wherein the sports implement is a cricket bat having a handle and a blade.

Example 13 includes the sports tracking system of Example 12, wherein the sensing unit is coupled to the cricket bat at or near an end of the handle.

Example 14 includes the sports tracking system of any of Examples 11-13, wherein the swing analyzer is implemented by a processor of the sensing unit.

Example 15 includes the sports tracking system of any of Examples 11-13, wherein the sensing unit includes a transmitter to transmit the follow-through angle of the sports implement to a remote electronic device.

Example 16 includes the sports tracking system of any of Examples 11-13, wherein the swing analyzer is implemented in a remote electronic device. The sensing unit includes a transceiver to transmit the movement data to the remote electronic device.

Example 17 includes the sports tracking system of any of Examples 11-13, wherein the sensing unit includes a battery.

Example 18 includes a non-transitory machine readable storage medium including instructions that, when executed, cause at least one machine to at least determine a follow-through pattern of a swing of a sports implement based on movement data obtained by an inertial measurement unit coupled to the sports implement.

Example 19 includes the non-transitory machine readable storage medium of Example 18, wherein the instructions, when executed, cause the at least one machine to determine a definition for determining a follow-through angle of the sports implement based on the follow-through pattern.

Example 20 includes the non-transitory machine readable storage medium of Example 19, wherein the instructions, when executed, cause the at least one machine to calculate the follow-through angle of the sports implement using the definition.

Example 21 includes the non-transitory machine readable storage medium of Example 19, wherein the instructions, when executed, cause the at least one machine to transmit the follow-through pattern and the follow-through angle to a remote electronic device.

Example 22 includes the non-transitory machine readable storage medium of any of Examples 18-21, wherein the instructions, when executed, cause the at least one machine to determine whether the swing is a vertical shot or a horizontal shot, and the instructions, when executed, cause the at least one machine to determine the follow-through pattern based on whether the swing is a vertical shot or a horizontal shot.

Example 23 includes the non-transitory machine readable storage medium of any of Examples 18-21, wherein the instructions, when executed, cause the at least one machine to determine if the sports implement traveled over a batter's shoulder during the swing, and the instructions, when executed, cause the at least one machine to determine the follow-through pattern based on whether the sports implement traveled over the batter's shoulder.

Example 24 includes the non-transitory machine readable storage medium of any of Examples 18-21, wherein the instructions, when executed, cause the at least one machine to determine a vertical angle of the sports implement during the swing based on the movement data, identify one or more peaks and valleys in the vertical angle of the sports implement after an impact point, and determine the follow-through pattern based on the identified number of peaks and valleys in the vertical angled.

Example 25 includes the non-transitory machine readable storage medium of any of Examples 18-21, wherein the sports implement is a cricket bat.

Example 26 includes an apparatus including means for determining a follow-through pattern of a swing of a sports implement based on movement data obtained by an inertial measurement unit coupled to the sports implement.

Example 27 includes the apparatus of Example 26, further including means for determining a definition for determining a follow-through angle of the sports implement based on the follow-through pattern.

Example 28 includes the apparatus of Example 27, further including means for determining the follow-through angle based on the definition.

Example 29 includes the apparatus of Example 27, further including means for transmitting the follow-through pattern and the follow-through angle to a remote electronic device.

Example 30 includes the apparatus of any of Examples 26-29, further including means for determining whether the swing is a vertical shot or a horizontal shot, and wherein the follow-through pattern is based on whether the swing is a vertical shot or a horizontal shot.

Example 31 includes the apparatus of any of Examples 26-29, further including means for determining whether the sports implement traveled over a batter's shoulder during the swing, and wherein the follow-through pattern is based on whether the sports implement traveled over the batter's shoulder.

Example 32 includes the apparatus of any of Examples 26-29, further including means for determining a vertical angle of the sports implement during the swing based on the movement data, and means for identifying one or more peaks and valleys in the vertical angle of the sports implement after an impact point, and wherein the follow-through pattern is based on the identified number of peaks and valleys in the vertical angle.

Example 33 includes the apparatus of any of Examples 26-29, wherein the sports implement is a cricket bat.

Example 34 includes a sensing unit to be coupled to a sports implement. The sensing unit includes an inertial measurement unit to obtain movement data of said sports implement during a swing of said sports implement and a swing analyzer to determine whether the swing is a horizontal shot or a vertical shot based on the movement data.

Example 35 includes the sensing unit of Example 35, wherein the swing analyzer is to determine whether the swing is a horizontal shot or a vertical shot by comparing a first area defined by a path of the swing projected in a horizontal plane and a second area defined by the path of the swing projected in a substantially vertical plane.

Example 36 includes the sensing unit of Example 34, wherein the swing analyzer is to calculate at least one of a horizontal angle or a vertical angle of said sports implement during the swing based on the movement data, and wherein the swing analyzer is to determine whether the swing is a horizontal shot or a vertical shot based on a change in at least one of the horizontal angle or the vertical angle during the swing.

Example 37 includes the sensing unit of Example 36, wherein the swing analyzer is to determine a back lift position and a follow-through position of the swing based on the movement data, and the swing analyzer is to determine whether the swing is a horizontal shot or a vertical shot based on the change in at least one of the horizontal angle or the vertical angle during between the back lift position and the follow-through position.

Example 38 includes the sensing unit of any of Examples 34-37, wherein the swing analyzer is to determine whether said sports implement made contact with a second sports implement during the swing based on the movement data.

Example 39 includes the sensing unit of any of Examples 34-38, wherein the inertial measurement unit includes at least one of an accelerometer, a gyroscope, or a magnetometer.

Example 40 includes the sensing unit of any of Examples 34-39, further including a power source.

Example 41 includes the sensing unit of any of Examples 34-40, further including a transceiver to transmit the determination of whether the swing is a horizontal shot or a vertical shot to a remote electronic device.

Example 42 includes a sports tracking system including a sensing unit coupled to a sports implement, the sensing unit including an inertial measurement unit (IMU) to obtain a plurality of measurements during a swing of the sports implement, and a swing analyzer to determine whether the swing is a horizontal shot or a vertical shot based on the plurality of measurements.

Example 43 includes the sports tracking system of Example 42, wherein the sports implement is a cricket bat having a handle and a blade.

Example 44 includes the sports tracking system of Example 43, wherein the sensing unit is coupled to the cricket bat at or near an end of the handle.

Example 45 includes the sports tracking system of any of Examples 42-44, wherein the swing analyzer is implemented by a processor of the sensing unit.

Example 46 includes the sports tracking system of any of Examples 42-45, wherein the sensing unit includes a transmitter to transmit the determination of whether the swing is a horizontal shot or a vertical shot to a remote electronic device.

Example 47 includes the sports tracking system of any of Examples 42-44, wherein the swing analyzer is implemented in a remote electronic device, the sensing unit including a transceiver to transmit the plurality of measurements to the remote electronic device.

Example 48 includes the sports tracking system of any of Examples 42-47, wherein the sensing unit includes a battery.

Example 49 includes a non-transitory machine readable medium comprising instructions that, when executed, cause at least one machine to at least: plot a projection of a path of a swing of a sports implement in a first plane and in a second plane, the first plane being a substantially horizontal plane and the second plane being a substantially vertical plane, calculate a horizontal area based on a first area defined by the path and a reference point in the first plane, calculate a vertical area based on a second area defined by the path and the reference point in the second plane, determine a ratio of the horizontal area and the vertical area, and determine whether the swing corresponds to a horizontal swing or a vertical swing based on a comparison of the ratio to a threshold.

Example 50 includes the non-transitory machine readable medium of Example 49, wherein the path is defined between a back lift position and a follow-through position of the swing.

Example 51 includes the non-transitory machine readable medium of Example 50, wherein the instructions, when executed, cause the at least one machine to determine the path, the back lift position, and the follow-through position of the swing based on movement data obtained by an inertial measure unit coupled to the sports implement.

Example 52 includes the non-transitory machine readable medium of any of Examples 49-51, wherein the instructions, when executed, cause the at least one machine to: calculate the horizontal area by subtracting, from the first area, an area in the first plane defined by the path and the reference point when the path in the first plane is in a clockwise direction relative to the reference point, and calculate the vertical area by subtracting, from the second area, an area in the second plane defined by the path and the reference point when the path in the second plane is in a clockwise direction relative to the reference point.

Example 53 includes the non-transitory machine readable medium of any of Examples 49-51, wherein the instructions, when executed, cause the at least one machine to calculate the horizontal area by: dividing the first area into a plurality of triangles defining a respective plurality of areas, adding the areas of the triangles in the first plane that are defined by the path in a counter-clockwise direction relative to the reference point, and subtracting the areas of the triangles in the first plane that are defined by the path in a clockwise direction relative to the reference point.

Example 54 includes the non-transitory machine readable medium of Example 53, wherein the instructions, when executed, cause the at least one machine to calculate the vertical area by: dividing the second area into a plurality of triangles defining a respective plurality of areas, adding the areas of the triangles in the second plane that are defined by the path in a counter-clockwise direction relative to the reference point, and subtracting the areas of the triangles in the second plane that are defined by the path in a clockwise direction relative to the reference point.

Example 55 includes the non-transitory machine readable medium of Example 53, wherein each of the triangles is defined by two adjacent measurement points of the path and the reference point.

Example 56 includes the non-transitory machine readable medium of any of Examples 49-55, wherein the instructions, when executed, cause the at least one machine to transmit the determination of whether the swing corresponds to a horizontal swing or a vertical swing to a remote electronic device.

Example 57 includes an apparatus including means for plotting a projection of a path of a swing of a sports implement in a first plane and in a second plane, the first plane being a substantially horizontal plane and the second plane being a substantially vertical plane, means for calculating a horizontal area based on a first area defined by the path and a reference point in the first plane, means for calculating a vertical area based on a second area defined by the path and the reference point in the second plane, means for determining a ratio of the horizontal area and the vertical area, and means for determining whether the swing corresponds to a horizontal swing or a vertical swing based on a comparison of the ratio to a threshold.

Example 58 include the apparatus of Example 57, wherein the path is defined between a back lift position and a follow-through position of the swing.

Example 59 includes the apparatus of Example 58, further including: means for determining the path and means for determining the back lift position and the follow-through position of the swing based on movement data obtained by an inertial measure unit coupled to the sports implement.

Example 60 includes the apparatus of any of Examples 57-59, wherein the means for calculating the horizontal area are to subtract, from the first area, an area in the first plane defined by the path and the reference point when the path in the first plane is in a clockwise direction relative to the reference point, and the means for calculating the vertical area are to subtracting, from the second area, an area in the second plane defined by the path and the reference point when the path in the second plane is in a clockwise direction relative to the reference point.

Example 61 includes the apparatus of any of Examples 57-59, further including means for dividing the first area into a plurality of triangles defining a respective plurality of areas, and wherein the means for calculating the horizontal area is to add the areas of the triangles in the first plane that are defined by the path in a counter-clockwise direction relative to the reference point and subtract the areas of the triangles in the first plane that are defined by the path in a clockwise direction relative to the reference point.

Example 62 includes the apparatus of Example 61, further including means for dividing the second area into a plurality of triangles defining a respective plurality of areas, and wherein the means for calculating the vertical area is to add the areas of the triangles in the second plane that are defined by the path in a counter-clockwise direction relative to the reference point and subtract the areas of the triangles in the second plane that are defined by the path in a clockwise direction relative to the reference point.

Example 63 includes the apparatus of Example 61, wherein each of the triangles is defined by two adjacent measurement points of the path and the reference point.

Example 64 includes the apparatus of any of Examples 57-63, further including means for transmitting the determination of whether the swing corresponds to a horizontal swing or a vertical swing to a remote electronic device.

Example 65 includes a non-transitory machine readable medium comprising instructions that, when executed, cause at least one machine to at least: obtain a window of measurements gathered by a sensor coupled to a first sports implement during a swing of the first sports implement, convert the measurements into a frequency domain representation, calculate a sum of the measurements occurring in a high frequency range of the frequency domain representation, and determine whether the first sports implement made impact with a second sports implement based on the sum.

Example 66 includes the non-transitory machine readable medium of Example 65, wherein the sum is a first sum, and wherein the instructions, when executed, cause the at least one machine to: calculate a second sum of the measurements occurring in a low frequency range of the frequency domain representation, and determine whether the first sports implement made impact with the second sports implement based on the first sum and the second sum.

Example 67 includes the non-transitory machine readable medium of Example 65, wherein the instructions, when executed, cause the at least one machine to convert the measurements into the frequency domain representation using a Discrete Cosine Transform.

Example 68 includes the non-transitory machine readable medium of Example 67, wherein the instructions, when executed, cause the at least one machine to: determine a discrete cosine coefficient component of the measurements in the frequency domain representation, and determine whether the first sports implement made impact with the second sports implement based on the first sum and discrete cosine coefficient component.

Example 69 includes the non-transitory machine readable medium of Example 68, wherein the sensor is a first sensor, the measurements are first measurements, the sum is a first sum, the frequency domain representation is a first frequency domain representation, and the discrete cosine coefficient component is a first discrete cosine coefficient component, and wherein the instructions, when executed, cause the at least one machine to: obtain second measurements gathered by a second sensor during the window, convert the second measurements into a second frequency domain representation, calculate a second sum of the second measurements occurring in the high frequency range of the second frequency domain representation, determine a second discrete cosine coefficient component of the second measurements in the second frequency domain representation, and determine whether the first sports implement made impact with the second sports implement based the first sum, the first discrete cosine coefficient component, the second sum, and the second discrete cosine coefficient component.

Example 70 includes the non-transitory machine readable medium of Example 69, wherein the first sensor is an accelerometer and the second sensor is a gyroscope.

Example 71 includes the non-transitory machine readable medium of any of Examples 65-70, wherein the instructions, when executed, cause the at least one machine to transmit the determination of whether the sports implement made impact with the second sports implement to a remote electronic device.

Example 72 includes an apparatus including means for obtaining obtain a window of measurements gathered by a sensor coupled to a first sports implement during a swing of the first sports implement, means for converting the measurements into a frequency domain representation, means for calculating a sum of the measurements occurring in a high frequency range of the frequency domain representation, and means for determining whether the first sports implement made impact with a second sports implement based on the sum.

Example 73 includes the apparatus of Example 72, wherein the sum is a first sum, further including: means for calculating a second sum of the measurements occurring in a low frequency range of the frequency domain representation, and means for determining whether the first sports implement made impact with the second sports implement based on the first sum and the second sum.

Example 74 includes the apparatus of Example 72, wherein the means for converting uses a Discrete Cosine Transform.

Example 75 includes the apparatus of Example 74, further including: means for determining a discrete cosine coefficient component of the measurements in the frequency domain representation, and means for determining whether the first sports implement made impact with the second sports implement based on the first sum and discrete cosine coefficient component.

Example 76 includes the apparatus of Example 75, wherein the sensor is a first sensor, the measurements are first measurements, the sum is a first sum, the frequency domain representation is a first frequency domain representation, and the discrete cosine coefficient component is a first discrete cosine coefficient component, further including: means for obtaining second measurements gathered by a second sensor during the window, means for converting the second measurements into a second frequency domain representation, means for calculating a second sum of the second measurements occurring in the high frequency range of the second frequency domain representation, means for determining a second discrete cosine coefficient component of the second measurements in the second frequency domain representation, and means for determining whether the first sports implement made impact with the second sports implement based the first sum, the first discrete cosine coefficient component, the second sum, and the second discrete cosine coefficient component.

Example 77 includes the apparatus of Example 76, wherein the first sensor is an accelerometer and the second sensor is a gyroscope.

Example 78 includes the apparatus of any of Examples 72-77, further including means for transmitting the determination of whether the sports implement made impact with the second sports implement to a remote electronic device.

Example 79 includes a non-transitory machine readable medium comprising instructions that, when executed, cause at least one machine to at least: determine a shot peak position in a window of a plurality of measurements obtained by a first sensor coupled to a sports implement, identify a first measurement in the plurality of measurements as corresponding to a largest decrease in magnitude in the measurements after the shot peak position in the window, and determine an impact position in the window based on the first measurement.

Example 80 includes the non-transitory machine readable medium of Example 79, wherein the instructions, when executed, cause the at least one machine to determine the shot peak position by comparing the plurality of measurements in the window to a threshold.

Example 81 includes the non-transitory machine readable medium of Example 79, wherein the sensor is a first sensor and the plurality of measurements are a first plurality of measurements, wherein the instructions, when executed, cause the at least one machine to: identify a second measurement in a second plurality of measurements as corresponding to a largest decrease in magnitude in the second plurality of measurements after the shot peak position in the window, the second plurality of measurements obtained by a second sensor coupled to the sports implement, and determine the impact position in the window based on the first measurement and the second measurement.

Example 82 includes the non-transitory machine readable medium of Example 81, wherein the instructions, when executed, cause the at least one machine to identify the first measurement as the impact position if the second measurement is within a threshold range of the first measurement.

Example 83 includes the non-transitory machine readable medium of Example 82, wherein the instructions, when executed, cause the at least one machine to identify a measurement at least one measurement prior to or after the first measurement as the impact position if the second measurement is outside of the threshold range of the first measurement.

Example 84 includes the non-transitory machine readable medium of any of Examples 81-83, wherein the first sensor is an accelerometer and the second sensor is a gyroscope.

Example 85 includes the non-transitory machine readable medium of any of Examples 79-84, wherein the instructions, when executed, cause the at least one machine to transmit the impact position to a remote electronic device.

Example 86 includes an apparatus including means for determining a shot peak position in a window of a plurality of measurements obtained by a first sensor coupled to a sports implement, means for identifying a first measurement in the plurality of measurements as corresponding to a largest decrease in magnitude in the measurements after the shot peak position in the window, and means for determining an impact position in the window based on the first measurement.

Example 87 includes the apparatus of Example 86, wherein the means for determining the shot peak position is to compare the plurality of measurements in the window to a threshold.

Example 88 includes the apparatus of Example 86, wherein the sensor is a first sensor and the plurality of measurements are a first plurality of measurements, further including: means for identifying a second measurement in a second plurality of measurements as corresponding to a largest decrease in magnitude in the second plurality of measurements after the shot peak position in the window, the second plurality of measurements obtained by a second sensor coupled to the sports implement, and wherein the means for determining the impact position is to determine the impact position in the window based on the first measurement and the second measurement.

Example 89 includes the apparatus of Example 88, wherein the means for determining the impact position is to identify the first measurement as the impact position if the second measurement is within a threshold range of the first measurement.

Example 90 includes the apparatus Example 89, wherein the means for determining the impact position is to identify a measurement at least one measurement prior to or after the first measurement as the impact position if the second measurement is outside of the threshold range of the first measurement.

Example 91 includes the apparatus of any of Examples 88-90, wherein the first sensor is an accelerometer and the second sensor is a gyroscope.

Example 92 includes the apparatus of any of Examples 86-91, further including means for transmitting the impact position to a remote electronic device.

Example 93 includes a non-transitory machine readable medium comprising instructions that, when executed, cause at least one machine to at least: establish a first reference frame for a first sports implement, the first reference frame having a horizontal Y axis, wherein a positive Y value on the Y axis is in a direction of a second sports implement to be contacted with the first sports implement, and a negative Y value on the Y axis is in an opposite direction, determine a shot start position and a back lift position in a window of measurements obtained by an inertial measure unit coupled to the first sports implement during a swing, calculate a Y negative ratio value based on a location of the first sports implement in the reference frame between the shot start position and the back lift position, and determine whether to modify the first reference frame based on a comparison of the Y negative ratio value to a threshold.

Example 94 includes the non-transitory machine readable medium of Example 93, wherein the instructions, when executed, cause the at least one machine to establish a second reference frame if the Y negative ratio value does not satisfy the threshold.

Example 95 includes the non-transitory machine readable medium of Example 94, wherein the instructions, when executed, cause the at least one machine to use the second reference frame in one or more calculations to determine one or more parameters of the swing of the sports implement.

Example 96 includes the non-transitory machine readable medium of any of Examples 93-95, wherein the Y negative ratio value is a ratio of a sum of negative Y component values of the location of the first sports implement at each of the measurements compared to an absolute sum of the Y component values of the location of the sports implement at each of the measurements.

Example 97 includes an apparatus including means for establishing a first reference frame for a first sports implement, the first reference frame having a horizontal Y axis, wherein a positive Y value on the Y axis is in a direction of a second sports implement to be contacted with the first sports implement, and a negative Y value on the Y axis is in an opposite direction, means for determining a shot start position and a back lift position in a window of measurements obtained by an inertial measure unit coupled to the first sports implement during a swing, means for calculating a Y negative ratio value based on a location of the first sports implement in the reference frame between the shot start position and the back lift position, and means for determining whether to modify the first reference frame based on a comparison of the Y negative ratio value to a threshold.

Example 98 includes the apparatus of Example 97, wherein the means for establishing the first reference frame is to establish a second reference frame if the Y negative ratio value does not satisfy the threshold.

Example 99 includes the apparatus of Example 98, further including means for calculating one or more parameters of the swing, the means for calculating the one or more parameters of the swing to use the second reference frame.

Example 100 includes the apparatus of any of Examples 97-99, wherein the Y negative ratio value is a ratio of a sum of negative Y component values of the location of the first sports implement at each of the measurements compared to an absolute sum of the Y component values of the location of the sports implement at each of the measurements.

Although certain example methods, apparatus, systems and articles of manufacture have been disclosed herein, the scope of coverage of this patent is not limited thereto. On the contrary, this patent covers all methods, apparatus, systems and articles of manufacture fairly falling within the scope of the claims of this patent.

What is claimed is:

1. A sensing unit to be coupled to a cricket bat, the sensing unit comprising:
    an inertial measurement sensor to obtain movement data of the cricket bat during a swing of the cricket bat; and
    a swing analyzer to determine whether the swing is a horizontal shot or a vertical shot by:
        calculating a first area defined by a path of the swing projected in a substantially horizontal plane and a reference point in the substantially horizontal plane;
        calculating a second area defined by the path of the swing projected in a substantially vertical plane and the reference point in the substantially vertical plane; and
        comparing a ratio of the first area and the second area to a threshold.

2. The sensing unit of claim 1, wherein the inertial measurement sensor includes at least one of an accelerometer, a gyroscope, or a magnetometer.

3. The sensing unit of claim 1, further including a power source.

4. The sensing unit of claim 1, further including a transceiver to transmit the determination of whether the swing is a horizontal shot or a vertical shot to a remote electronic device.

5. The sensing unit of claim 1, wherein the reference point corresponds to a location of an end of a handle of the cricket bat opposite a tip of the cricket bat.

6. The sensing unit of claim 1, wherein the swing analyzer is to calculate the first area by adding areas in the substantially horizontal plane defined by the path and the reference point between a first position of the cricket bat and a second position of the cricket bat when the path is in a counter-clockwise direction relative to the reference point, and by subtracting areas in the substantially horizontal plane defined by the path and the reference point between the first and second positions when the path is in the clockwise direction relative to the reference point.

7. The sensing unit of claim 6, wherein the swing analyzer is to calculate the second area by adding areas in the substantially vertical plane defined by the path and the reference point between the first and second positions when the path is in a counter-clockwise direction relative to the reference point, and by subtracting areas in the substantially vertical plane defined by the path and the reference point between the first and second positions when the path is in the clockwise direction relative to the reference point.

8. A sports tracking system comprising:
   an inertial measurement sensor coupled to a cricket bat to obtain a plurality of measurements during a swing of the cricket bat; and
   a swing analyzer to determine whether the swing is a horizontal shot or a vertical shot by:
      determining a first position and a second position of the swing based on the plurality of measurements;
      determining a first absolute sum of a horizontal angle change of the cricket bat between the first position and the second position;
      determining a second absolute sum of a vertical angle change of the cricket bat between the first position and the second position; and
      comparing a ratio of the first absolute sum and the second absolute sum to a threshold.

9. The sports tracking system of claim 8, wherein the cricket bat has a handle and a blade.

10. The sports tracking system of claim 9, wherein the inertial measurement sensor is coupled to the cricket bat at or near an end of the handle.

11. The sports tracking system of claim 8, wherein the swing analyzer is implemented by a processor.

12. The sports tracking system of claim 8, further including a transmitter to transmit the determination of whether the swing is a horizontal shot or a vertical shot to a remote electronic device.

13. The sports tracking system of claim 8, wherein the swing analyzer is implemented in a remote electronic device, and further including a transceiver to transmit the plurality of measurements to the remote electronic device.

* * * * *